US010675609B2

(12) United States Patent
Baghdadi et al.

(10) Patent No.: US 10,675,609 B2
(45) Date of Patent: *Jun. 9, 2020

(54) ARTICLES WITH SOIL-SHEDDING PERFORMANCE

(71) Applicant: NIKE, Inc., Beaverton, OR (US)

(72) Inventors: Hossein A. Baghdadi, Portland, OR (US); Caleb W. Dyer, Beaverton, OR (US); Myron Maurer, West Linn, OR (US); Denis Schiller, Vancouver, WA (US); Jeremy D. Walker, Portland, OR (US); Zachary C. Wright, Beaverton, OR (US); Marc Adler, Phoenixville, PA (US)

(73) Assignee: NIKE, INC., Beaverton, OR (US)

( * ) Notice: Subject to any disclaimer, the term of this patent is extended or adjusted under 35 U.S.C. 154(b) by 213 days.

This patent is subject to a terminal disclaimer.

(21) Appl. No.: 15/441,720

(22) Filed: Feb. 24, 2017

(65) Prior Publication Data

US 2017/0252722 A1    Sep. 7, 2017

Related U.S. Application Data

(60) Provisional application No. 62/302,411, filed on Mar. 2, 2016.

(51) Int. Cl.
*B01J 20/28* (2006.01)
*B32B 3/10* (2006.01)
(Continued)

(52) U.S. Cl.
CPC ....... *B01J 20/28047* (2013.01); *B01J 20/267* (2013.01); *B32B 3/10* (2013.01);
(Continued)

(58) Field of Classification Search
CPC .............................. B32B 3/10; B01J 20/28047
See application file for complete search history.

(56) References Cited

U.S. PATENT DOCUMENTS 2,920,983 A    1/1960  Bugosh
3,463,662 A    8/1969  Hodes
(Continued)

FOREIGN PATENT DOCUMENTS

CN    1471453 A    1/2004
CN    2627866 Y    7/2004
(Continued)

OTHER PUBLICATIONS

Blanco-Fuente et al. "Tanned Leather: a Good Model for Determining Hydrogels Bioadhesion", Int. J. of Pharma., vol. 138, 1996, p. 103-112 (Year: 1996).*

(Continued)

*Primary Examiner* — Gerard Higgins
(74) *Attorney, Agent, or Firm* — Thomas | Horstemeyer, LLP

(57) ABSTRACT

An article of manufacture has an external surface at least partly defined by a material compositionally comprising a polymeric hydrogel that takes up water when wetted. The hydrogel-containing material is effective in reducing soil accumulation on, and/or for reducing soil adhesion to, an article designed for a variety of uses, such as transportation, vehicle safety, storage, recreation, leisure, waste disposal, construction, gardening, or traffic control.

34 Claims, 20 Drawing Sheets

(51) Int. Cl.
*B01J 20/26* (2006.01)
*C08L 75/04* (2006.01)
*B32B 27/06* (2006.01)

(52) U.S. Cl.
CPC .............. *B32B 27/06* (2013.01); *C08L 75/04* (2013.01); *C08G 2210/00* (2013.01); *Y10T 428/24802* (2015.01)

(56) References Cited

U.S. PATENT DOCUMENTS

| | | | |
|---|---|---|---|
| 3,637,001 | A | 1/1972 | Roberts et al. |
| 4,118,354 | A | 10/1978 | Harada et al. |
| 4,271,608 | A | 6/1981 | Tomuro |
| 4,501,591 | A | 2/1985 | Ucci et al. |
| 4,520,138 | A | 5/1985 | Himes |
| 4,523,005 | A | 6/1985 | Szycher |
| 4,661,099 | A * | 4/1987 | von Bittera .......... A61F 13/063 604/290 |
| 4,924,608 | A | 5/1990 | Mogonye |
| 4,990,357 | A | 2/1991 | Karakelle et al. |
| 5,120,816 | A | 6/1992 | Gould et al. |
| 5,160,790 | A | 11/1992 | Elton |
| 5,314,478 | A | 5/1994 | Oka et al. |
| 5,480,377 | A | 1/1996 | Cartmell et al. |
| 5,576,072 | A | 11/1996 | Hostettler et al. |
| 5,591,779 | A | 1/1997 | Bleys et al. |
| 5,763,335 | A | 6/1998 | Hermann |
| 5,832,636 | A | 11/1998 | Lyden et al. |
| 5,943,792 | A | 8/1999 | Powell |
| 5,969,076 | A | 10/1999 | Lai et al. |
| 6,003,191 | A | 12/1999 | Sherry et al. |
| 6,011,104 | A | 1/2000 | Udy |
| 6,046,295 | A | 4/2000 | Frisch et al. |
| 6,076,283 | A | 6/2000 | Boie |
| 6,112,380 | A | 9/2000 | Dolan et al. |
| 6,162,369 | A | 12/2000 | Allewaert et al. |
| 6,203,812 | B1 | 3/2001 | Ehrhard et al. |
| 6,335,392 | B1 | 1/2002 | Umezawa et al. |
| 6,367,167 | B1 | 4/2002 | Krstic et al. |
| 6,555,619 | B1 * | 4/2003 | Kennedy .............. C08G 81/025 525/100 |
| 6,627,321 | B1 * | 9/2003 | Ellingsen ............. A61C 8/0013 428/469 |
| 6,698,110 | B1 | 3/2004 | Robbins |
| 6,782,642 | B2 | 8/2004 | Knoche et al. |
| 6,855,743 | B1 | 2/2005 | Gvozdic |
| 6,874,251 | B2 | 4/2005 | Moretti |
| 6,922,918 | B2 | 8/2005 | Issler |
| 6,948,264 | B1 | 9/2005 | Lyden |
| 6,949,271 | B2 | 9/2005 | Shannon et al. |
| 7,020,988 | B1 | 4/2006 | Holden et al. |
| 7,169,720 | B2 | 1/2007 | Etchells et al. |
| 7,373,739 | B2 | 5/2008 | Doerer et al. |
| 7,451,511 | B2 | 11/2008 | Ellis et al. |
| 7,451,557 | B2 | 11/2008 | McDonald et al. |
| 7,594,345 | B2 | 9/2009 | Fusco |
| 7,752,775 | B2 | 7/2010 | Lyden |
| 7,785,521 | B1 | 8/2010 | Chen |
| 7,814,687 | B2 | 10/2010 | Cook et al. |
| 7,832,120 | B2 | 11/2010 | Jung |
| 7,845,096 | B2 | 12/2010 | Ellis et al. |
| 7,854,076 | B2 | 12/2010 | Keppler et al. |
| 8,110,242 | B2 | 2/2012 | Hawkins et al. |
| 8,291,617 | B2 | 10/2012 | Halberstadt et al. |
| 8,303,977 | B2 | 11/2012 | Kuzma et al. |
| 8,609,766 | B2 | 12/2013 | Bette |
| 8,791,200 | B2 | 7/2014 | Köcher et al. |
| 8,796,394 | B2 | 8/2014 | Messersmith et al. |
| 8,853,289 | B2 | 10/2014 | Smith et al. |
| 8,906,497 | B2 | 12/2014 | Marchgraber et al. |
| 9,139,684 | B2 | 9/2015 | Coneski et al. |
| 9,206,114 | B1 | 12/2015 | Coneski et al. |
| 9,392,841 | B2 | 7/2016 | Walker et al. |
| 9,456,654 | B2 | 10/2016 | Dyer et al. |
| 10,051,913 | B2 | 8/2018 | Dyer et al. |
| 10,064,447 | B2 | 9/2018 | Wright et al. |
| 10,070,685 | B2 | 9/2018 | Walker et al. |
| 10,076,154 | B2 | 9/2018 | Walker et al. |
| 10,076,155 | B2 | 9/2018 | Dyer et al. |
| 10,076,156 | B2 | 9/2018 | Dyer et al. |
| 10,076,157 | B2 | 9/2018 | Wright et al. |
| 10,076,158 | B2 | 9/2018 | Wright et al. |
| 10,085,513 | B2 | 10/2018 | Dyer et al. |
| 10,092,062 | B2 | 10/2018 | Wright et al. |
| 10,130,140 | B2 | 11/2018 | Dyer et al. |
| 2001/0053897 | A1 | 12/2001 | Frate et al. |
| 2002/0116843 | A1 | 8/2002 | Harrison |
| 2002/0152638 | A1 | 10/2002 | Safdeye et al. |
| 2002/0188057 | A1 | 12/2002 | Chen |
| 2003/0074718 | A1 | 4/2003 | English |
| 2003/0213148 | A1 | 11/2003 | Knowles |
| 2003/0226283 | A1 | 12/2003 | Braunschweiler |
| 2004/0020080 | A1 | 2/2004 | Cox et al. |
| 2004/0143180 | A1 * | 7/2004 | Zhong ................ A61K 49/1896 600/410 |
| 2004/0147188 | A1 | 7/2004 | Johnson et al. |
| 2004/0255362 | A1 | 12/2004 | Soerens et al. |
| 2005/0075027 | A1 | 4/2005 | Etchells et al. |
| 2005/0288440 | A1 | 12/2005 | Chou et al. |
| 2006/0035030 | A1 | 2/2006 | Fan |
| 2006/0141186 | A1 | 6/2006 | Janssen et al. |
| 2007/0017124 | A1 | 1/2007 | Koo et al. |
| 2007/0124960 | A1 | 6/2007 | Friedman |
| 2007/0141306 | A1 | 6/2007 | Kasai et al. |
| 2008/0120869 | A1 | 5/2008 | Roy et al. |
| 2008/0155857 | A1 | 7/2008 | Rosen |
| 2008/0241371 | A1 | 10/2008 | Havelka et al. |
| 2008/0314287 | A1 | 12/2008 | Clark et al. |
| 2009/0061744 | A1 | 3/2009 | Bajaj |
| 2009/0084477 | A1 | 4/2009 | Sandstrom et al. |
| 2009/0090031 | A1 | 4/2009 | Jung |
| 2009/0234039 | A1 | 9/2009 | Schuette et al. |
| 2009/0313855 | A1 | 12/2009 | Yoshida et al. |
| 2010/0048752 | A1 | 2/2010 | Vignola et al. |
| 2010/0083534 | A1 | 4/2010 | Howlett |
| 2010/0109200 | A1 | 5/2010 | Cox et al. |
| 2010/0113733 | A1 | 5/2010 | Cox et al. |
| 2010/0146824 | A1 | 6/2010 | Sensini |
| 2010/0154253 | A1 | 6/2010 | Imazato et al. |
| 2010/0215707 | A1 | 8/2010 | McDonald et al. |
| 2010/0323573 | A1 | 12/2010 | Chu et al. |
| 2011/0008612 | A1 | 1/2011 | Lee |
| 2011/0112236 | A1 | 5/2011 | Ding |
| 2011/0287929 | A1 | 11/2011 | Smith et al. |
| 2012/0088602 | A1 | 4/2012 | Morken |
| 2012/0148778 | A1 | 6/2012 | Dawkins |
| 2012/0151805 | A1 | 6/2012 | Polegato |
| 2012/0210608 | A1 | 8/2012 | Baker et al. |
| 2012/0216423 | A1 | 8/2012 | Lyden |
| 2012/0216424 | A1 | 8/2012 | Lyden |
| 2012/0260535 | A1 | 10/2012 | Tsang |
| 2012/0312192 | A1 | 12/2012 | Detty et al. |
| 2013/0109804 | A1 | 5/2013 | Kusaka et al. |
| 2013/0255103 | A1 | 10/2013 | Dua et al. |
| 2013/0260104 | A1 | 10/2013 | Dua et al. |
| 2013/0260629 | A1 | 10/2013 | Dua et al. |
| 2013/0340295 | A1 | 12/2013 | Adami et al. |
| 2014/0024768 | A1 | 1/2014 | Coneski et al. |
| 2014/0075791 | A1 | 3/2014 | Smith et al. |
| 2014/0217636 | A1 | 8/2014 | Skaja et al. |
| 2015/0141539 | A1 | 5/2015 | Lee |
| 2015/0307745 | A1 | 10/2015 | Popa et al. |
| 2015/0353474 | A1 | 12/2015 | Coneski et al. |
| 2015/0353741 | A1 | 12/2015 | Liao |
| 2016/0058107 | A1 | 3/2016 | Walker et al. |
| 2016/0136912 | A1 | 5/2016 | Le et al. |
| 2016/0286905 | A1 | 10/2016 | Schiller |
| 2016/0295959 | A1 | 10/2016 | Dyer et al. |

FOREIGN PATENT DOCUMENTS

| | | |
|---|---|---|
| CN | 1890097 | 1/2007 |
| CN | 201157028 | 12/2008 |

(56) References Cited

FOREIGN PATENT DOCUMENTS

| | | |
|---|---|---|
| CN | 201360601 | 12/2009 |
| CN | 201445011 | 5/2010 |
| CN | 101801601 A | 8/2010 |
| CN | 101873812 | 10/2010 |
| CN | 101953525 | 1/2011 |
| CN | 101953534 | 1/2011 |
| CN | 102038315 A | 5/2011 |
| CN | 102250407 A | 11/2011 |
| CN | 102595949 A | 7/2012 |
| CN | 103357062 A | 10/2013 |
| CN | 103757744 A | 4/2014 |
| CN | 203952576 U | 11/2014 |
| CN | 104549961 | 4/2015 |
| DE | 4138941 | 6/1993 |
| DE | 29602823 | 4/1996 |
| DE | 102013221204 | 4/2015 |
| EP | 1894482 | 4/2008 |
| EP | 2030517 | 3/2009 |
| EP | 2462908 | 6/2012 |
| EP | 2292113 | 12/2012 |
| GB | 2313537 | 12/1997 |
| JP | H06253905 | 9/1994 |
| JP | H08258511 | 10/1996 |
| JP | H105005 | 1/1998 |
| JP | 2000166609 | 6/2000 |
| JP | 2000308501 | 11/2000 |
| JP | 2002325601 | 11/2002 |
| JP | 2005111691 | 4/2005 |
| JP | 2008260889 | 10/2008 |
| JP | 2010099332 | 5/2010 |
| JP | 4864227 | 2/2012 |
| KR | 100750324 | 8/2007 |
| KR | 20090124313 A | 12/2009 |
| KR | 101232846 | 6/2012 |
| KR | 20120124616 | 11/2012 |
| TW | 377281 B | 12/1999 |
| TW | 201002788 A | 1/2010 |
| WO | 0043449 | 7/2000 |
| WO | 0043449 A1 | 7/2000 |
| WO | 2005000061 | 1/2005 |
| WO | 2006015325 | 2/2006 |
| WO | 2007090245 | 8/2007 |
| WO | 2007135069 | 11/2007 |
| WO | 2013106658 | 7/2013 |
| WO | 2014025161 A1 | 2/2014 |
| WO | 2014126643 A1 | 8/2014 |

OTHER PUBLICATIONS

Invitation to Pay Additional Fees and Communication Relating to the Results of the Partial International Search for International Application No. PCT/US2015/047081, dated Nov. 26, 2015 (5 pages).
Dyson, R.W. "Specialty Polymers" Blackie & Son Ltd. (1987).
Retrieved from the Internet: URL:https://en.wikipedia.org/wiki/Gel#Hydrogels [retrieved on Aug. 24, 2016].
Traubel, H. "New Materials Permeable to Water Vapor" Springer; DOI: 10.1007/978-3-642-59978-1.
Lubrizol Estane® MVT 70AT3 Thermoplastic Polyurethane, Moisture Vapor Transmission.
Paleos, "What are Hydrogels?", 2012, p. 1-4, acquired from http://pittsburghplastics.com/assets/files/What%20Are%v 20Hydrogels.pdf.
Alf et al., Chemical vapor deposition of conformal, functional, and responsive polymer films, Adv. Mater., 22(18):1993-2027 (2010).
Arkema, Pebax® Polyether Block Am ides brochure, applicant's internal files Jun. 22, 2015.
Chen et al., An new avenue to nonfouling materials, Adv. Mater., 20(2):335-8 (2008).
European Patent Application GB1515179.8, European Search Report dated Mar. 22, 2016.
Garcia, M.A., "Patent Picks: Marine Coating Technologies," Chemical & Engineering News, 94(4):34 (Jan. 25, 2016).
Jiang et al.,Ultralow-fouling, functionalizable, and hydrolyzable zwitterionic materials and their derivatives for biological applications, Adv. Mater., 22(9):920-32 (2010).
Lee et al., Mechanical properties of amphiphilic urethane acrylate ionomer hydrogels having heterophasic gel structure, *coli*. Polymer Sci., 277(2-3):265-9 (1999).
Lubrizol Corporation, "Medical Device Solutions," Brochure (2014).
Lubrizol Corporation, "Tecophilic Extrusion Grade," Technical Data Sheet(2013).
Lubrizol Corporation, "Tecophilic Hydrogel," Technical Data Sheet (2013).
Lubrizol Corporation, "Tecophilic Solution Grade," Technical Data Sheet(2013).
Lubrizol Corporation, Your Link to: Advanced Wound Care Brochure (Sep. 2013).
PCT Patent Application PCT/US2015/047081 filed on Aug. 27, 2015, International Search Report and Written Opinion dated Mar. 22, 2016.
PCT Patent Application PCT/US2015/047082 filed on Aug. 27, 2015, International Search Report and Written Opinion dated Nov. 26, 2015.
PCT Patent Application PCT/US2015/047083 filed on Aug. 27, 2015, International Search Report and Written Opinion dated Nov. 26, 2015.
PCT Patent Application PCT/US2015/047084 filed on Aug. 27, 2015, International Search Report and Written Opinion dated Nov. 27, 2015.
PCT Patent Application PCT/US2015/047086 filed on Aug. 27, 2015, International Search Report and Written Opinion dated Nov. 26, 2015.
PCT Patent Application PCT/US2015/047087 filed on Aug. 27, 2015, International Search Report and Written Opinion dated Dec. 8, 2015.
Salerno-Kochan et al., "Materials Used in Functional Outerwear—Characteristics and Customer Preferences," in Science in Research and Practice, pp. 159-167 (Eds. Choch6f Andrzej, Sep. 2014).
Shao et al., "Difference in hydration between carboxybetaine and sulfobetained", J. Phys. Chem. B, 114(49):16625-31 (2010).
U.S. Appl. No. 14/814,214, filed Jul. 30, 2015, Notice of Allowance dated Aug. 10, 2016.
U.S. Appl. No. 14/814,219, filed Jul. 30, 2015, Notice of Allowance dated Mar. 31, 2016.
Wikipedia: "Glass transition," XP002751026, retrieved on Dec. 4, 2015, from https://en.wikipedia.org/wiki/Giass_transition, modified Oct. 3, 2015 (11 pages).
Yang et al., The effect of lightly crosslinked poly(carboxybetained) hydrogel coating on the performance of sensors in whole blood, Biomaterials, 33:7945-51 (2012).
Zwitter Technology: a new technology platform for biofouling control, Seattle,Washington, Jan. 10, 2014.

* cited by examiner

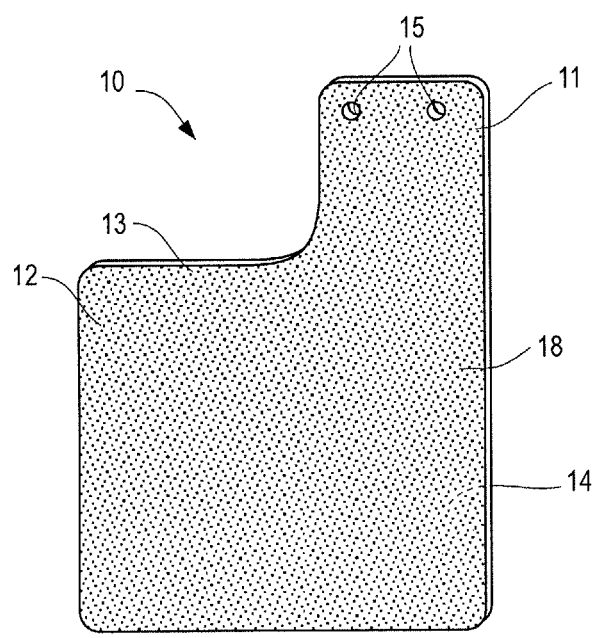

ARTICLES WITH SOIL-SHEDDING PERFORMANCE

FIELD

The present disclosure relates to articles of manufacture and components thereof that are used in conditions conducive to the accumulation of soil on the articles or components.

BACKGROUND

Articles of various types are used for a variety of activities where the articles frequently are exposed to soil during use and thus often accumulate soil (e.g., wet or moist inorganic materials such as mud, dirt, and gravel, wet or moist organic material such as grass, turf, and excrement, and wet or moist combinations of inorganic and organic materials) when the articles are used under conditions where soil is present.

For example, when the articles are used on unpaved surfaces, surfaces of the articles can accumulate soil: the soil on the articles can accumulate from direct contact with soil or from soil splattering on the articles. For example, components of a vehicle can accumulate soil due to splattering from a roadway or surface being traveled over. Likewise, objects used in playgrounds, in construction areas, or the garden can be subject to exposure to soil in the area of use by splattering or direct contact with unpaved surfaces.

BRIEF DESCRIPTION OF THE DRAWINGS

For a more complete understanding of the disclosure, reference should be made to the following detailed description and accompanying drawings wherein:

FIG. 1 is a view of a hydrogel-containing material defining an external surface of a mud flap.

DESCRIPTION

Figure 2A:
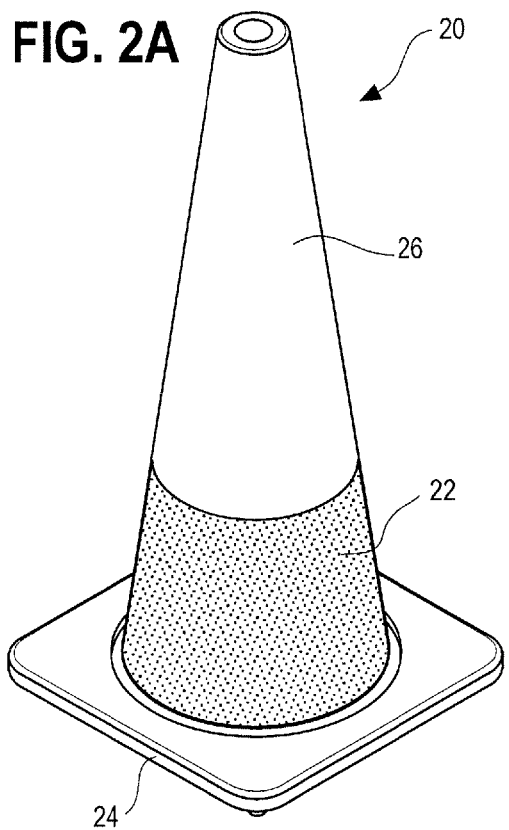
FIG. 2A is a view of a hydrogel-containing material defining a portion of the external surface of a traffic cone.

The present disclosure is directed to an article of manufacture, or components thereof having surface-defining materials that are capable of taking up water. It has been discovered that particular materials comprising a polymeric hydrogel when disposed on an externally-facing surface of an article can be effective at preventing or reducing the accumulation of soil on externally-facing surfaces of the article. Additionally, it has been found that the selection of certain polymeric hydrogel materials, in terms of their physical characteristics as measured using the test methods described herein, is useful to achieve specific performance benefits for the articles as disclosed herein. Accordingly, the present disclosure describes articles, components of articles, use of these polymeric hydrogel materials in articles and components of articles, as well as methods of manufacturing and using the articles and components of articles. The material which includes the polymeric hydrogel defines at least a portion of a surface of the articles. In other words, the material defines at least a portion of an exterior surface of the component or article that is externally-facing. This application is related to the U.S. Provisional Application (Nike Ref. No. 150747US01, 62/199,083), filed Jul. 30, 2015, incorporated herein by reference in its entirety.

As can be appreciated, preventing or reducing soil accumulation on articles can provide many benefits. Preventing or reducing soil accumulation on articles during use on unpaved, muddy, or wet surfaces can significantly affect the weight of accumulated soil adhered to the article during use. Preventing or reducing soil accumulation on an article can help improve safety. Further, preventing or reducing soil accumulation on the article can make it easier to clean the article following use.

In a first aspect, the present disclosure is directed to an article of manufacture. The article includes a first external surface and a material defining at least a portion of the first external surface. The material defining at least a portion of the first external surface includes a polymeric hydrogel. The hydrogel-containing material has a water uptake capacity at 24 hours greater than 40% by weight, as characterized by the Water Uptake Capacity Test with the Article Sampling Procedure. The hydrogel-containing material can be present in an area of the first external surface which is expected to collect, or be exposed to, soil during use of the article.

The article can be a first component configured to be secured to a second component as part of a second article of manufacture such that the first external surface of the first component is externally facing on the second article of manufacture. The first component can be a component which prevents or reduces soil accumulation such that the second article of manufacture retains at least 10% less soil by weight as compared to a third article of manufacture which is identical to the second article except that the third article is free of the material comprising a polymeric hydrogel. The first component can also be a component which prevents or reduces soil accumulation such that the second article of manufacture retains at least 15% less soil by weight as compared to a third article of manufacture which is identical to the second article except that the third article is free of the material comprising a polymeric hydrogel. The hydrogel-containing material may reduce a force of adhesion of accumulated soil on the first component such that at least 10% less force is required to dislodge the accumulated soil from the first component of the second article as compared to a third article of manufacture which is identical to the second article except that the third article of manufacture is free of the hydrogel-containing material.

In a second aspect, the present disclosure is directed to a second article of manufacture comprising a first component having a first external surface where a material defines at least a portion of the first external surface in an area expected to collect, or be exposed to, soil during use of the article, where the material compositionally comprises a polymeric hydrogel, and has a water uptake capacity at 24 hours greater than 40% by weight, as characterized by the Water Uptake Capacity Test with the Article Sampling Procedure.

In a third aspect, the present disclosure is directed to methods of manufacturing the articles of the present invention comprising receiving a first component having a first external surface and a material defining at least a portion of the first external surface compositionally comprising a polymeric hydrogel, wherein the hydrogel-containing material has a water uptake capacity at 24 hours greater than 40% by weight, as characterized by the Water Uptake Capacity Test with the Article Sampling Procedure, receiving a second component, and securing at least a portion of the first component having the hydrogel-containing material to the second component to form the article such that the first external surface of the first component is externally facing on the article.

In a fourth aspect, the present disclosure is directed to methods of deflecting soil from an article having a first external surface and having a material defining at least a portion of the first external surface compositionally comprising a polymeric hydrogel, wherein the hydrogel-containing material has a water uptake capacity at 24 hours greater than 40% by weight, as characterized by the Water Uptake Capacity Test with the Article Sampling Procedure, the method comprising wetting the hydrogel-containing material and exposing the hydrogel-containing material to soil.

In another aspect, the present disclosure is directed to use of a material compositionally comprising a polymeric hydrogel, the hydrogel-containing material having a water uptake capacity at 24 hours greater than 40% by weight, as characterized by the Water Uptake Capacity Test with the Article Sampling Procedure, to deflect soil from a first external surface of an article, by providing the hydrogel-containing material on at least a portion of the first external surface of the article, wetting the hydrogel-containing material, and exposing the hydrogel-containing material to soil.

The method may further include pressing the wetted hydrogel-containing material to at least partially compress the wetted hydrogel-containing material and releasing the article from contact to release the compression from the wet hydrogel-containing material.

As discussed below, it has been found that these articles, and components thereof, can prevent or reduce the accumulation of soil on their surfaces during use on unpaved, muddy, wet, or soiled surfaces. As used herein, the term "soil" can include any of a variety of wet or moist materials commonly present on a ground, roadway, walkway, construction area, garden, plumbing fixture, or playing surface and which might otherwise adhere to an external surface of an article. Soil can include wet or moist inorganic materials such as mud, sand, dirt, and gravel; wet or moist organic matter such as grass, turf, leaves, other vegetation, and excrement; and combinations of wet or moist inorganic and organic materials such as clay.

While not wishing to be bound by theory, it is believed that the hydrogel-containing material of the present disclosure, as provided in any suitable form, including as films or coatings, when sufficiently wet with water (including water containing dissolved, dispersed or otherwise suspended substances) can provide compressive compliance and/or expulsion of water taken up by the hydrogel-containing material. In particular, it is believed that the compressive compliance of the hydrogel-containing material when wet, the expulsion of liquid from the hydrogel-containing material when wet, or more preferably both in combination, can disrupt the adhesion of soil to the article and cohesion of the soil particles to each other.

This disruption in the adhesion and/or cohesion of soil is believed to be a responsible mechanism for preventing (or otherwise reducing) the soil from accumulating on the surface of the article (due to the presence of the wet hydrogel-containing material), or at least allows the soil to be removed with less effort (e.g., easier to wipe, brush, or otherwise physically remove). As can be appreciated, preventing soil from accumulating on articles can provide numerous benefits, such as maintaining debris-free surfaces or preventing weight accumulation on the articles. As used herein "externally-facing" refers to the surface of a component which is intended to be externally-facing during use of the article, and not necessarily the surface which is externally-facing during various manufacturing steps.

As used herein, the term "hydrogel-containing material" refers to a material compositionally comprising a polymeric hydrogel.

As used herein, the term "film" includes one or more layers disposed on at least a portion of a surface, where the layer(s) can be provided as a single continuous segment on the surface or in multiple discontinuous segments on the surface, and is not intended to be limited by any application process (e.g., co-extrusion, injection molding, lamination, spray coating, etc.).

As used herein, the term "weight" refers to a mass value, such as having the units of grams, kilograms, and the like. Further, the recitations of numerical ranges by endpoints include the endpoints and all numbers within that numerical range. For example, a concentration ranging from 40% by weight to 60% by weight includes concentrations of 40% by weight, 60% by weight, and all water uptake capacities between 40% by weight and 60% by weight (e.g., 40.1%, 41%, 45%, 50%, 52.5%, 55%, 59%, etc . . . ).

As used herein, the term "receiving", such as for "receiving the component", when recited in the claims, is not intended to require any particular delivery or receipt of the provided item. Rather, the term "receiving" is merely used to recite items that will be referred to in subsequent elements of the claim(s), for purposes of clarity and ease of readability.

As used herein, the terms "about" and "substantially" are used herein with respect to measurable values and ranges due to expected variations known to those skilled in the art (e.g., limitations and variability in measurements).

As used herein, the terms "at least one" and "one or more of" an element are used interchangeably, and have the same meaning that includes a single element and a plurality of the elements, and may also be represented by the suffix "(s)" at the end of the element. For example, "at least one polyurethane", "one or more polyurethanes", and "polyurethane(s)" may be used interchangeably and have the same meaning.

The article of manufacture of the present disclosure may be designed for a variety of uses, such as transportation, vehicle safety, storage, recreation, leisure, waste disposal, construction, gardening, or traffic control.

Some articles of manufacture, or a component thereof, as disclosed herein, are intended for outdoor use on unpaved surfaces (in part or in whole), such as on a ground surface including one or more of wet or moist grass, turf, gravel, sand, dirt, clay, mud, and the like. However, other articles of manufacture and components thereof as disclosed herein are intended for indoor applications, such as indoor plumbing.

In specific examples, the article of manufacture is a plumbing article or a component of a plumbing article, a component of a vehicle, a transportation container or a component of a transportation container, a refuse container or a component of a refuse container, an article of construction equipment or a component of an article of construction equipment, an article of play equipment or a component of an article of play equipment, an article of landscaping equipment or a component of an article of landscaping equipment, or an article of furniture or a component of an article of furniture. For example, components/articles include a mud flap, a windshield wiper, a license plate, a rim of a wheel, a tire sidewall, a hubcap, a bumper, a side-view mirror, a piece of luggage, a cooler, a bag, including a mail delivery bag, a stroller, a mail delivery cart, a cone, a pylon, a sign, outdoor tape, a barricade, toys, outdoor play equipment and a toilet (including the bowl or tank).

FIGS. 1-18 illustrate examples of articles of manufacture having a hydrogel-containing material defining at least a portion of an external surface.

FIG. 1 illustrates a view of a mud flap 10 where a hydrogel-containing material 18 defines the mud flap surface 12. The mud flap 10 has a front face 12, a rear face 14 and a planar attachment tab 11. The front face 12 may be oriented toward a vehicle tire when mounted on a vehicle. The front face 12 or rear face 14 may have the hydrogel-containing material 18 in selected locations, or the hydrogel-containing material 18 may define an entire surface of the mud flap, as shown for the front face 12 in FIG. 1. The planar attachment tab 11 may extend from a top portion 13 of the mud flap 10. The planar attachment tab 11 may include a pair of attachment apertures 15 for attaching the mud flap to a vehicle. The mud flap 10 may be made of rubber or other suitable durable material. Alternatively, portions of the mud flap may be made from the material comprising the polymeric hydrogel as disclosed herein.

Figure 2B:
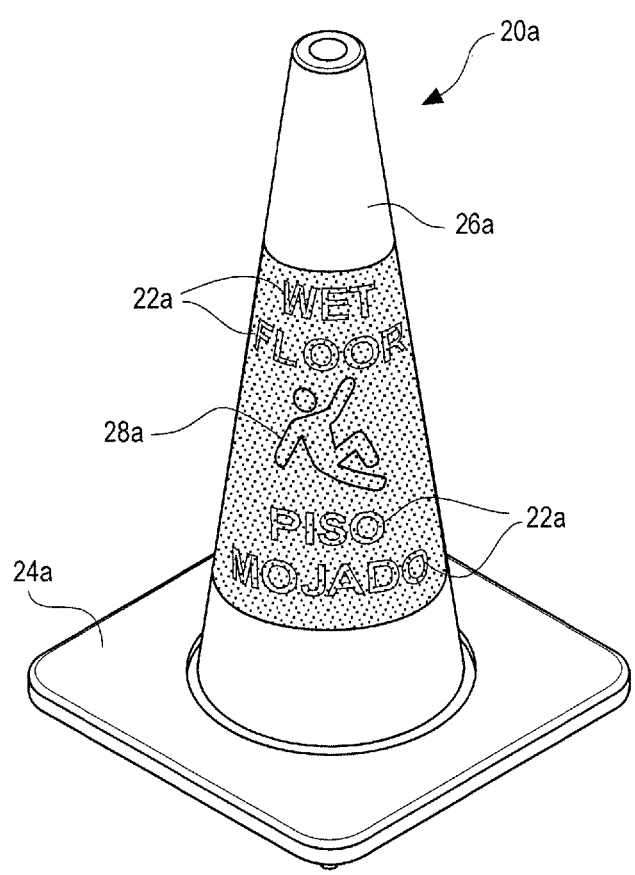
FIG. 2B is a view of a hydrogel-containing material defining a portion of the external surface of a traffic cone displaying a message.

FIG. 2A illustrates a traffic cone 20 having a hydrogel-containing material 22 defining a portion of the external surface 26. The traffic cone 20 may be made of concrete, polymer material (e.g., thermoplastic, polyvinylchlorides), or rubber. Traffic cone 20 is shown in a cone shape with a mostly square base 24, although the base and sides of the traffic cone may have other shapes (e.g., triangular base, pyramidal shaped cone). Traffic cone 20 may alternatively be referred to as a traffic pylon, road cone, highway cone, safety cone, or construction cone. As shown in FIG. 2B, the traffic cone 20a, having a base 24a, may bear images 28a or writings 22a on the external surface 26a to communicate a hazard warning. A hydrogel-containing material may define the entire exterior surface 26/26a of the traffic cone 20/20a, or may define selected portions of the exterior surface. For example, the images 28a and/or writings 22a may be composed of the hydrogel-containing material and the remainder of the surface 26a not so covered, or vice versa.

Figure 3:
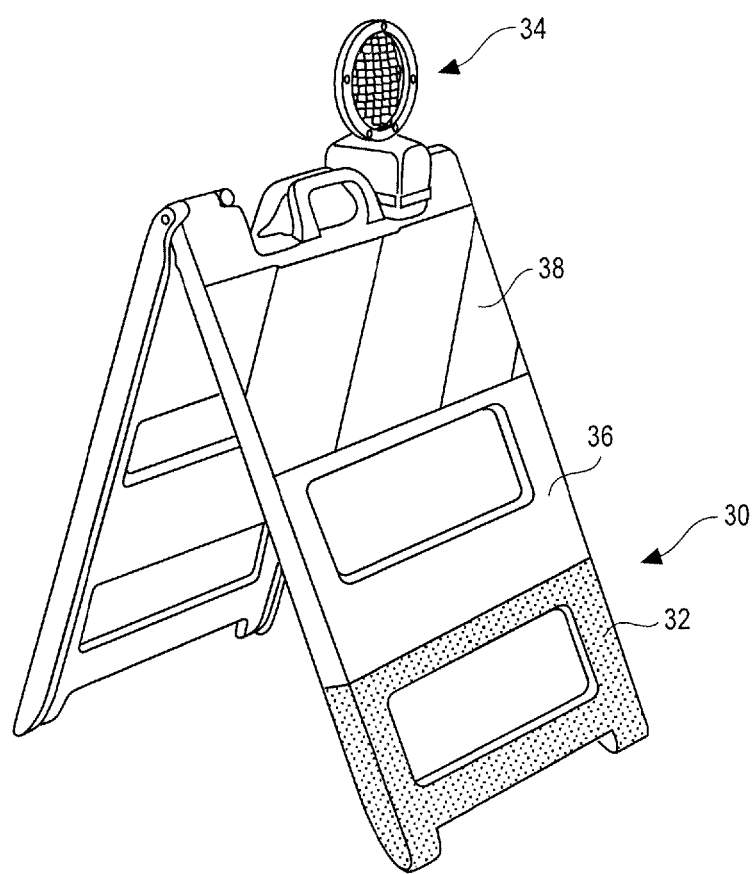
FIG. 3 is a view of a hydrogel-containing material defining a portion of the external surface of a barricade.

FIG. 3 illustrates a barricade 30, with an optional light 34, having a hydrogel-containing material 32 defining a portion of the external surface 36. Alternating orange and white diagonal stripes can be present in area 38 to communicate a hazard. Although the hydrogel-containing material defines only a lower portion of the barricade 30 in FIG. 3, the hydrogel-containing material may also define the remaining portions of the external surface 36. Barricade 30 is shown with a collapsible A-frame structure for illustration purposes only, as other configurations may also be used, such as a barrel, a sawhorse, or other commonly used forms.

Figure 4:
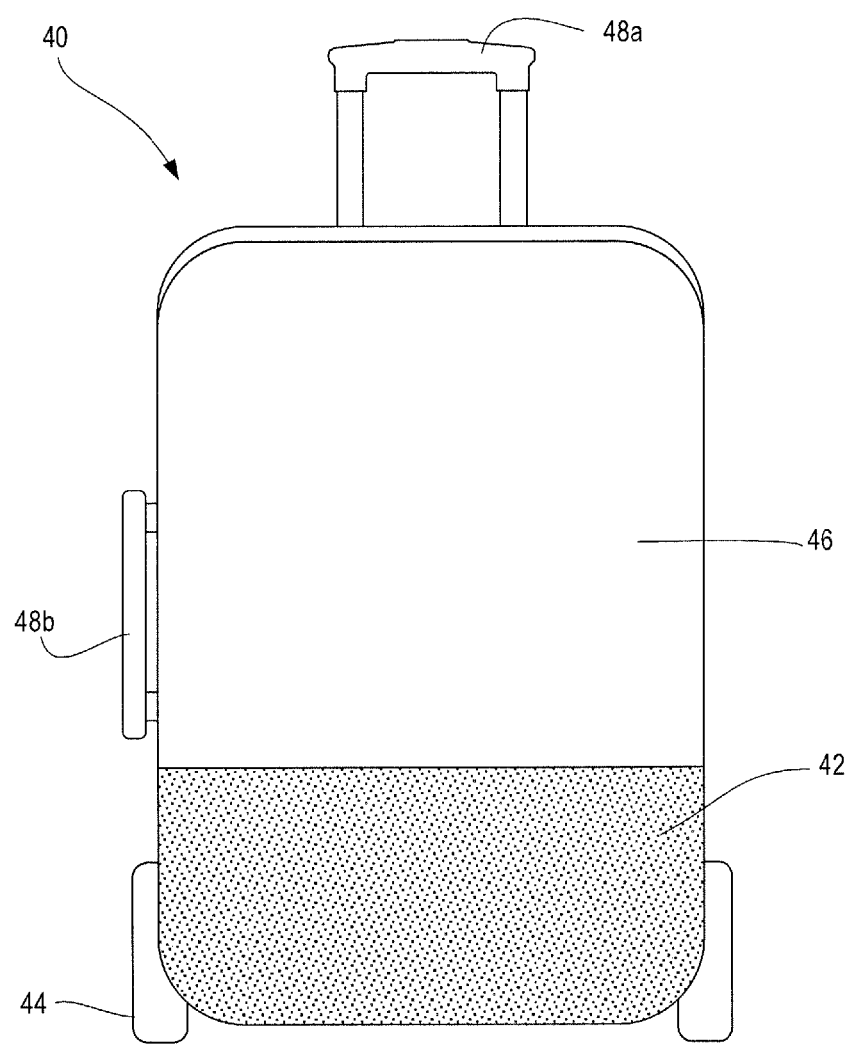
FIG. 4 is a view of a hydrogel-containing material defining a portion of the external surface of a suitcase.

FIG. 4 illustrates a piece of luggage, in the form of a wheeled suitcase 40. Suitcase 40 is shown with wheels 44 and handles 48a and 48b. Hydrogel-containing material 42 is shown defining a portion of external surface 46. The hydrogel-containing material may also be used with other forms of luggage such as any bag, case, or container to hold an article during transit (e.g., trunk, tote, purse, briefcase, mail delivery bag). Suitable materials for luggage include nylon, leather, polycarbonate, PVC, or other polymeric materials, to which the hydrogel-containing material can be adhered.

Figure 5:
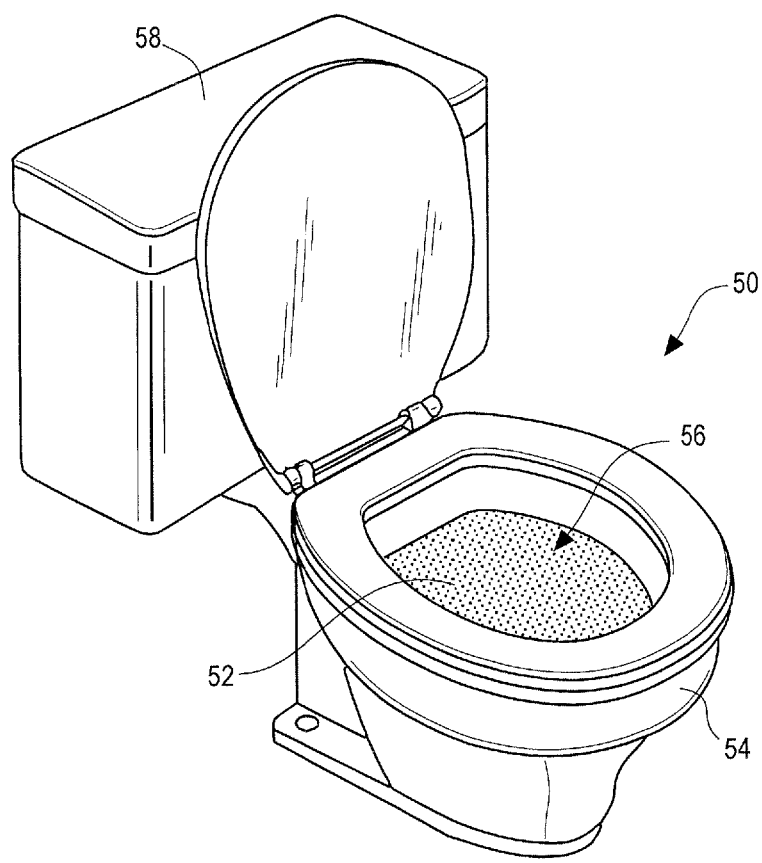
FIG. 5 is a view of a hydrogel-containing material defining a portion of the external surface of a toilet bowl.

FIG. 5 illustrates a plumbing fixture, specifically a toilet 50, with a bowl 54 and tank 58. In the interior of the bowl 54 is an external surface 56 shown with a hydrogel-containing material 52 defining a portion of the external surface 56. The hydrogel-containing material may also be used with other types of plumbing fixtures, such as bidets, fountains, sinks, etc. Suitable materials for plumbing fixtures include porcelain, ceramic, stone (e.g., marble, granite), enameled cast iron, vitreous china, metal, plastic. The hydrogel-containing material can be adhered to any of these surfaces.

Figure 6:
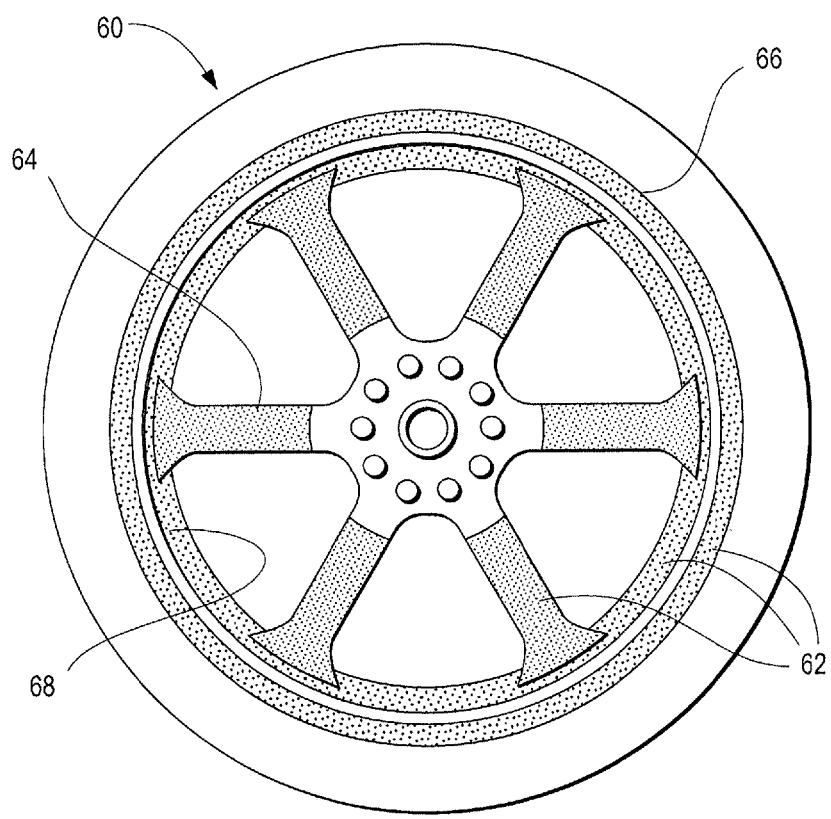
FIG. 6 is a view of a hydrogel-containing material defining a portion of the external surface of a tire side wall, wheel, and rim.

FIG. 6 illustrates a tire 60 mounted on a wheel 64, the wheel having a rim 68. A hydrogel-containing material 62 is shown defining a portion of a side wall 66 of the tire 60, the wheel 64, and the rim 68. Although a typical automobile tire is shown, the hydrogel-containing material may be used with tires from other types of vehicles (e.g., trucks, airplanes, bicycles, motorcycles, ATVs). Although not shown in FIG. 6, a hydrogel-containing material can also define a portion of the surface of a hubcap that would be externally facing when mounted on a vehicle.

Figure 7:
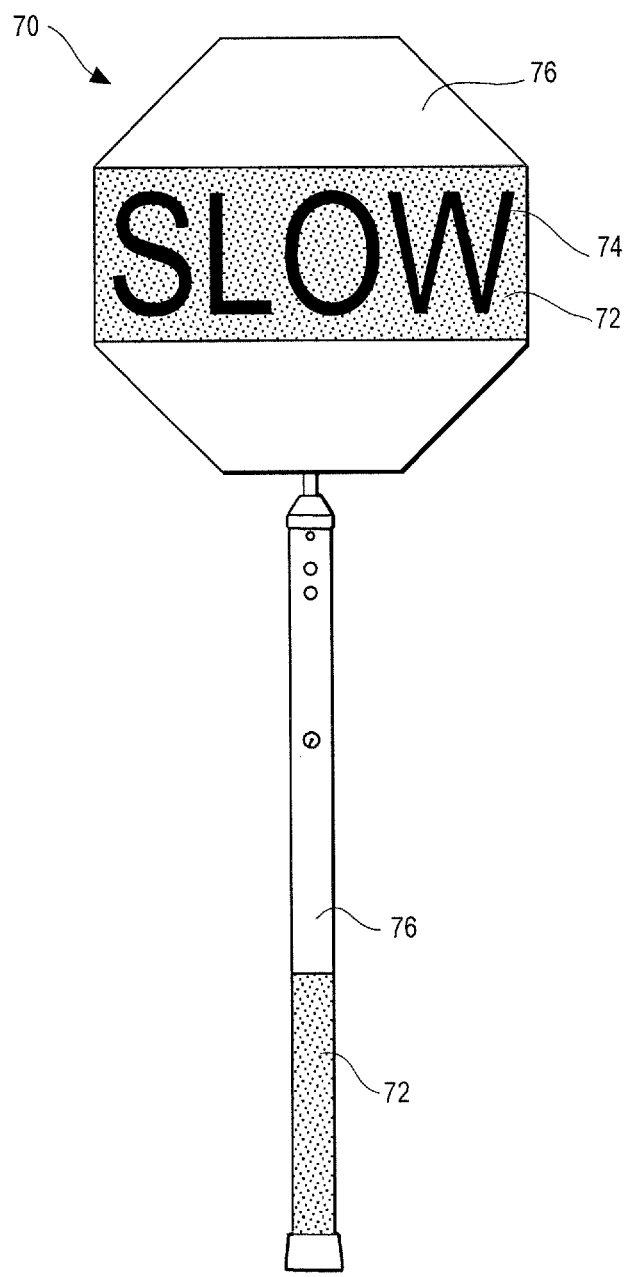
FIG. 7 is a view of a hydrogel-containing material defining a portion of the external surface of a sign.

FIG. 7 illustrates a sign, shown as a highway road sign 70. Sign 70 has an external surface 76 with a hydrogel-containing material 72 defining portions of the external surface. The message 74 of the sign may be composed of the hydrogel-containing material. Although a conventional highway road sign is shown, the sign may take other forms. For example, a barricade or traffic cone, as discussed above, may serve the dual purpose of a sign to convey information and to impede or direct the flow the traffic.

Figure 8:
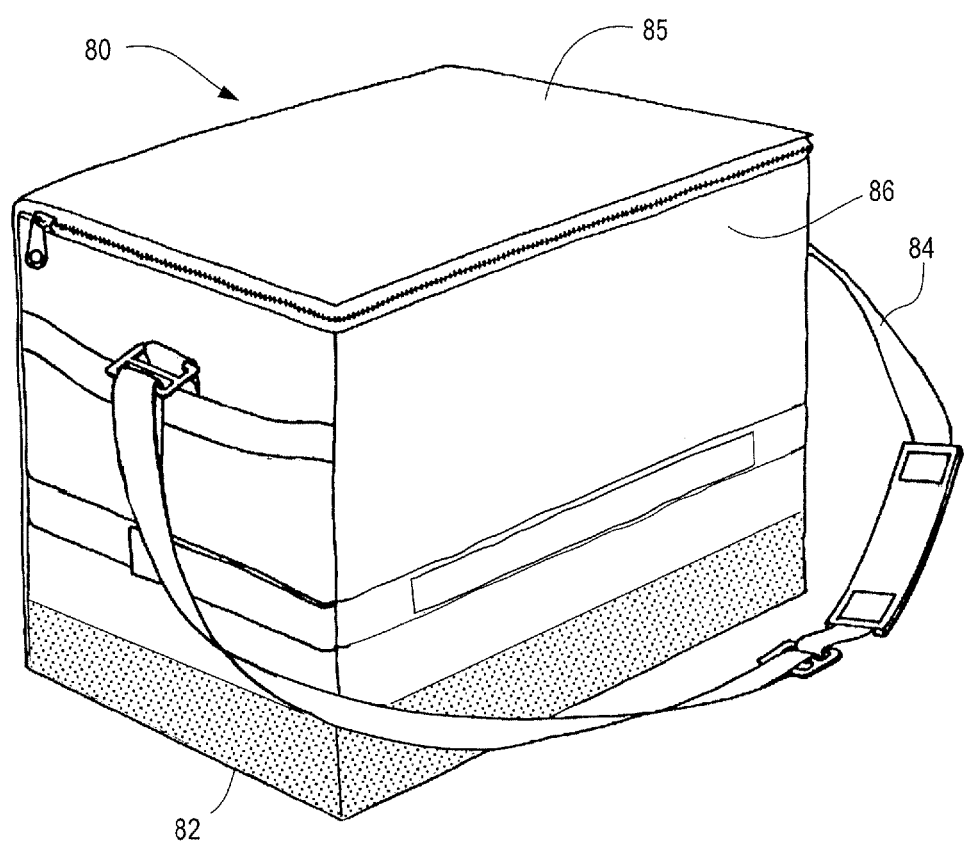
FIG. 8 is a view of a hydrogel-containing material defining a portion of the external surface of a cooler.

FIG. 8 illustrates a cooler 80 having a handle 84, a lid 85, an external surface 86 and a hydrogel-containing material 82 defining a portion of the external surface 86. As portable coolers are often used in the outdoors in areas likely to be exposed to soil and water, the hydrogel-containing material at the surface of a cooler can advantageously help maintain its surface free of contaminating soil. The term "cooler" includes any insulated container used for food or beverages. Suitable materials for coolers include metal, vinyl, plastics and foam (e.g., expanded polystyrene foam). The hydrogel-containing material can be adhered to any of these surfaces.

Figure 9:
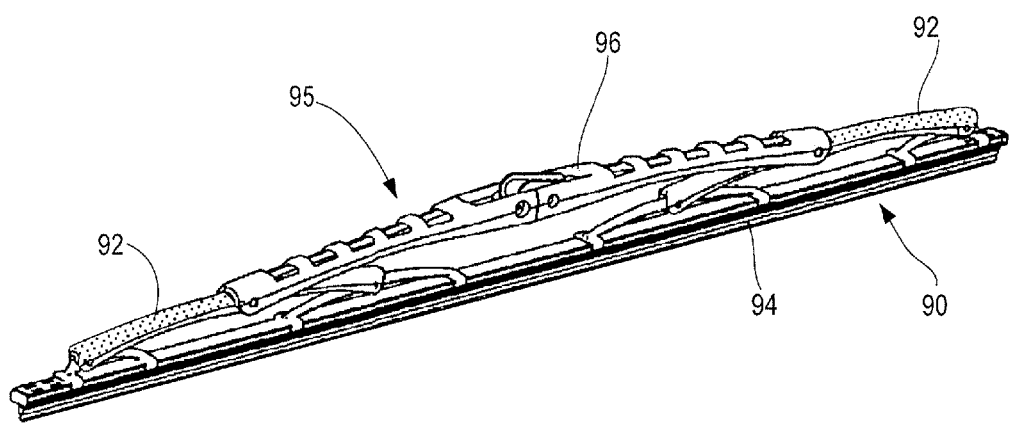
FIG. 9 is a view of a hydrogel-containing material defining a portion of the external surface of a windshield wiper.

FIG. 9 illustrates a windshield wiper 90 with a blade 94, an arm 95, an external surface 96 and a hydrogel-containing material 92 defining a portion of the external surface 96 on the arm 95. Although the hydrogel-containing material is shown on the arm 95, it also may define a portion of the surface of the blade 94. The surface of a windshield wiper blade is often made of rubber whereas the arm portion if often made of galvanized steel. The hydrogel-containing material can be adhered to either of these types of surfaces.

Figure 10:
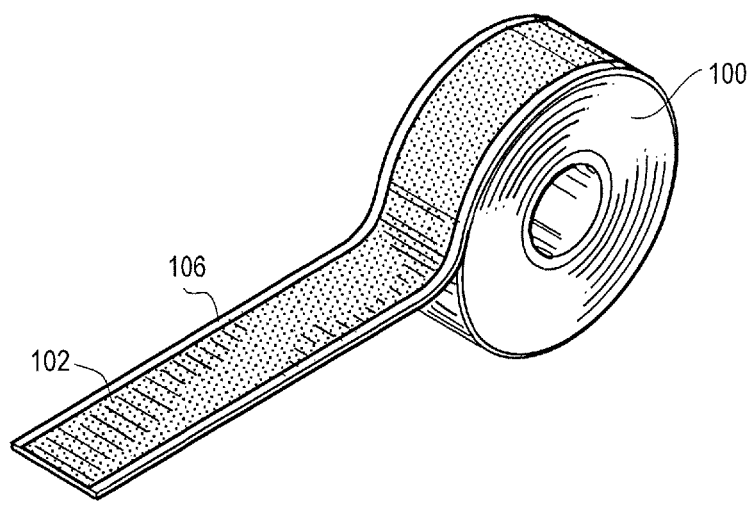
FIG. 10 is a view of a hydrogel-containing material defining a portion of the external surface of a roll of construction barricade tape.

FIG. 10 illustrates a roll of tape 100, which may be, for example construction barricade tape, barrier tape, hazard tape, caution tape etc. The tape 100 is shown with an external facing surface 106 having a hydrogel-containing material 102 defining a portion of the external surface 106. Construction barricade or hazard tape having a hydrogel-containing material at the surface provides the advantage over ordinary construction barricade or hazard tape of shedding soil that might otherwise obscure important information or a safety message on the tape. Suitable materials for making construction barricade/hazard tape include tear-proof plastic materials such as polyethylene, polypropylene, or nylon, to which a hydrogel-containing material can be adhered.

Figure 11:
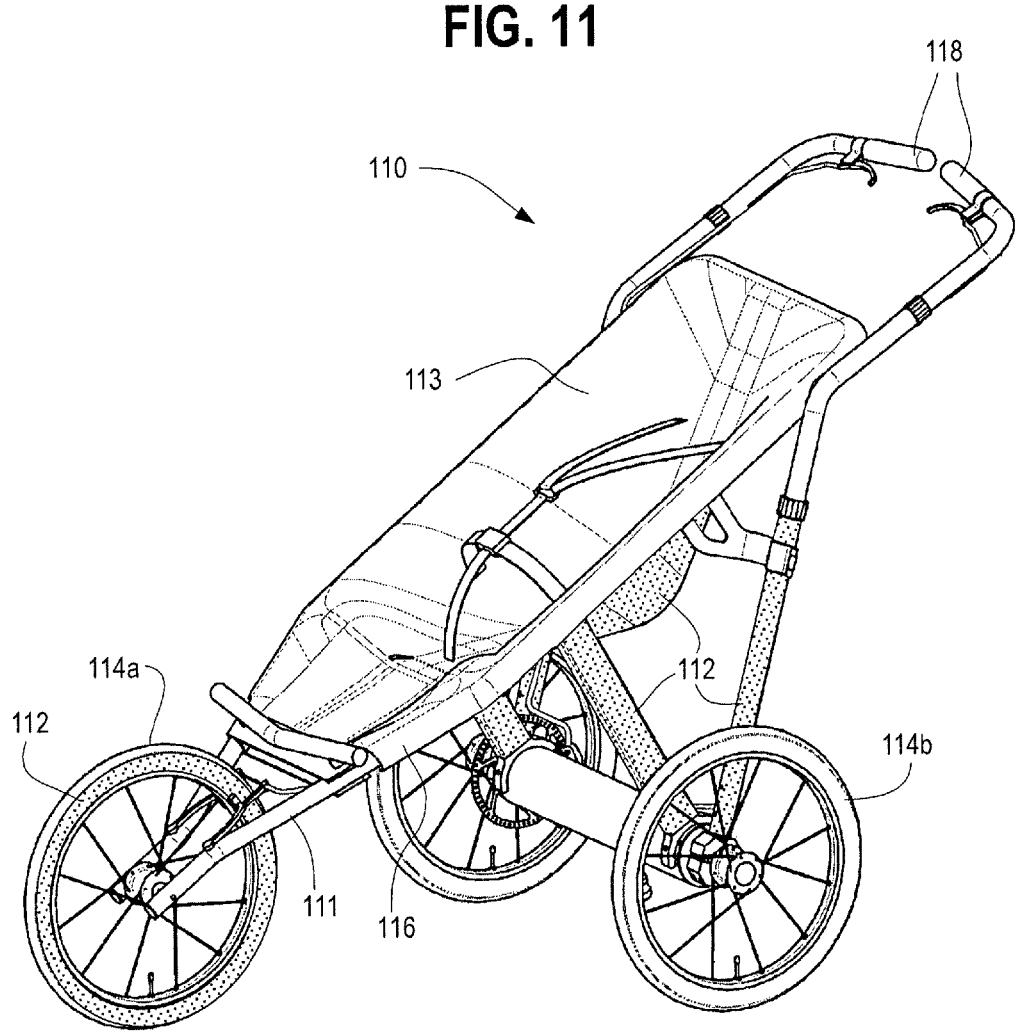
FIG. 11 is a view of a hydrogel-containing material defining a portion of the external surface of a stroller.

FIG. 11 illustrates a vehicle in the form of a stroller 110 having a frame, 111, seat 113, wheels 114a and 114b, and handles 118. A hydrogel-containing material 112 is shown defining portions of the external surface 116 and the surface of the wheel 114a. Although a three-wheeled stroller is shown, the hydrogel-containing material can be used with strollers having any number of wheels. Other suitable vehicle types include, for example, a mail delivery cart.

Figure 12:
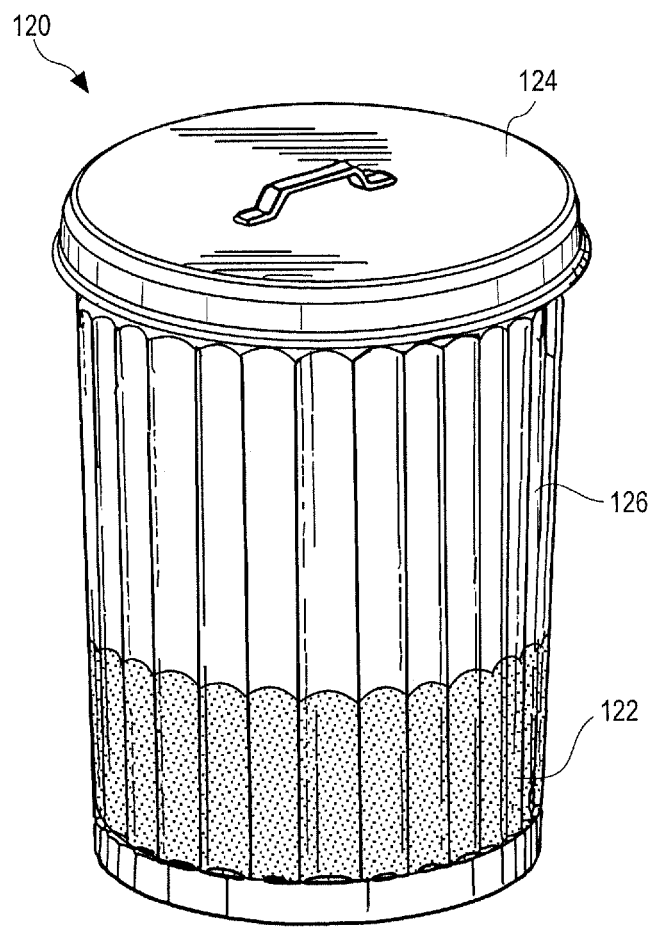
FIG. 12 is a view of a hydrogel-containing material defining a portion of the external surface of a trash can.

FIG. 12 illustrates a refuse container in the form of a garbage can 120 having a lid 124, an external surface 126, and a hydrogel-containing material 122 defining a portion of the external surface 126. Other types of refuse containers that can be used with the hydrogel-containing material include recycling bins or dumpsters, and may be wheeled or stationary, and are commonly made of metals or plastics, to which the hydrogel-containing material can be adhered.

Figure 13:
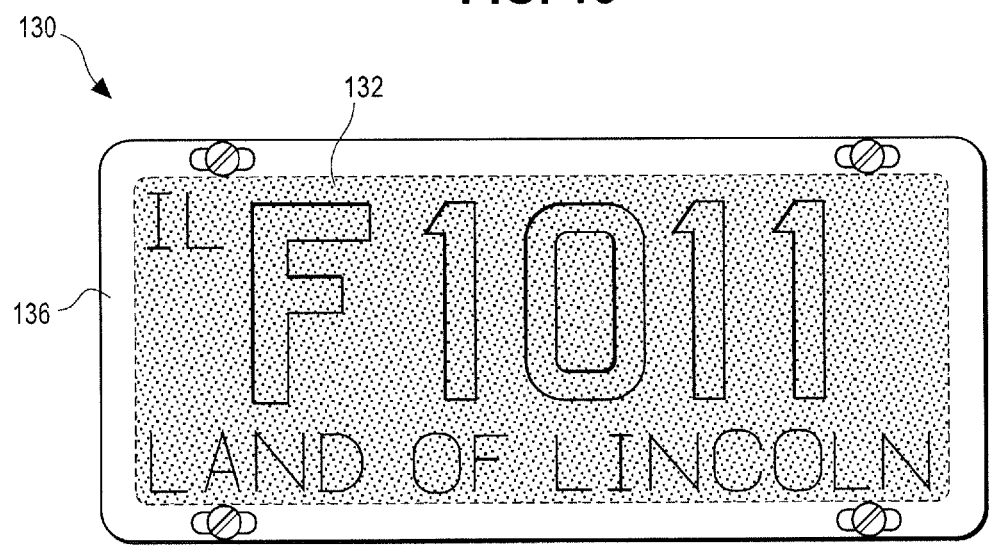
FIG. 13 is a view of a hydrogel-containing material defining a portion of the external surface of a license plate.

FIG. 13 illustrates a license plate 130 having hydrogel-containing material 132 defining a portion of an external surface 136 designed to face away from a vehicle. Depending on the particular license plate configuration, the hydrogel-containing material may also, or alternatively, define a portion of the back surface of a license plate. License plates having a hydrogel-containing material at the surface provide the advantage over an ordinary license plate of shedding soil that might otherwise obscure vehicle identification information. License plates are commonly made of metal, e.g., aluminum, to which a hydrogel-containing material can be adhered.

Figure 14:
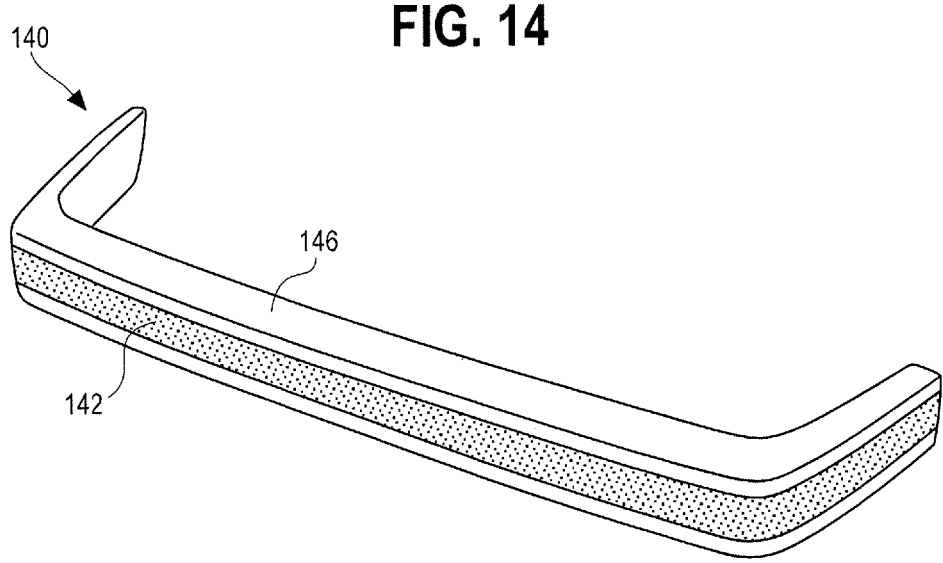
FIG. 14 is a view of a hydrogel-containing material defining a portion of the external surface of a bumper.

FIG. 14 illustrates a vehicle bumper 140 having a hydrogel-containing material 142 defining a portion of an external surface 146. Suitable materials for the external surface of a bumper, to which a hydrogel-containing material can be adhered, include metals like steel and aluminum, plastics (e.g., thermoplastic olefins, polycarbonates, polypropylenes, polyurethanes, polyamides, or blends of these), rubber, or fiberglass.

Figure 15:
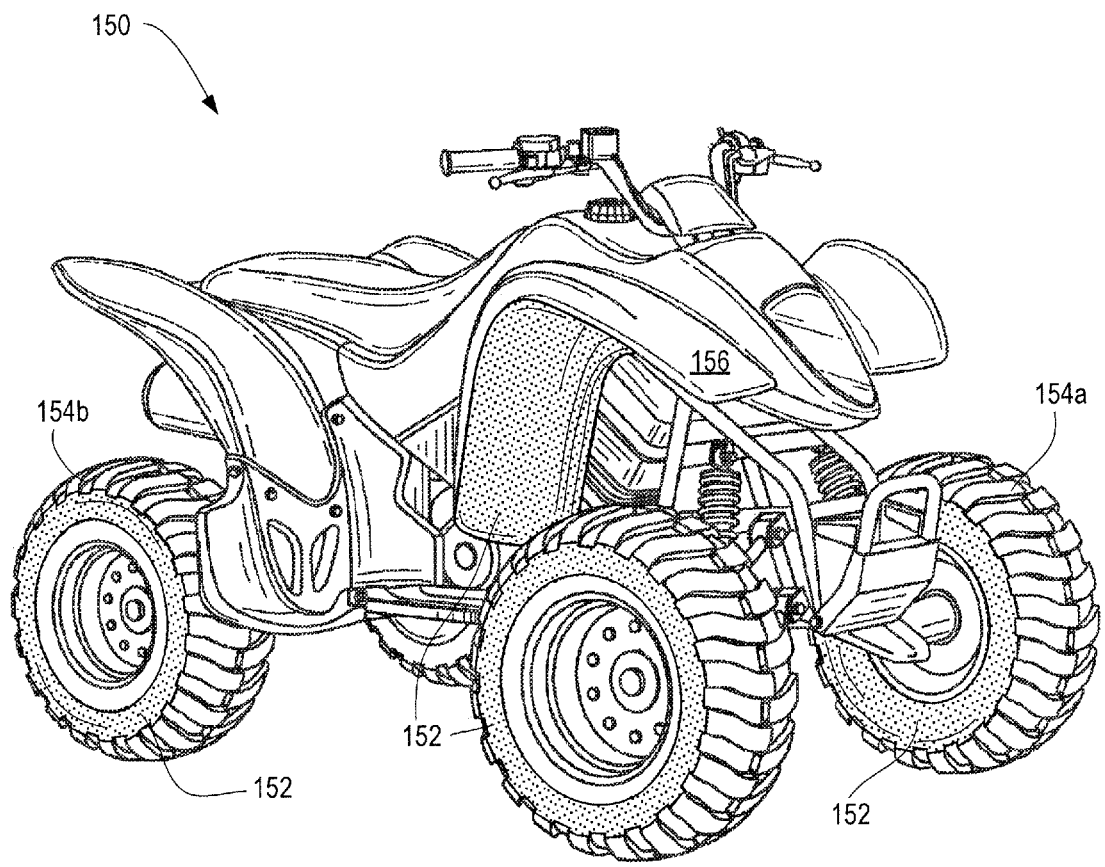
FIG. 15 is a view of a hydrogel-containing material defining a portion of the external surface of an all-terrain vehicle.

FIG. 15 illustrates a vehicle that is an all-terrain vehicle 150 having front and rear tires 154a/154b and a hydrogel-containing material 152 defining various locations on the external surface of the vehicle 150, such as on the underside of fender 156 or the side walls of the tires 154a/154b. Although an ATV with four wheels is shown, suitable ATVs may have other numbers of wheels (e.g., three wheels). The hydrogel-containing material can adhere to the material forming the fender, commonly plastics such as polyethylene or polypropylene, and the material forming the tires, such as rubber.

Figure 16:
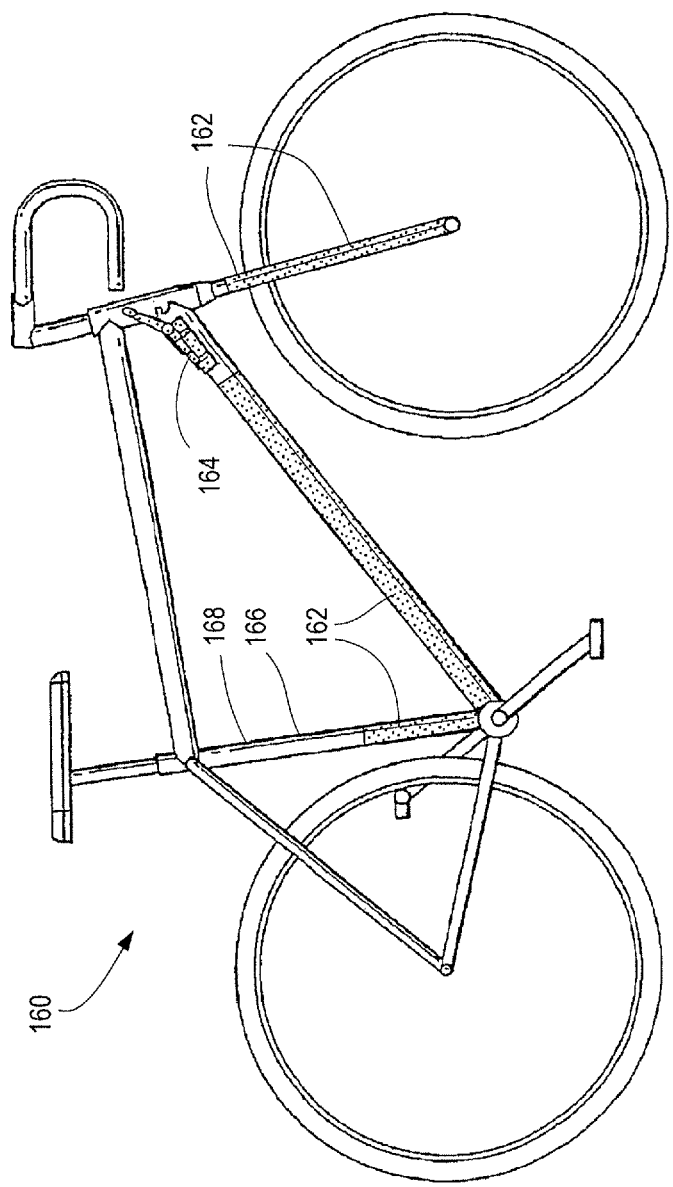
FIG. 16 is a view of a hydrogel-containing material defining a portion of the external surface of a bicycle.

FIG. 16 illustrates a vehicle that is a bicycle 160 having a frame 168, a mirror 164 and a hydrogel-containing material 162 defining portions of the external surface 166 of the frame 168 and the mirror 164. Although a vehicle with two wheels is shown, suitable vehicles include those with greater or lesser numbers of wheels. Suitable materials for the frame, to which the hydrogel-containing material can be adhered, include carbon steel, chrome molybdenum steel, aluminum, titanium, and carbon fiber.

Figure 17:
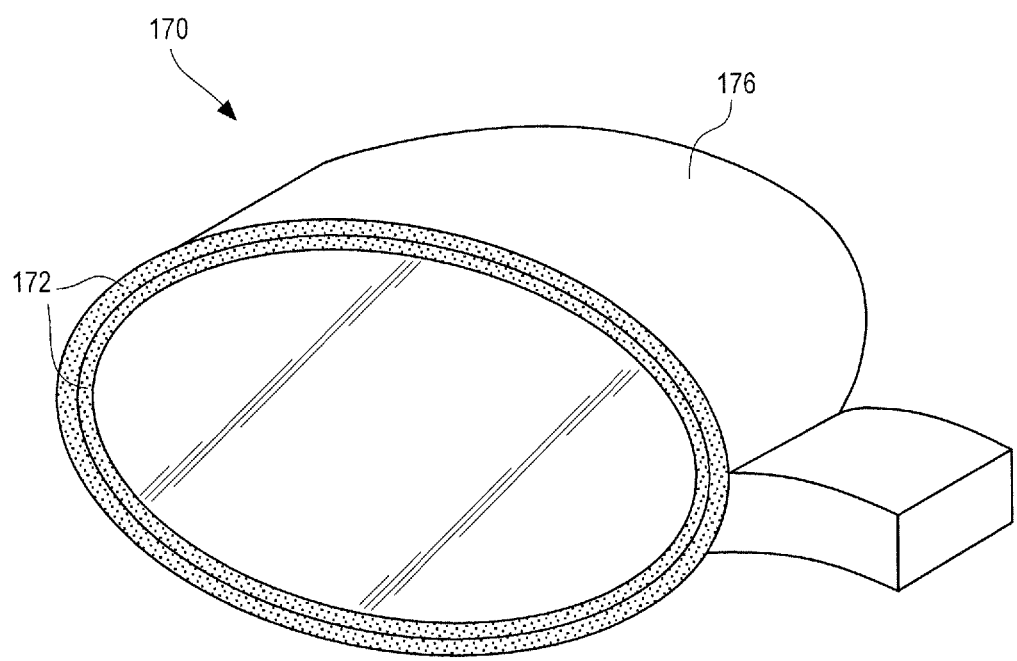
FIG. 17 is a view of a hydrogel-containing material defining a portion of the external surface of a side view mirror.

FIG. 17 illustrates a side view mirror 170 having a hydrogel-containing material 172 defining a portion of an external surface 176 of the mirror. The location of the hydrogel-containing material in FIG. 17 is purely for illustration purposes as it may be disposed elsewhere on a side view mirror, e.g., on at least a portion of a back surface of a side view mirror.

Figure 18:
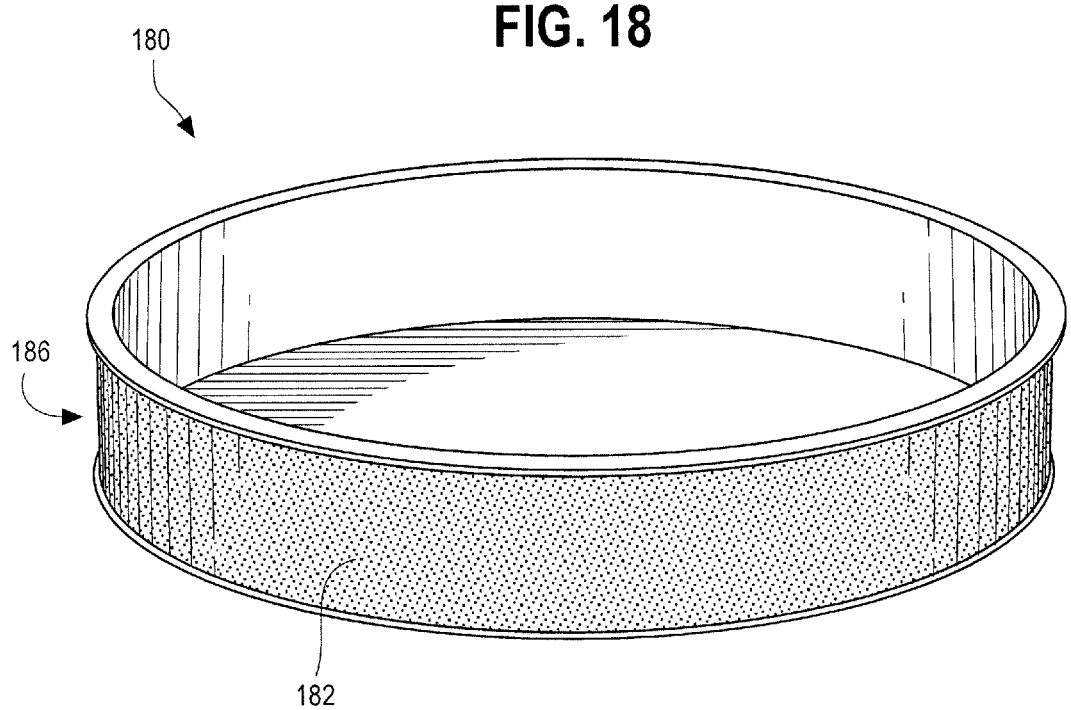
FIG. 18 is a view of a hydrogel-containing material defining a portion of the external surface of an above-ground swimming pool.

FIG. 18 illustrates play equipment in the form of an above-ground swimming pool 180 having a hydrogel-containing material 182 defining a portion of the external surface 186. Suitable materials for a swimming pool that a hydrogel-containing material can be adhered to include fiberglass, heavy duty aluminum, galvanized steel, or other steel alloy that may be coated (e.g., vinyl) to prevent rust.

As illustrated and discussed above, in some aspects the material can extend across an entire externally-facing surface such as an entire side surface of an article, or in alternative aspects, the material can be present as one or more segments that are present at separate, discrete locations on an externally-facing side or surface of an article or component of an article.

The articles and components of the invention may be manufactured according to conventional techniques (e.g., molding, extrusion, thermoforming). The components and articles can be manufactured with one or more layers, may be produced from any suitable material(s), and can provide a good interfacial bond to the hydrogel-containing material, as discussed below.

Figure 19A:
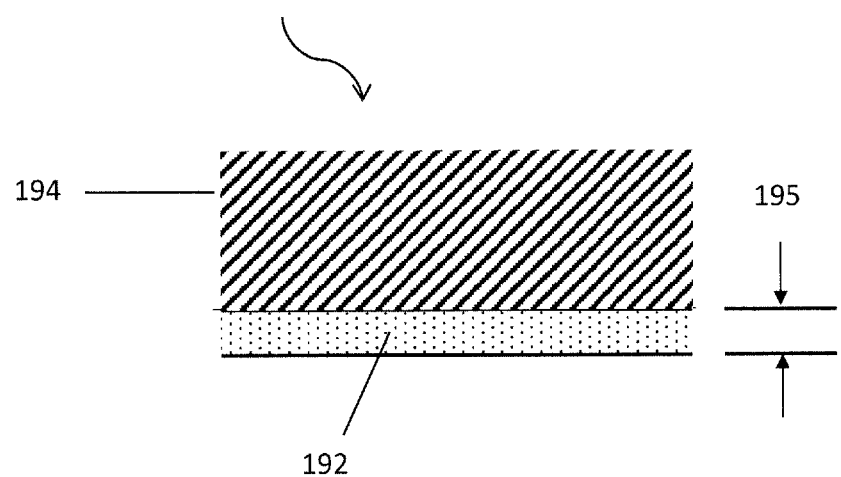
FIG. 19A is a view of a portion of a hydrogel-containing material adjacent to a substrate body.

As shown in FIG. 19A, the hydrogel-containing material 192 may be disposed directly adjacent a substrate body 194 of an article 190. Examples of suitable materials for the substrate body include one or more polymeric materials such as thermoplastic elastomers; thermoset polymers; elastomeric polymers; silicone polymers; natural and synthetic rubbers; composite materials including polymers reinforced with carbon fiber and/or glass; natural leather; natural stone; porcelain materials; ceramic materials (e.g., of alumina and glass-ceramics and the like); metallic materials (including metals, metal alloys, and metal oxides); glass materials; and combinations thereof. Specific examples of polymeric substrate materials include polyurethane and its copolymers, silicone and its copolymers, ethylene vinyl-acetate, polyvinyl chloride, polyolefins, cellulosics, polyamides, polytetrafluoroethylenes, polyesters, polycarbonates, polysulfones, acrylonitrile butadiene styrene copolymers, and acrylics. Examples of metals and alloys include those based on tantalum, gold, magnesium, aluminum, titanium, steel (e.g., stainless steel), platinum-iridium alloy, nickel-chrome alloy, nickel-titanium alloy (e.g. nitinol), cobalt-chrome alloy, and the like. For instance, the substrate can comprise alloys of cobalt, nickel, chromium, and molybdenum. (e.g., 35% cobalt, 35% nickel, 20% chromium, and 10% molybdenum; or 50% cobalt, 20% nickel, 20% chromium, and 10% molybdenum).

In particular examples, the component or article is manufactured with a substrate surface made from one or more polymeric materials having similar chemistries to that of the hydrogel-containing material. In other words, the substrate and the hydrogel-containing material can both comprise or consist essentially of polymers having the same or similar functional groups, and/or can comprise or consist essentially of polymers having the same or similar levels of polarity. For example, the substrate and the hydrogel-containing material can both comprise or consist essentially of one or more polyurethanes (e.g., thermoplastic polyurethanes), one or more polyamides (e.g., thermoplastic polyamides), one or more polyethers (e.g., thermoplastic polyethers), one or more polyesters (e.g., thermoplastic polyesters), or the like. The similar chemistries can be beneficial for improving manufacturing compatibilities between the hydrogel-containing material and the substrate, and also for improving their interfacial bond strength.

Figure 20A:
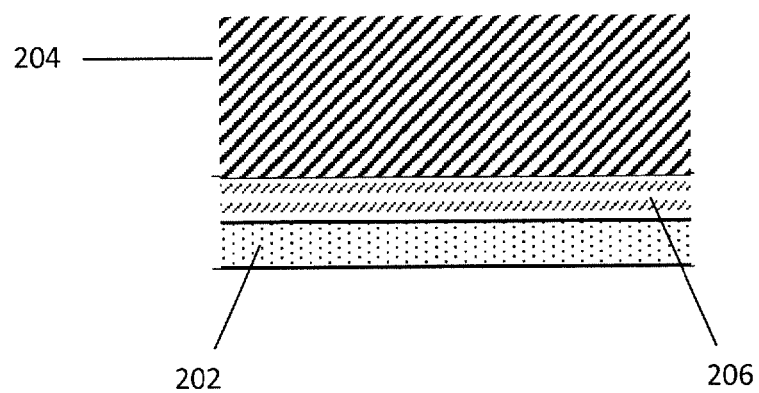
FIG. 20A is a view of a portion of a hydrogel-containing material adjacent to a tie layer on a substrate body.

Alternatively, as shown in FIG. 20A, one or more tie layers 206 can be applied between the substrate 204 and the hydrogel-containing material 202 in order to improve their interlayer bonding. Tie layers can be formed of materials having some functional groups or chain fragments which have compatibility with the first layer material and other groups or chain fragments which have compatibility with the second layer material. Materials which have been employed for tie layers include functionally modified polyolefins (for example, Plexar®, available from Equistar Chemicals, Houston, Tex.) or an adhesive resin such as Bynel® or Nucral® (an ethylene methacrylic acid copolymer) available from DuPont, Wilmington, Del.

A surface to be coated with the hydrogel-containing material may also be pre-treated with a polymer to form a monolayer of polymer on the surface. Pretreating the surface can result in better adhesion of the hydrogel-containing material to the substrate (i.e., a primer). Pre-treatment may be useful in situations where the surface is especially difficult to adhere to. In some examples, multiple layers of primer coats may be applied to the surface to provide specific functionality or improved performance to the surface. Any polymer known to one of skill in the art may be used for pre-treating a surface. For example, a derivatized 4-arm PEG (e.g., dihydroxyhydrocinnamic acid-modified 4-arm PEG), poly(N-substituted glycine) polymers, poly(zwitterion) polymers (such as poly(methacryloylphosphatidylcholine) or sulfobetaine or carboxybetaine containing acrylate polymers, and polysaccharides (such as hyaluronic acid or dextran) can be used.

The substrate surface of a component or article may be coated with a base coating layer and a hydrogel-containing material disposed on the base coating layer. The base coating layer may be any material suitable for forming a coating layer. Non-limiting examples include epoxy coatings, silicone coatings, epoxy-silicone coatings, etc. The base coating layer can be formed from an epoxy resin composition. The epoxy coating is generally formed by curing an epoxy resin composition that comprises an epoxy resin and an amine-based curing agent for curing the epoxy resin. The epoxy resin can be chosen from any suitable epoxy resin including, but not limited to, bisphenol epoxy resin, glycidylester epoxy resin, glycidylamine epoxy resin, phenol novolac epoxy resin, cresol epoxy resin, dimer acid modified epoxy resin, aliphatic epoxy resin, alicyclic epoxy resin, epoxidized oil epoxy resin, etc., and combinations of two or more thereof. Non-limiting examples of suitable bisphenol epoxy resins include bisphenol A-type and F-type resins. The base coat composition also generally includes an amine-based curing agent for curing the epoxy resin. Examples of suitable amine-based curing agents include, for example, modified Mannich amines formed by Mannich condensation reaction of phenols, formalin, and amine compounds, aliphatic polyamine, etc. In one example the amine-based curing agent may be present in an amount such that the number of amino groups of the amine-based curing agent is chemically equivalent to the number of epoxy groups of the epoxy resin. In one example, the curing agent can be present in an amount providing an amino group to epoxy group ratio of 0.35:1 to 0.9:1; even 0.4:1 to 0.8:1. In still another example, the amine-based curing agent can be present in an amount of about 10 to about 80 parts by weight with respect to 100 parts by weight of the epoxy resin. Here as elsewhere in the specification and claims, numerical values can be combined to form new and non-disclosed ranges. Other suitable base coating materials include, but are not limited to, room-temperature curable silicone coatings, epoxy-silicone coatings, and silicone epoxy hybrid.

The base coating can comprise an epoxy modified adhesion promoter. The epoxy modified adhesion promoter can comprise a curable amino silicone material and an epoxy compound, where the epoxy modified adhesion promoter is not fully compatible with the base polymer of the base coating. The base coating can comprise the epoxy modified adhesion promoter in an amount of from about 0.1 weight percent to about 20 weight percent; from about 0.3 weight percent to about 5 weight percent; even from about 0.5 weight percent to about 2 weight percent. Here as elsewhere in the specification and claims, numerical values can be combined to form new and nondisclosed ranges.

The base coat can be applied to and adhere to a variety of surfaces including, but not limited to metal (e.g., steel, iron, aluminum, etc.), fiberglass, wood, fiber-reinforced plastic, concrete etc. The coating system can be applied to a target substrate by applying the base coating layer to the target substrate, applying a hydrogel-containing composition to the base coating layer prior to the base coating being fully cured, and curing the coating compositions. The respective coating compositions can be applied by any suitable methods including, but not limited to, by brush, by roller, by spraying, by dipping, etc. Curing can be accomplished by any suitable curing mechanism including, for example, moisture condensation. The base coating and the hydrogel-containing composition can be applied to provide layers of a desired thickness (e.g., a base coating and a hydrogel-containing material layer). In certain examples, for either the multi-layer or single coating layer systems, the base coating has a thickness of from 50 micrometers to about 500 micrometers; from about 100 micrometers to about 300 micrometers; even from about 150 micrometers to about 200 micrometers. In other examples, the hydrogel-containing material can have a thickness of from 50 micrometers to about 400 micrometers; from about 100 micrometers to about 300 micrometers; even from about 150 micrometers to about 250 micrometers between the base coating and the hydrogel-containing material.

Figure 20B:
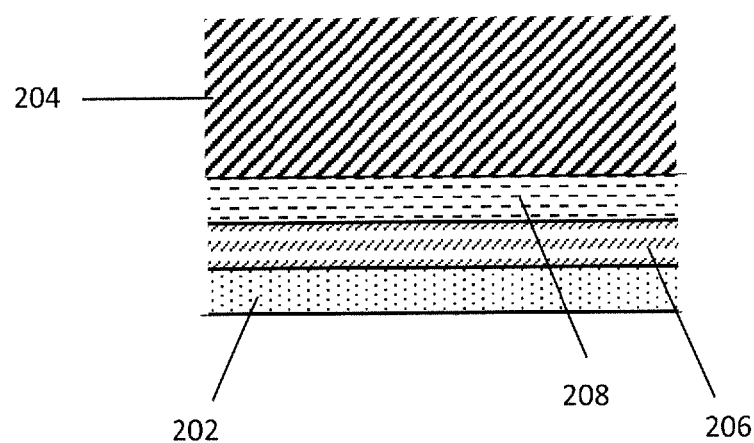
FIG. 20B is a view of a portion of a hydrogel-containing material adjacent to a tie layer on a base coating on a substrate body.

As described above, the hydrogel-containing material can be disposed on a substrate surface without a base coating or tie coat layer. Alternatively, the hydrogel-containing material can be adhered directly to the base coating composition, for example, in situations where the hydrogel-containing material adheres sufficiently to the base coating composition such that an adhesive or binding layer such as a tie-coat layer is not required. As shown in FIG. 20B, the hydrogel-containing material 202 is disposed over a tie-coat layer 206 that covers a base coating 208 that covers the substrate body 204.

The hydrogel-containing material defining at least a portion of the first external surface can be present in the form of a thin film. Examples of suitable average thicknesses for a film in a dry state (referred to as a dry-state film thickness) range from 0.025 millimeters to 5 millimeters, from 0.5 millimeters to 3 millimeters, from 0.25 millimeters to 1 millimeter, from 0.25 millimeters to 2 millimeters, from 0.25 millimeters to 5 millimeters, from 0.15 millimeters to 1 millimeter, from 0.15 millimeters to 1.5 millimeters, from 0.1 millimeters to 1.5 millimeters, from 0.1 millimeters to 2 millimeters, from 0.1 millimeters to 5 millimeters, from 0.1 millimeters to 1 millimeter, or from 0.1 millimeters to 0.5 millimeters. When present as a film on a backing material, the thickness of the hydrogel-containing material is measured between the interfacial bond between a backing material and an exterior surface of the hydrogel-containing material.

As used herein, the term "polymer" refers to a molecule having polymerized units of one or more species of monomer. The term "polymer" is understood to include both homopolymers and copolymers. The term "copolymer" refers to a polymer having polymerized units of two or more species of monomers, and is understood to include terpolymers. As used herein, reference to "a" polymer or other chemical compound refers to one or more molecules of the polymer or chemical compound, rather than being limited to a single molecule of the polymer or chemical compound. Furthermore, the one or more molecules may or may not be identical, so long as they fall under the category of the chemical compound. Thus, for example, "a" polylaurolactam is interpreted to include one or more polymer molecules of the polylaurolactam, where the polymer molecules may or may not be identical (e.g., different molecular weights and/or isomers).

As mentioned above, the material defining at least a portion of the first external surface compositionally comprises a polymeric hydrogel. The presence of the polymeric hydrogel allows the hydrogel-containing material to absorb or otherwise take up water. For example, the material can include a polymeric hydrogel that can quickly take up water from an external environment (e.g., from mud, wet grass, presoaking, and the like).

Moreover, it is believed that this uptake of water by the hydrogel-containing material causes the polymeric hydrogel of the material to untwist and stretch under the pressure of the water, while retaining its overall structural integrity through its crosslinking (physical or covalent crosslinking). This stretching and expansion of the polymeric hydrogel can cause the hydrogel-containing material to swell and become more compliant (e.g., compressible, expandable, and stretchable). As used herein, the term "compliant" refers to the stiffness of an elastic material, and can be determined by the storage modulus of the hydrogel-containing material. The lower the degree of crosslinking in a material, or the greater the distance between crosslinks in a material, the more compliant the material.

Figure 19B:
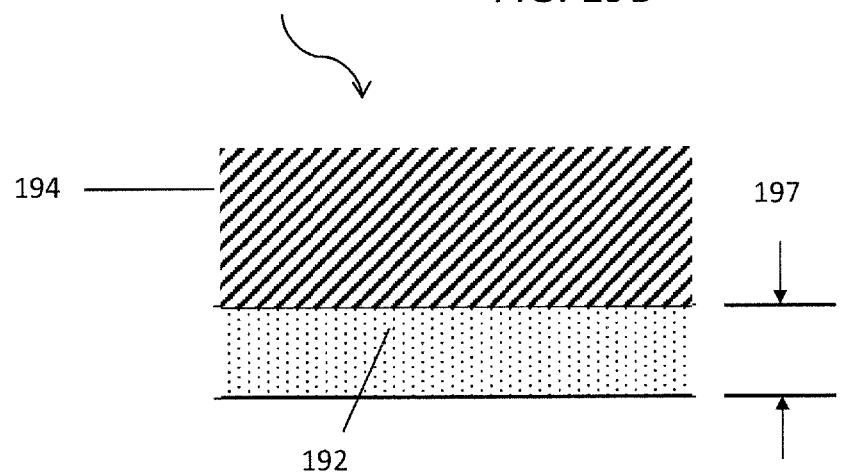
FIG. 19B is a view of a portion of a hydrogel-containing material in a saturated state adjacent to a substrate body.

The swelling of the hydrogel-containing material can be observed as an increase in thickness from the dry-state thickness of the hydrogel-containing material (e.g., 195 shown in FIG. 19A), through a range of intermediate-state thicknesses as additional water is absorbed, and finally to a saturated-state thickness (e.g., 197 shown in FIG. 19B), which is an average thickness of the hydrogel-containing material when fully saturated with water. For example, the saturated-state thickness for the fully saturated hydrogel-containing material can be greater than 150%, greater than 200%, greater than 250%, greater than 300%, greater than 350%, greater than 400%, or greater than 500%, of the dry-state thickness for the same hydrogel-containing material.

The saturated-state thickness for the fully saturated hydrogel-containing material can range from 150% to 500%, from 150% to 400%, from 150% to 300%, or from 200% to 300% of the dry-state thickness for the same hydrogel-containing material. Examples of suitable average thicknesses for the hydrogel-containing material in a wet state (referred to as a saturated-state thickness) range from 0.2 millimeters to 10 millimeters, from 0.2 millimeters to 5 millimeters, from 0.2 millimeters to 2 millimeters, from 0.25 millimeters to 2 millimeters, or from 0.5 millimeters to 1 millimeter.

Preferably, the hydrogel-containing material can quickly take up water that is in contact with the hydrogel-containing material. For instance, the hydrogel-containing material can take up water due to splashing or spraying from mud, wet pavement, or wet grass. Alternatively (or additionally), the hydrogel-containing material can be pre-conditioned with water so that the hydrogel-containing material is partially or fully saturated, such as by spraying or soaking with water prior to use.

The total amount of water that the hydrogel-containing material can take up depends on a variety of factors, such as its composition (e.g., its hydrophilicity), its cross-linking density, its thickness, and its interfacial bond to the substrate. For example, it is believed that a hydrogel-containing material having a higher hydrophilicity and a lower cross-linking density can increase the maximum water uptake. On the other hand, the interfacial bond between the hydrogel-containing material and the substrate can potentially restrict the swelling of the hydrogel-containing material due to its relatively thin dimensions. Accordingly, as described below, the maximum water uptake and the maximum percent swell of the hydrogel-containing material can differ between the hydrogel-containing material in a neat state (e.g., isolated film by itself) and the hydrogel-containing material as present on the substrate.

The water uptake capacity and the water uptake rate of the hydrogel-containing material are dependent on the size and shape of its geometry, and are typically based on the same factors. However, it has been found that, to account for part dimensions when measuring water uptake capacity, it is possible to derive an intrinsic, steady-state material property. Therefore, conservation of mass can be used to define the ratio of water weight absorbed to the initial dry weight of the hydrogel-containing material at very long time scales (i.e. when the ratio is no longer changing at a measurable rate.)

Conversely, the water uptake rate is transient and is preferably defined kinetically. The three primary factors for water uptake rate for a given part geometry include time, thickness, and the exposed surface area available for water flux. Once again, the weight of water taken up can be used as a metric of water uptake rate, but the water flux can also be accounted for by normalizing by the exposed surface area. For example, a thin rectangular film can be defined by 2×L×W, where L is the length of one side and W is the width. The value is doubled to account for the two major surfaces of the film, but the prefactor can be eliminated when the film has a non-absorbing, structural layer secured to one of the major surfaces.

Normalizing for thickness and time can require a more detailed analysis because they are coupled variables. Water penetrates deeper into the material as more time passes in the experiment, and therefore, there is more functional (e.g., absorbent) material available at longer time scales. One dimensional diffusion models can explain the relationship between time and thickness through material properties, such as diffusivity. In particular, the weight of water taken up per exposed surface area should yield a straight line when plotted against the square root of time.

However, several factors can occur where this model does not represent the data well. First, at long times absorbent materials become saturated and diffusion kinetics change due to the decrease in concentration gradient of the water. Second, as time progresses the material can be plasticized to increase the rate of diffusion, so once again the model no longer represents the physical process. Finally, competing processes can dominate the water uptake or weight change phenomenon, typically through surface phenomenon such as physisorption on a rough surface due to capillary forces. This is not a diffusion driven process, and the water is not actually taken up into the hydrogel-containing material.

In addition to swelling, the compliance of the hydrogel-containing material may also increase from being relatively stiff (dry state) to being increasingly stretchable, compressible, and malleable (in partially and fully saturated states). The increased compliance accordingly can allow the hydrogel-containing material to readily compress under an applied pressure (e.g., splashing mud, spraying water, applied pressure during cleaning), which can quickly expel at least a portion of its retained water (depending on the extent of compression). While not wishing to be bound by theory, it is believed that this combination of compressive compliance and water expulsion can disrupt the adhesion and cohesion of soil, which prevents or otherwise reduces the accumulation of soil on the component or article.

In addition to quickly expelling water, the compressed hydrogel-containing material may also be capable of quickly re-absorbing water when the compression is released. As such, during use in a wet or damp environment (e.g., a muddy or wet ground, cleaning/wet wiping), the hydrogel-containing material can dynamically expel and re-uptake water. As such, the hydrogel-containing material can continue to prevent soil accumulation over extended periods of time, particularly when there is water available for re-uptake.

The incorporation of the hydrogel-containing material to the component or article is believed to disrupt the adhesion and cohesion of soil to the component or article, thereby reducing the adhesive/cohesive activation energies otherwise required to induce the flow of the soil particles. The article can be provided in a pre-conditioned state where the hydrogel-containing material is partially or fully saturated with water. This can be accomplished in a variety of manners, such as spraying the article with water, soaking the article in water, or otherwise exposing the hydrogel-containing material to water in a sufficient amount for a sufficient duration. Alternatively (or additionally), when water or wet substances are present on the ground, the components and articles of the invention can be used in a conventional manner until the hydrogel-containing material absorbs a sufficient amount of water or wet substances to reach its pre-conditioned state.

In particular, the increased compliance is believed, under some conditions, to lead to inhomogeneous shear states in the soil when compressed in the normal or vertical direction, which can also lead to increased interfacial shear stresses and a decrease in soil accumulation.

The hydrogel-containing material can swell during water re-uptake (and also during initial uptake) in a non-uniform manner. This may result from the uptaken water tending to travel in a path perpendicular to the hydrogel-containing material's surface, and therefore not migrating substantially in a transverse direction generally in the plane of the hydrogel-containing material once absorbed. This uneven, perpendicular water uptake and relative lack of transverse water intra-film transport can form an irregular or rough texture or small ridges for the hydrogel-containing material's surface. The presence of these small ridges on the irregular surface from the non-uniform swelling is also believed to potentially further disrupt the adhesion of the soil at the hydrogel-containing material, and thus may loosen the soil and further promote soil shedding.

In addition to the uptake, compression, expulsion, re-uptake, and swelling cycle discussed above, the increased compliance of the hydrogel-containing material (e.g., elongational compliance in the longitudinal direction) may allow the hydrogel-containing material to be more malleable and stretchable when swelled.

The increased elongation or stretchiness of the hydrogel-containing material when partially or fully saturated with water can increase the extent that the hydrogel-containing material stretches during this flexing, which can induce additional shear on any adhered soil. Compression forces on the hydrogel-containing material can help to expel the water and can be particularly strong at points of contact.

The foregoing properties of the hydrogel-containing material related to compression/expansion compliance and the elongation compliance are believed to be closely interrelated, and they can depend on the same hydrogel-containing material properties (e.g., a hydrophilic hydrogel-containing material able to rapidly take up and expel relatively large amounts of water compared to the hydrogel-containing material's size or thickness). A distinction is in their mechanisms for preventing soil accumulation, for example surface adhesion disruption versus shear inducement. The water re-uptake is believed to potentially act to quickly expand or swell the hydrogel-containing material after being compressed to expel water. Rapid water uptake can provide a mechanism for replenishing the hydrogel-containing material water content. Rapid replenishment of the hydrogel-containing material water content can restore the hydrogel-containing material to its compliant state, returning it to a state where stretching and shearing forces can contribute to soil shedding. In addition, replenishment of the hydrogel-containing material water content can permit subsequent water expulsion to provide an additional mechanism for preventing soil accumulation (e.g., application of water pressure and modification of soil rheology). As such, the water absorption/expulsion cycle can provide a unique combination for preventing soil accumulation on the component or article.

In the methods of deflecting soil from an article, the hydrogel-containing material defining at least a portion of a first external surface of a component of an article is wetted and exposed to soil. The wetting and exposure to soil may take place simultaneously or the hydrogel-containing material may be first wetted followed by exposure to soil. Under some circumstances when the wetting and exposing to soil take place simultaneously, at least a portion of the water in the soil migrates from the soil into the hydrogel-containing material, thus wetting the hydrogel-containing material. Wiping, spraying, or splashing a wetted hydrogel-containing material exposed to soil can result in the compression/expansion compliance to shed soil from the hydrogel-containing material as discussed above.

In addition to being effective at preventing soil accumulation, the hydrogel-containing material has also been found to be sufficiently durable for its intended use. Durability is based on the nature and strength of the interfacial bond of the hydrogel-containing material to the substrate, as well as the physical properties of the hydrogel-containing material itself. For many examples, during the useful life of the hydrogel-containing material, the hydrogel-containing material may not delaminate from the substrate, and it can be substantially abrasion- and wear-resistant (e.g., maintaining its structural integrity without rupturing or tearing).

Interestingly, for many examples, the dry and wet states of the hydrogel-containing material can allow the hydrogel-containing material to dynamically adapt in durability to account for dry and wet conditions. For example, when used in dry conditions, the hydrogel-containing material can also be dry, which renders it stiffer and more wear resistant. Alternatively, when used in wet conditions or when wet substances are present on a dry ground, the hydrogel-containing material can quickly take up water to achieve a partially or fully saturated condition, which may be a swollen and/or compliant state. Nonetheless, the hydrogel-containing material is particularly beneficial for use in wet environments, such as with muddy surfaces, grass surfaces, and the like.

As discussed above, the material of the present disclosure can compositionally include a polymeric hydrogel that allows the material to take up water. As used herein, the terms "take up", "taking up", "uptake", "uptaking", and the like refer to the drawing of a liquid (e.g., water) from an external source into the hydrogel-containing material, such as by absorption, adsorption, or both. Furthermore, as briefly mentioned above, the term "water" refers to an aqueous liquid that can be pure water, or can be an aqueous carrier with lesser amounts of dissolved, dispersed or otherwise suspended substances (e.g., particulates, other liquids, and the like).

The ability of the hydrogel-containing material to uptake water and to correspondingly swell and increase in compliance can reflect its ability to prevent soil accumulation during use. As discussed above, when the hydrogel-containing material takes up water (e.g., through absorption, adsorption, capillary action, etc.), the water taken up transitions the hydrogel-containing material from a dry, relatively more rigid state to a partially or fully saturated state that is relatively more compliant. When the hydrogel-containing material is then subjected to an application of pressure, either compressive or flexing, the hydrogel-containing material can reduce in volume, such as to expel at least a portion of its water.

This expelled water is believed to reduce the adhesive/cohesive forces of soil particles at the hydrogel-containing material, which taken alone, or more preferably in combination with the compliance, can prevent or otherwise reduce soil accumulation. Accordingly, the hydrogel-containing material can undergo dynamic transitions during use or with the application of force, and these dynamic transitions can result in forces which dislodge accumulated soil or otherwise reduce soil accumulation.

Based on the multiple interacting mechanisms involved in reducing or preventing soil accumulation on the components and articles, it has been found that different properties can be good at predicting soil-shedding performance. For instance, the components and articles can be characterized in terms of the hydrogel-containing material's water uptake capacity and rate, swell capacity, contact angle when wet, coefficient of friction when wet and dry, reduction in storage modulus from dry to wet, reduction in glass transition temperature from dry to wet, and the like.

The terms "Article Sampling Procedure", "Co-Extruded Film Sampling Procedure", "Neat Film Sampling Procedure", "Neat Material Sampling Procedure", "Water Uptake Capacity Test", "Water Uptake Rate Test", "Swelling Capacity Test", "Contact Angle Test", "Coefficient of Friction Test", "Storage Modulus Test", "Glass Transition Temperature Test", "Impact Energy Test", and "Soil Shedding Test" as used herein refer to the respective sampling procedures and test methodologies described in the Property Analysis And Characterization Procedure section below. These sampling procedures and test methodologies characterize the properties of the recited materials, films, articles and components, and the like, and are not required to be performed as active steps in the claims.

For example, in some aspects, the hydrogel-containing material as secured to, present in, or defining a portion of an article or component has a water uptake capacity at 24 hours greater than 40% by weight, as characterized by the Water Uptake Capacity Test with the Article Sampling Procedure, each as described below. It is believed that if a particular material is not capable of taking up greater than 40% by weight in water within a 24-hour period, either due to its water uptake rate being too slow, or its ability to take up water is too low (e.g., due to its thinness, not enough material may be present, or the overall capacity of the material to take up water is too low), then the material will not be effective in preventing or reducing soil accumulation.

In further aspects, the hydrogel-containing material as secured to, present in, or defining a portion of an article or component has a water uptake capacity at 24 hours greater than 50% by weight, greater than 100% by weight, greater than 150% by weight, or greater than 200% by weight. In other aspects, the material as secured to, present in, or defining a portion of an article or component has a water uptake capacity at 24 hours less than 900% by weight, less than 750% by weight, less than 600% by weight, or less than 500% by weight.

In some particular aspects, the hydrogel-containing material as secured to, present in, or defining a portion of an article or component has a water uptake capacity at 24 hours ranging from 40% by weight to 900% by weight. For example, the hydrogel-containing material can have a water uptake capacity ranging from 100% by weight to 900% by weight, from 100% by weight to 750% by weight, from 100% by weight to 700% by weight, from 150% by weight to 600% by weight, from 200% by weight to 500% by weight, or from 300% by weight to 500% by weight.

These water uptake capacities are determined by the Water Uptake Capacity Test with the Article Sampling Procedure, and can apply to samples taken at any suitable representative location along the hydrogel-containing material, where the samples may be acquired pursuant to the Article Sampling Procedure.

As discussed below, the water uptake capacity of the hydrogel-containing material can alternatively be measured in a simulated environment with the hydrogel-containing material co-extruded with a backing substrate. The backing substrate can be produced from any suitable material that is compatible with the hydrogel-containing material. As such, suitable water uptake capacities at 24 hours for the hydrogel-containing material as co-extruded with a backing substrate, as characterized by the Water Uptake Capacity Test with the Co-extruded Film Sampling Procedure, include those discussed above for the Water Uptake Capacity Test with the Article Sampling Procedure.

Additionally, it has been found that when the hydrogel-containing material is secured to another surface, such as being thermally or adhesively bonded to a backing substrate, the interfacial bond formed between the hydrogel-containing material and the backing substrate can restrict the extent that the hydrogel-containing material can take up water and/or swell. As such, it is believed that the hydrogel-containing material as bonded to backing substrate or co-extruded with a backing substrate can potentially have a lower water uptake capacity and/or a lower swell capacity compared to the same hydrogel-containing material in a neat film form or a neat material form.

As such, the water uptake capacity and the water uptake rate of the hydrogel-containing material can also be characterized based on the hydrogel-containing material in neat form (i.e., an isolated film that is not bonded to another material). The hydrogel-containing material in neat form can have a water uptake capacity at 24 hours greater than 40% by weight, greater than 100% by weight, greater than 300% by weight, or greater than 1000% by weight, as characterized by the Water Uptake Capacity Test with the Neat Film Sampling Procedure. The hydrogel-containing material in neat form can also have a water uptake capacity at 24 hours less than 900% by weight, less than 800% by weight, less than 700% by weight, less than 600% by weight, or less than 500% by weight.

In some particular aspects, the hydrogel-containing material in neat form has a water uptake capacity at 24 hours ranging from 40% by weight to 900% by weight, from 150% by weight to 700% by weight, from 200% by weight to 600% by weight, or from 300% by weight to 500% by weight.

The hydrogel-containing material as secured to, present in, or defining a portion of an article or component of an article may also have a water uptake rate greater than 20 grams/(meter$^2$-minutes$^{1/2}$), as characterized by the Water Uptake Rate Test with the Article Sampling Procedure.

As such, in further aspects, the hydrogel-containing material as secured to, present in, or defining a portion of a component or an article has a water uptake rate greater than 20 grams/(meter$^2$-minutes$^{1/2}$), greater than 100 grams/(meter$^2$-minutes$^{1/2}$), greater than 200 grams/(meter$^2$-minutes$^{1/2}$), greater than 400 grams/(meter$^2$-minutes$^{1/2}$), or greater than 600 grams/(meter$^2$-minutes$^{1/2}$). In some particular aspects, the hydrogel-containing material as secured to, present in, or defining a portion of a component or an article has a water uptake rate ranging from 1 to 1,500 grams/(meter$^2$-minutes$^{1/2}$), 20 to 1,300 grams/(meter$^2$-minutes$^{1/2}$), from 30 to 1,200 grams/(meter$^2$-minutes$^{1/2}$), from 30 to 800 grams/(meter$^2$-minutes$^{1/2}$), from 100 to 800 grams/(meter$^2$-minutes$^{1/2}$), from 100 to 600 grams/(meter$^2$-minutes$^{1/2}$), from 150 to 450 grams/(meter$^2$-minutes$^{1/2}$), from 200 to 1,000 grams/(meter$^2$-minutes$^{1/2}$), from 400 to 1,000 grams/(meter$^2$-minutes$^{1/2}$), or from 600 to 900 grams/(meter$^2$-minutes$^{1/2}$).

Suitable water uptake rates for the hydrogel-containing material as secured to a co-extruded backing substrate, as characterized by the Water Uptake Rate Test with the Co-extruded Film Sampling Procedure, and as provided in neat form, as characterized by the Water Uptake Rate Test with the Neat Film Sampling Procedure, each include those discussed above for the Water Uptake Rate Test with the Article Sampling Procedure.

In certain aspects, the hydrogel-containing material as secured to, present in, or defining a portion of a component or an article can also swell, increasing the hydrogel-containing material's thickness and/or volume, due to water uptake. This swelling of the hydrogel-containing material can be a convenient indicator showing that the hydrogel-containing material is taking up water, and can assist in rendering the hydrogel-containing material compliant. In some aspects, the hydrogel-containing material as secured to a component or article has an increase in thickness (or swell thickness increase) at 1 hour of greater than 20% or greater than 50%, for example ranging from 30% to 350%, from 50% to 400%, from 50% to 300%, from 100% to 300%, from 100% to 200%, or from 150% to 250%, as characterized by the Swelling Capacity Test with the Article Sampling Procedure. In some further aspects, the hydrogel-containing material as secured to a component or article has an increase in thickness at 24 hours ranging from 45% to 400%, from 100% to 350%, or from 150% to 300%.

Additionally, the hydrogel-containing material as secured to, present in, or defining a portion of a component or article can have an increase in volume (or volumetric swell increase) at 1 hour of greater than 50%, for example ranging from 10% to 130%, from 30% to 100%, or from 50% to 90%. Moreover, the hydrogel-containing material as secured to, present in, or defining a portion of a component or article can have an increase in volume at 24 hours ranging from 25% to 200%, from 50% to 150%, or from 75% to 100%.

For co-extruded film simulations, suitable increases in film thickness and volume at 1 hour and 24 hours for the hydrogel-containing material as secured to a co-extruded backing substrate, as characterized by the Swelling Capacity Test with the Co-extruded Film Sampling Procedure, include those discussed above for the Swelling Capacity Test with the Article Sampling Procedure.

The hydrogel-containing material in neat form can have an increase in thickness at 1 hour ranging from 35% to 400%, from 50% to 300%, or from 100% to 200%, as characterized by the Swelling Capacity Test with the Neat Film Sampling Procedure. In some further aspects, the hydrogel-containing material in neat form can have an increase in thickness at 24 hours ranging 45% to 500%, from 100% to 400%, or from 150% to 300%. Correspondingly, the hydrogel-containing material in neat form can have an increase in volume at 1 hour ranging from 50% to 500%, from 75% to 400%, or from 100% to 300%.

As also discussed above, in some aspects, the surface of the hydrogel-containing material preferably exhibits hydrophilic properties. The hydrophilic properties of the hydrogel-containing material surface can be characterized by determining the static sessile drop contact angle of the hydrogel-containing material's surface. Accordingly, in some examples, the hydrogel-containing material in a dry state has a static sessile drop contact angle (or dry-state contact angle) of less than 105°, or less than 95°, less than 85°, as characterized by the Contact Angle Test (independent of film sampling process). In some further examples, the hydrogel-containing material in a dry state has a static sessile drop contact angle ranging from 60° to 100°, from 70° to 100°, or from 65° to 95°.

In other examples, the hydrogel-containing material in a saturated state has a static sessile drop contact angle (or wet-state contact angle) of less than 90°, less than 80°, less than 70°, or less than 60°. In some further examples, the hydrogel-containing material in a saturated state has a static sessile drop contact angle ranging from 45° to 75°. In some cases, the dry-state static sessile drop contact angle of the hydrogel-containing material surface is greater than the wet-state static sessile drop contact angle of the material surface by at least 10°, at least 15°, or at least 20°, for example from 10° to 40°, from 10° to 30°, or from 10° to 20°.

The surface of the hydrogel-containing material can also exhibit a low coefficient of friction when partially or fully saturated. Examples of suitable coefficients of friction for the hydrogel-containing material in a dry state (or dry-state coefficient of friction) are less than 1.5, for instance ranging from 0.3 to 1.3, or from 0.3 to 0.7, as characterized by the Coefficient of Friction Test (independent of film sampling process). Examples of suitable coefficients of friction for the hydrogel-containing material in a saturated state (or wet-state coefficient of friction) are less than 0.8 or less than 0.6, for instance ranging from 0.05 to 0.6, from 0.1 to 0.6, or from 0.3 to 0.5. Furthermore, the hydrogel-containing material can exhibit a reduction in its coefficient of friction from its dry state to its saturated state, such as a reduction ranging from 15% to 90%, or from 50% to 80%. In some cases, the dry-state coefficient of friction is greater than the wet-state coefficient of friction for the hydrogel-containing material, for example being higher by a value of at least 0.3 or 0.5, such as 0.3 to 1.2 or 0.5 to 1.

Furthermore, the compliance of the hydrogel-containing material can be characterized by its storage modulus in the dry state (when equilibrated at 0% relative humidity (RH)), in a partially wetted state (e.g., when equilibrated at 50% RH), and in a wetted state (when equilibrated at 90% RH), and by reductions in its storage modulus between the dry and saturated states. In particular, the hydrogel-containing material can have a reduction in storage modulus ($\Delta E'$) from the dry state relative to the wetted state. A reduction in storage modulus as the water concentration in the hydrogel-containing material increases corresponds to an increase in compliance, because less stress is required for a given strain/deformation.

In some aspects, the hydrogel-containing material exhibits a reduction in the storage modulus from its dry state to its saturated state of more than 20%, more than 40%, more than 60%, more than 75%, more than 90%, or more than 99%, relative to the storage modulus in the dry state, and as characterized by the Storage Modulus Test with the Neat Film Sampling Process or the Neat Material Sampling Process.

In some further aspects, the dry-state storage modulus of the hydrogel-containing material is greater than its wet-state (or saturated-state) storage modulus by more than 25 megaPascals (MPa), by more than 50 MPa, by more than 100 MPa, by more than 300 MPa, or by more than 500 MPa, for example ranging from 25 MPa to 800 MPa, from 50 MPa to 800 MPa, from 100 MPa to 800 MPa, from 200 MPa to 800 MPa, from 400 MPa to 800 MPa, from 25 MPa to 200 MPa, from 25 MPa to 100 MPa, or from 50 MPa to 200 MPa. Additionally, the dry-state storage modulus can range from 40 MPa to 800 MPa, from 100 MPa to 600 MPa, or from 200 MPa to 400 MPa, as characterized by the Storage Modulus Test. Additionally, the wet-state storage modulus can range from 0.003 MPa to 100 MPa, from 1 MPa to 60 MPa, or from 20 MPa to 40 MPa.

In addition to a reduction in storage modulus, the hydrogel-containing material (or a crosslinked polymeric material on an external surface) can also exhibit a reduction in its glass transition temperature from the dry state (when equilibrated at 0% relative humidity (RH) to the wetted state (when equilibrated at 90% RH). While not wishing to be bound by theory, it is believed that the water taken up by the hydrogel-containing material plasticizes the hydrogel-containing material, which reduces its storage modulus and its glass transition temperature, rendering the hydrogel-containing material more compliant (e.g., compressible, expandable, and stretchable).

In some aspects, the hydrogel-containing material can exhibit a reduction in glass transition temperature ($\Delta T_g$) from its dry-state glass transition temperature to its wet-state glass transition temperature of more than a 5° C. difference, more than a 6° C. difference, more than a 10° C. difference, or more than a 15° C. difference, as characterized by the Glass Transition Temperature Test with the Neat Film Sampling Process or the Neat Material Sampling Process. For instance, the reduction in glass transition temperature ($\Delta T_g$) can range from more than a 5° C. difference to a 40° C. difference, from more than a 6° C. difference to a 50° C. difference, from more than a 10° C. difference to a 30° C. difference, from more than a 30° C. difference to a 45° C. difference, or from a 15° C. difference to a 20° C. difference. The hydrogel-containing material can also exhibit a dry glass transition temperature ranging from −40° C. to −80° C., or from −40° C. to −60° C.

Alternatively (or additionally), the reduction in glass transition temperature ($\Delta T_g$) can range from a 5° C. difference to a 40° C. difference, from a 10° C. difference to a 30° C. difference, or from a 15° C. difference to a 20° C. difference. The hydrogel-containing material can also exhibit a dry glass transition temperature ranging from −40° C. to −80° C., or from −40° C. to −60° C.

In some further aspects, the hydrogel-containing material can exhibit a soil shedding ability with a relative impact energy ranging from 0 to 0.9, from 0.2 to 0.7, or from 0.4 to 0.5, as characterized by the Impact Energy Test with the Co-extruded Film Sampling Procedure. Moreover, the hydrogel-containing material is preferably durable enough, and has a sufficient bond to the component or article, for use over extended durations.

As discussed above, in some aspects, one or more portions of the component or article (or the entirety of the component or article) can be manufactured with one or more surface materials capable of taking up water (e.g., the surface material can include one or more polymeric hydrogels). As such, the above-discussed properties for the hydrogel-containing material and the below-discussed compositions for the hydrogel-containing material apply to the surface material(s) for components of articles (e.g., mud flaps, traffic cones, tire sidewalls).

In particular aspects, the hydrogel-containing material (and the surface material for the component of an article of manufacture) compositionally includes a hydrogel and, optionally, one or more additives. As used herein, the term "hydrogel" refers to a polymeric material that is capable of taking up at least 10% by weight in water, based on a dry weight of the polymeric material. The hydrogel can include a crosslinked or crosslinkable polymeric network, where crosslinks interconnect multiple polymer chains to form the polymeric network, and where the crosslinks can be physical crosslinks, covalent crosslinks, or can include both physical and covalent crosslinks (within the same polymeric network). The hydrogel constitutes more than 50% by weight of the entire hydrogel-containing material, or more than 75% by weight, or more 85% by weight, or more than 95% by weight. In some aspects, the hydrogel-containing material consists essentially of the hydrogel.

For a physical crosslink, a copolymer chain can form entangled regions and/or crystalline regions through non-covalent (non-bonding) interactions, such as, for example, an ionic bond, a polar bond, and/or a hydrogen bond. In particular, the crystalline regions create the physical crosslink between the copolymer chains whereas the non-bonding interactions form the crystalline domains (which include hard segments, as described below). These hydrogels can exhibit sol-gel reversibility, allowing them to function as thermoplastic polymers, which can be advantageous for manufacturing and recyclability. As such, in some aspects, the hydrogel of the hydrogel-containing material includes a physically crosslinked polymeric network to function as a thermoplastic hydrogel.

The physically crosslinked hydrogels can be characterized by hard segments and soft segments, which can exist as phase separated regions within the polymeric network while the hydrogel-containing material is in a solid (non-molten) state. The hard segments can form portions of the polymer chain backbones, and can exhibit high polarities, allowing the hard segments of multiple polymer chains to aggregate together, or interact with each other, to form semi-crystalline regions of the polymeric network.

A "semi-crystalline" or "crystalline" region has an ordered molecular structure with sharp melt points, which remains solid until a given quantity of heat is absorbed and then rapidly changes into a low viscosity liquid. A "pseudo-crystalline" region has properties of a crystal, but does not exhibit a true crystalline diffraction pattern. For ease of reference, the term "crystalline region" will be used herein to collectively refer to a crystalline region, a semi-crystalline region, and a pseudo-crystalline region of a polymeric network.

In comparison, the soft segments can be longer, more flexible, untwistable, hydrophilic regions of the polymeric network that allow the polymer network to expand and swell under the pressure of taken up water. The soft segments can constitute amorphous hydrophilic regions of the hydrogel or crosslinked polymeric network. The soft segments, or amorphous regions, can also form portions of the backbones of the polymer chains along with the hard segments. Additionally, one or more portions of the soft segments, or amorphous regions, can be grafted or otherwise extend as pendant chains that extend from the backbones at the soft segments. The soft segments, or amorphous regions, can be covalently bonded to the hard segments, or crystalline regions (e.g., through carbamate linkages). For example, a plurality of amorphous hydrophilic regions can be covalently bonded to the crystalline regions of the hard segments.

Thus, in various aspects, the hydrogel or crosslinked polymeric network includes a plurality of copolymer chains wherein at least a portion of the copolymer chains each comprise a hard segment physically crosslinked to other hard segments of the copolymer chains and a soft segment covalently bonded to the hard segment, such as through a carbamate group or an ester group. In some cases, the hydrogel, or crosslinked polymeric network, includes a plurality of copolymer chains wherein at least a portion of the copolymer chains each comprise a first chain segment physically crosslinked to at least one other copolymer chain of the plurality of copolymer chains and a hydrophilic segment (e.g., a polyether chain segment) covalently bonded to the first chain segment, such as through a carbamate group or an ester group.

In various aspects, the hydrogel or crosslinked polymeric network includes a plurality of copolymer chains, wherein at least a portion of the copolymer chains each include a first segment forming at least a crystalline region with other hard segments of the copolymer chains; and a second segment, such as a soft segment (e.g., a segment having polyether chains or one or more ether groups) covalently bonded to the first segment, where the soft segment forms amorphous regions of the hydrogel or crosslinked polymeric network. In some cases, the hydrogel or crosslinked polymeric network includes a plurality of copolymer chains, where at least a portion of the copolymer chains have hydrophilic segments.

The soft segments, or amorphous regions, of the copolymer chains can constitute a substantial portion of the polymeric network, allowing their hydrophilic segments or groups to attract water molecules. In some aspects, the soft segments, or amorphous regions, are present in the copolymer chains in a ratio (relative to the hard segments, or crystalline regions) that is at least or greater than 20:1 by weight, that ranges from 20:1 to 110:1 by weight, or from 40:1 to 110:1 by weight, or from 40:1 to 80:1 by weight, or from 60:1 to 80:1.

For a covalent crosslink, one polymer chain is linked to one or more additional polymer chains with one or more covalent bonds, typically with a linking segment or chain. Covalently crosslinked hydrogels (e.g., thermoset and photocured hydrogels) can be prepared by covalently linking the polymer chains together using one or more multi-functional compounds, such as, for example, a molecule having at least two ethylenically-unsaturated groups, at least two oxirane groups (e.g., diepoxides), or combinations thereof (e.g., glycidyl methacrylate); and can also include any suitable intermediate chain segment, such as $C_{1-30}$, $C_{2-20}$, or $C_{2-10}$ hydrocarbon, polyether, or polyester chain segments.

The multi-functional compounds can include at least three functional groups selected from the group consisting of isocyanidyl, hydroxyl, amino, sulfhydryl, carboxyl or derivatives thereof, and combinations thereof. In some aspects, such as when the polymer network includes polyurethane, the multi-functional compound can be a polyol having three or more hydroxyl groups (e.g., glycerol, trimethylolpropane, 1,2,6-hexanetriol, 1,2,4-butanetriol, trimethylolethane) or a polyisocyanate having three or more isocyanate groups. In some cases, such as when the polymer network includes polyamide, the multi-functional compound can include, for example, carboxylic acids or activated forms thereof having three or more carboxyl groups (or activated forms thereof, polyamines having three or more amino groups, and polyols having three or more hydroxyl groups (e.g., glycerol, trimethylolpropane, 1,2,6-hexanetriol, 1,2,4-butanetriol, and trimethylolethane). In various cases, such as when the polymer network includes polyolefin, the multi-functional compound can be a compound having two ethylenically-unsaturated groups.

It has been found that the crosslinking density of the crosslinked hydrogel can impact the structural integrity and water uptake capacities of the hydrogel-containing material. If the crosslinking density is too high, the resulting hydrogel-containing material can be stiff and less compliant, which can reduce its water uptake and swelling capacity. On the other hand, if the crosslinking density is too low, then the resulting hydrogel-containing material can lose its structural integrity when saturated. As such, the hydrogel(s) of the hydrogel-containing material can have a balanced crosslinking density such that it retains its structural integrity, yet is also sufficiently compliant when partially or fully saturated with water.

The crosslinked polymer network of the hydrogel for the hydrogel-containing material can include any suitable polymer chains that provide the desired functional properties (e.g., water uptake, swelling, and more generally, preventing soil accumulation), and also desirably provide good durability. For example, the hydrogel can be based on one or more polyurethanes, one or more polyamides, one or more polyolefins, and combinations thereof (e.g., a hydrogel based on polyurethane(s) and polyamide(s)). In these aspects, the hydrogel or crosslinked polymeric network can include a plurality of copolymer chains wherein at least a portion of the copolymer chains each include a polyurethane segment, a polyamide segment, or a combination thereof. In some aspects, the one or more polyurethanes, one or more cloalkyl, hydroxyl, oxy (or oxo), alkoxyl, ester, thioester, acyl, carboxyl, cyano, nitro, amino, amido, sulfur, and halo. When a substituted alkyl group includes more than one non-hydrogen radical, the substituents can be bound to the same carbon or two or more different carbon atoms.

Additionally, the isocyanates can also be chain extended with one or more chain extenders to bridge two or more isocyanates. This can produce polyurethane copolymer chains as illustrated below in Formula 2, wherein $R_3$ includes the chain extender.

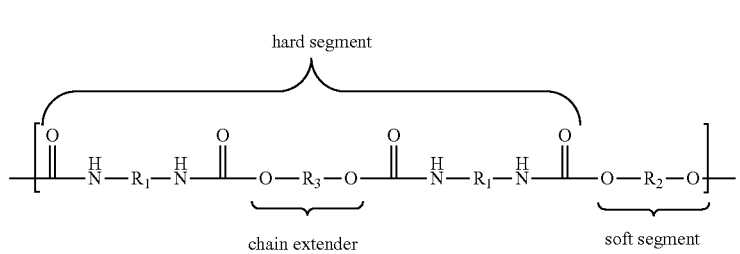

(Formula 2)

polyamides, one or more polyolefins, and combinations thereof include polysiloxane segments and/or ionomer segments.

In some aspects, the hydrogel includes a crosslinked polymeric network with one or more polyurethane copolymer chains (i.e., a plurality of polyurethane chains) that are physically and/or covalently crosslinked (referred to as a "polyurethane hydrogel"). The polyurethane hydrogel can be produced by polymerizing one or more isocyanates with one or more polyols to produce copolymer chains having carbamate linkages (—N(CO)O—) as illustrated below in Formula 1, where the isocyanate(s) each can include two or more isocyanate (—NCO) groups per molecule, such as 2, 3, or 4 isocyanate groups per molecule (although, single-functional isocyanates can also be optionally included, e.g., as chain terminating units).

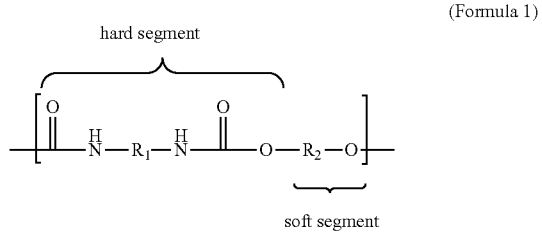

(Formula 1)

In these aspects, each $R_1$ independently is an aliphatic or aromatic segment, and each $R_2$ is a hydrophilic segment.

Unless otherwise indicated, any of the functional groups or chemical compounds described herein can be substituted or unsubstituted. A "substituted" group or chemical compound, such as an alkyl, alkenyl, alkynyl, cycloalkyl, cycloalkenyl, aryl, heteroaryl, alkoxyl, ester, ether, or carboxylic ester refers to an alkyl, alkenyl, alkynyl, cycloalkyl, cycloalkenyl, aryl, heteroaryl, alkoxyl, ester, ether, or carboxylic ester group, has at least one hydrogen radical that is substituted with a non-hydrogen radical (i.e., a substituent). Examples of non-hydrogen radicals (or substituents) include, but are not limited to, alkyl, cycloalkyl, alkenyl, cycloalkenyl, alkynyl, ether, aryl, heteroaryl, heterocy- Each segment $R_1$, or the first segment in Formulas 1 and 2, can independently include a linear or branched $C_{3-30}$ segment, based on the particular isocyanate(s) used, and can be aliphatic, aromatic, or include a combination of aliphatic portions(s) and aromatic portion(s). The term "aliphatic" refers to a saturated or unsaturated organic molecule that does not include a cyclically conjugated ring system having delocalized pi electrons. In comparison, the term "aromatic" refers to a cyclically conjugated ring system having delocalized pi electrons, which exhibits greater stability than a hypothetical ring system having localized pi electrons.

In aliphatic aspects (from aliphatic isocyanate(s)), each segment $R_1$ can include a linear aliphatic group, a branched aliphatic group, a cycloaliphatic group, or combinations thereof. For instance, each segment $R_1$ can include a linear or branched $C_{3-20}$ alkylene segment (e.g., $C_{4-15}$ alkylene or $C_{6-10}$ alkylene), one or more $C_{3-8}$ cycloalkylene segments (e.g., cyclopropyl, cyclobutyl, cyclopentyl, cyclohexyl, cycloheptyl, or cyclooctyl), and combinations thereof.

Examples of suitable aliphatic diisocyanates for producing the polyurethane copolymer chains include hexamethylene diisocyanate (HDI), isophorone diisocyanate butyl ene diisocyanate (BDI), bisisocyanatocyclohexylmethane (HMDI), 2,2,4-trimethylhexamethylene diisocyanate (TMDI), bisisocyanatomethylcyclohexane, bisisocyanatomethyltricyclodecane, norbornane diisocyanate (NDI), cyclohexane diisocyanate (CHDI), 4,4'-dicyclohexylmethane diisocyanate (H12MDI), diisocyanatododecane, lysine diisocyanate, and combinations thereof.

In aromatic aspects (from aromatic isocyanate(s)), each segment $R_1$ can include one or more aromatic groups, such as phenyl, naphthyl, tetrahydronaphthyl, phenanthrenyl, biphenylenyl, indanyl, indenyl, anthracenyl, and fluorenyl. Unless otherwise indicated, an aromatic group can be an unsubstituted aromatic group or a substituted aromatic group, and can also include heteroaromatic groups. "Heteroaromatic" refers to monocyclic or polycyclic (e.g., fused bicyclic and fused tricyclic) aromatic ring systems, where one to four ring atoms are selected from oxygen, nitrogen, or sulfur, and the remaining ring atoms are carbon, and where the ring system is joined to the remainder of the molecule by any of the ring atoms. Examples of suitable heteroaryl groups include pyridyl, pyrazinyl, pyrimidinyl, pyrrolyl, pyrazolyl, imidazolyl, thiazolyl, tetrazolyl, oxazolyl, isooxazolyl, thiadiazolyl, oxadiazolyl, furanyl, quinolinyl, isoquinolinyl, benzoxazolyl, benzimidazolyl, and benzothiazolyl.

Examples of suitable aromatic diisocyanates for producing the polyurethane copolymer chains include toluene diisocyanate (TDI), TDI adducts with trimethyloylpropane (TMP), methylene diphenyl diisocyanate (MDI), xylene diisocyanate (XDI), tetramethylxylylene diisocyanate (TMXDI), hydrogenated xylene diisocyanate (HXDI), naphthalene 1,5-diisocyanate (NDI), 1,5-tetrahydronaphthalene diisocyanate, para-phenylene diisocyanate (PPDI), 3,3'-dimethyldiphenyl-4, 4'-diisocyanate (DDDI), 4,4'-dibenzyl diisocyanate (DBDI), 4-chloro-1,3-phenylene diisocyanate, and combinations thereof. In some aspects, the copolymer chains are substantially free of aromatic groups.

In some aspects, the polyurethane copolymer chains are produced from diisocyanates including HMDI, TDI, MDI, H12 aliphatics, and combinations thereof.

Examples of suitable triisocyanates for producing the polyurethane copolymer chains include TDI, HDI, and IPDI adducts with trimethyloylpropane (TMP), uretdiones (i.e., dimerized isocyanates), polymeric MDI, and combinations thereof.

Segment $R_3$ in Formula 2 can include a linear or branched $C_2$-$C_{10}$ segment, based on the particular chain extender polyol used, and can be, for example, aliphatic, aromatic, or polyether. Examples of suitable chain extender polyols for producing the polyurethane copolymer chains include ethylene glycol, lower oligomers of ethylene glycol (e.g., diethylene glycol, triethylene glycol, and tetraethylene glycol), 1,2-propylene glycol, 1,3-propylene glycol, lower oligomers of propylene glycol (e.g., dipropylene glycol, tripropylene glycol, and tetrapropylene glycol), 1,4-butylene glycol, 2,3-butylene glycol, 1,6-hexanediol, 1,8-octanediol, neopentyl glycol, 1,4-cyclohexanedimethanol, 2-ethyl-1,6-hexanediol, 1-methyl-1,3-propanediol, 2-methyl-1,3-propanediol, dihydroxyalkylated aromatic compounds (e.g., bis (2-hydroxyethyl) ethers of hydroquinone and resorcinol, xylene-α,α-diols, bis(2-hydroxyethyl) ethers of xylene-α,α-diols, and combinations thereof.

Segment $R_2$ in Formula 1 and 2 can include polyether, polyester, polycarbonate, an aliphatic group, or an aromatic group, wherein the aliphatic group or aromatic group is substituted with one or more pendant hydrophilic groups selected from the group consisting of hydroxyl, polyether, polyester, polylactone (e.g., polyvinylpyrrolidone (PVP)), amino, carboxylate, sulfonate, phosphate, ammonium (e.g., tertiary and quaternary ammonium), zwitterion (e.g., a betaine, such as poly(carboxybetaine) (pCB) and ammonium phosphonates such as phosphatidylcholine), and combinations thereof. Therefore, the hydrophilic segment of $R_2$ can form portions of the hydrogel backbone, or be grafted to the hydrogel backbone as a pendant group. In some aspects, the pendant hydrophilic group or segment is bonded to the aliphatic group or aromatic group through a linker. Each segment $R_2$ can be present in an amount of 5% to 85% by weight, from 5% to 70% by weight, or from 10% to 50% by weight, based on the total weight of the reactant monomers.

In some aspects, at least one $R_2$ segment includes a polyether segment (i.e., a segment having one or more ether groups). Suitable polyethers include, but are not limited to polyethylene oxide (PEO), polypropylene oxide (PPO), polytetrahydrofuran (PTHF), polytetramethylene oxide (PTMO), and combinations thereof. The term "alkyl" as used herein refers to straight chained and branched saturated hydrocarbon groups containing one to thirty carbon atoms, for example, one to twenty carbon atoms, or one to ten carbon atoms. The term $C_n$ means the alkyl group has "n" carbon atoms. For example, $C_4$ alkyl refers to an alkyl group that has 4 carbon atoms. $C_{1-7}$ alkyl refers to an alkyl group having a number of carbon atoms encompassing the entire range (i.e., 1 to 7 carbon atoms), as well as all subgroups (e.g., 1-6, 2-7, 1-5, 3-6, 1, 2, 3, 4, 5, 6, and 7 carbon atoms). Non-limiting examples of alkyl groups include, methyl, ethyl, n-propyl, isopropyl, n-butyl, sec-butyl (2-methylpropyl), t-butyl (1,1-dimethylethyl), 3,3-dimethylpentyl, and 2-ethylhexyl. Unless otherwise indicated, an alkyl group can be an unsubstituted alkyl group or a substituted alkyl group.

In some cases, at least one $R_2$ segment includes a polyester segment. The polyester can be derived from the polyesterification of one or more dihydric alcohols (e.g., ethylene glycol, 1,3-propylene glycol, 1,2-propylene glycol, 1,4-butanediol, 1,3-butanediol, 2-methylpentanediol-1,5, diethylene glycol, 1,5-pentanediol, 1,5-hexanediol, 1,2-dodecanediol, cyclohexanedimethanol, and combinations thereof) with one or more dicarboxylic acids (e.g., adipic acid, succinic acid, sebacic acid, suberic acid, methyladipic acid, glutaric acid, pimelic acid, azelaic acid, thiodipropionic acid and citraconic acid and combinations thereof). The polyester also can be derived from polycarbonate prepolymers, such as poly(hexamethylene carbonate) glycol, poly (propylene carbonate) glycol, poly(tetramethylene carbonate)glycol, and poly(nonanemethylene carbonate) glycol. Suitable polyesters can include, for example, polyethylene adipate (PEA), poly(1,4-butylene adipate), poly(tetramethylene adipate), poly(hexamethylene adipate), polycaprolactone, polyhexamethylene carbonate, poly(propylene carbonate), poly(tetramethylene carbonate), poly (nonanemethylene carbonate), and combinations thereof.

In various cases, at least one $R_2$ segment includes a polycarbonate segment. The polycarbonate can be derived from the reaction of one or more dihydric alcohols (e.g., ethylene glycol, 1,3-propylene glycol, 1,2-propylene glycol, 1,4-butanediol, 1,3-butanediol, 2-methylpentanediol-1,5, diethylene glycol, 1,5-pentanediol, 1,5-hexanediol, 1,2-dodecanediol, cyclohexanedimethanol, and combinations thereof) with ethylene carbonate.

In various aspects, at least one $R_2$ segment includes an aliphatic group substituted with one or more hydrophilic groups selected from the group consisting of hydroxyl, polyether, polyester, polylactone (e.g., polyvinylpyrrolidone), amino, carboxylate, sulfonate, phosphate, ammonium (e.g., tertiary and quaternary ammonium), zwitterion (e.g., a betaine, such as poly(carboxybetaine) (pCB) and ammonium phosphonates such as phosphatidylcholine), and combinations thereof. In some aspects, the aliphatic group is linear and can include, for example, a $C_{1-20}$ alkylene chain or a $C_{1-20}$ alkenylene chain (e.g., methylene, ethylene, propylene, butylene, pentylene, hexylene, heptylene, octylene, nonylene, decylene, undecylene, dodecylene, tridecylene, ethenylene, propenylene, butenylene, pentenylene, hexenylene, heptenylene, octenylene, nonenylene, decenylene, undecenylene, dodecenylene, tridecenylene). The term "alkylene" refers to a bivalent hydrocarbon. The term $C_n$ means the alkylene group has "n" carbon atoms. For example, $C_{1-6}$alkylene refers to an alkylene group having, e.g., 1, 2, 3, 4, 5, or 6 carbon atoms. The term "alkenylene" refers to a bivalent hydrocarbon having at least one double bond.

In some cases, at least one $R_2$ segment includes an aromatic group substituted with one or more hydrophilic groups selected from the group consisting of hydroxyl, polyether, polyester, polylactone (e.g., polyvinylpyrrolidone), amino, carboxylate, sulfonate, phosphate, ammonium (e.g., tertiary and quaternary ammonium), zwitterion (e.g., a betaine, such as poly(carboxybetaine) (pCB) and ammonium phosphonates such as phosphatidylcholine), and combinations thereof. Suitable aromatic groups include, but are not limited to, phenyl, naphthyl, tetrahydronaphthyl, phenanthrenyl, biphenylenyl, indanyl, indenyl, anthracenyl, fluorenylpyridyl, pyrazinyl, pyrimidinyl, pyrrolyl, pyrazolyl, imidazolyl, thiazolyl, tetrazolyl, oxazolyl, isooxazolyl, thiadiazolyl, oxadiazolyl, furanyl, quinolinyl, isoquinolinyl, benzoxazolyl, benzimidazolyl, and benzothiazolyl.

The aliphatic and aromatic groups are substituted with an appropriate number of pendant hydrophilic and/or charged groups so as to provide the resulting hydrogel with the properties described herein. In some aspects, the pendant hydrophilic group is one or more (e.g., 2, 3, 4, 5, 6, 7, 8, 9, 10 or more) hydroxyl groups. In various aspects, the pendant hydrophilic group is one or more (e.g., 2, 3, 4, 5, 6, 7, 8, 9, 10 or more) amino groups. In some cases, the pendant hydrophilic group is one or more (e.g., 2, 3, 4, 5, 6, 7, 8, 9, 10 or more) carboxylate groups. For example, the aliphatic group can include polyacrylic acid. In some cases, the pendant hydrophilic group is one or more (e.g., 2, 3, 4, 5, 6, 7, 8, 9, 10 or more) sulfonate groups. In some cases, the pendant hydrophilic group is one or more (e.g., 2, 3, 4, 5, 6, 7, 8, 9, 10 or more) phosphate groups. In some aspects, the pendant hydrophilic group is one or more ammonium groups (e.g., tertiary and/or quaternary ammonium). In other aspects, the pendant hydrophilic group is one or more zwitterions (e.g., a betaine, such as poly(carboxybetaine) (pCB) and ammonium phosphonates such as phosphatidylcholine).

In some aspects, the $R_2$ segment includes charged groups that are capable of binding to a counterion to ionically crosslink the polymer the polymer network and form ionomers. In these aspects, for example, $R_2$ is an aliphatic or aromatic group having pendant amino, carboxylate, sulfonate, phosphate, ammonium, zwitterionic groups, or combinations thereof.

In various cases, the pendant hydrophilic group is at least one polyether, such as two polyethers. In other cases, the pendant hydrophilic group is at least one polyester. In various cases, the pendant hydrophilic group is a polylactone (e.g., polyvinylpyrrolidone). Each carbon atom of the pendant hydrophilic group can optionally be substituted with, e.g., $C_{1-6}$ alkyl. In some of these aspects, the aliphatic and aromatic groups can be graft polymers, wherein the pendant groups are homopolymers (e.g., polyethers, polyesters, polyvinylpyrrolidone).

In some aspects, the pendant hydrophilic group is a polyether (e.g., polyethylene oxide and polyethylene glycol), polyvinylpyrrolidone, polyacrylic acid, or combinations thereof.

The pendant hydrophilic group can be bonded to the aliphatic group or aromatic group through a linker. The linker can be any bifunctional small molecule (e.g., $C_{1-20}$) capable of linking the pendant hydrophilic group to the aliphatic or aromatic group. For example, the linker can include a diisocyanate, as previously described herein, which when linked to the pendant hydrophilic group and to the aliphatic or aromatic group forms a carbamate bond. In some aspects, the linker can be 4,4'-diphenylmethane diisocyanate (MDI), as shown below.

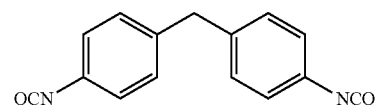

(Formula 3)

In some exemplary aspects, the pendant hydrophilic group is polyethylene oxide and the linking group is MDI, as shown below.

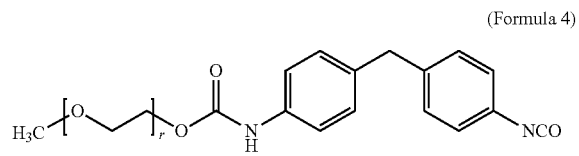

(Formula 4)

In some cases, the pendant hydrophilic group is functionalized to enable it to bond to the aliphatic or aromatic group, optionally through the linker. In various aspects, for example, when the pendant hydrophilic group includes an alkene group, which can undergo a Michael addition with a sulfhydryl-containing bifunctional molecule (i.e., a molecule having a second reactive group, such as a hydroxyl group or amino group), to result in a hydrophilic group that can react with the polymer backbone, optionally through the linker, using the second reactive group. For example, when the pendant hydrophilic group is polyvinylpyrrolidone, it can react with the sulfhydryl group on mercaptoethanol to result in hydroxyl-functionalized polyvinylpyrrolidone, as shown below.

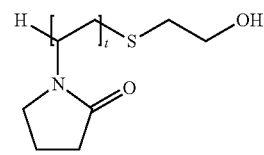

(Formula 5)

In some of the aspects disclosed herein, at least one $R_2$ segment is polytetramethylene oxide. In other exemplary aspects, at least one $R_2$ segment can be an aliphatic polyol functionalized with polyethylene oxide or polyvinylpyrrolidone, such as the polyols described in E.P. Patent No. 2 462 908. For example, the $R_2$ segment can be derived from the reaction product of a polyol (e.g., pentaerythritol or 2,2,3-trihydroxypropanol) and either MDI-derivatized methoxypolyethylene glycol (to obtain compounds as shown in Formulas 6 or 7) or with MDI-derivatized polyvinylpyrrolidone (to obtain compounds as shown in Formulas 8 or 9) that had been previously been reacted with mercaptoethanol, as shown below, (Formula 6)
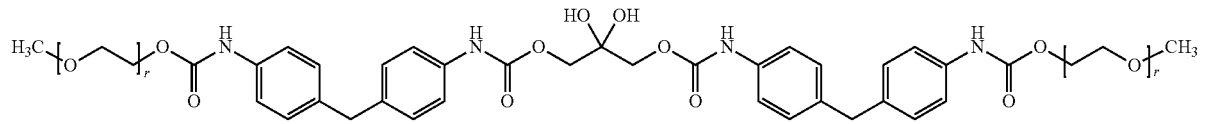

(Formula 7)
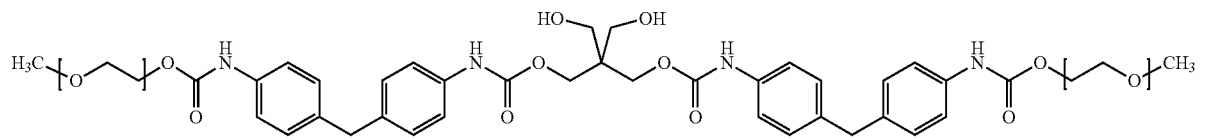

(Formula 8)
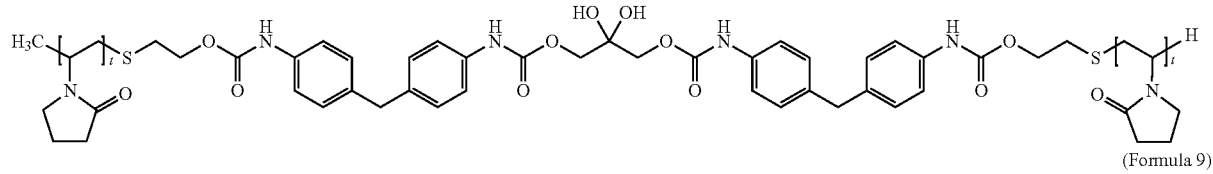

(Formula 9)
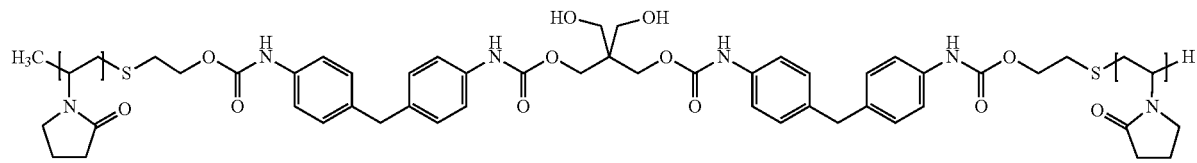

In various cases, at least one $R_2$ is a polysiloxane. In these cases, $R_2$ can be derived from a silicone monomer of Formula 10, such as a silicone monomer disclosed in U.S. Pat. No. 5,969,076, which is hereby incorporated by reference:

(Formula 10)
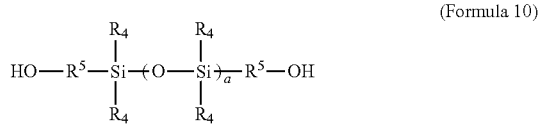

wherein:

a is 1 to 10 or larger (e.g., 1, 2, 3, 4, 5, 6, 7, 8, 9, or 10);

each $R^4$ independently is hydrogen, $C_{1-18}$ alkyl, $C_{2-18}$ alkenyl, aryl, or polyether; and each $R^5$ independently is $C_{1-10}$alkylene, polyether, or polyurethane.

In some aspects, each $R^4$ independently is H, $C_{1-10}$ alkyl, $C_{2-10}$ alkenyl, $C_{1-6}$ aryl, polyethylene, polypropylene, or polybutylene. For example, each $R^4$ can independently be selected from the group consisting of methyl, ethyl, n-propyl, isopropyl, n-butyl, isobutyl, s-butyl, t-butyl, ethenyl, propenyl, phenyl, and polyethylene.

In various aspects, each $R^5$ independently is $C_{1-10}$alkylene (e.g., methylene, ethylene, propylene, butylene, pentylene, hexylene, heptylene, octylene, nonylene, or decylene). In other cases, each $R^5$ is polyether (e.g., polyethylene, polypropylene, or polybutylene). In various cases, each $R^5$ is polyurethane.

In some aspects, the hydrogel includes a crosslinked polymeric network that includes copolymer chains that are derivatives of polyurethane. This crosslinked polymeric network can be produced by polymerizing one or more isocyanates with one or more polyamino compounds, polysulfhydryl compounds, or combinations thereof, as shown in Formulas 11 and 12, below:

(Formula 11)
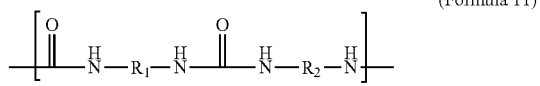

(Formula 12)
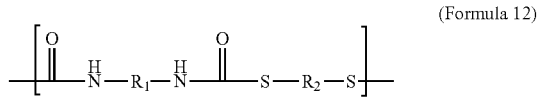

wherein the variables are as described above. Additionally, the isocyanates can also be chain extended with one or more polyamino or polythiol chain extenders to bridge two or more isocyanates, such as previously described for the polyurethanes of Formula 2.

In some aspects, the polyurethane hydrogel is composed of MDI, PTMO, and 1,4-butylene glycol, as described in U.S. Pat. No. 4,523,005, which is hereby incorporated by reference in its entirety.

In some aspects, the polyurethane hydrogel is physically crosslinked through e.g., nonpolar or polar interactions between the urethane or carbamate groups on the polymers (the hard segments), and is a thermoplastic polyurethane (TPU), or specifically, a hydrophilic thermoplastic polyurethane. In these aspects, component $R_1$ in Formula 1, and components $R_1$ and $R_3$ in Formula 2, forms the portion of the polymer often referred to as the "hard segment", and component $R_2$ forms the portion of the polymer often referred to as the "soft segment". In these aspects, the soft segment can be covalently bonded to the hard segment.

Commercially available thermoplastic polyurethane hydrogels suitable for the present use include, but are not limited to those under the tradename "TECOPHILIC", such as TG-500, TG-2000, SP-80A-150, SP-93A-100, SP-60D-60 (Lubrizol, Countryside, Ill.), "ESTANE" (e.g., ALR G 500; Lubrizol, Countryside, Ill.).

In various aspects, the polyurethane hydrogel is covalently crosslinked, as previously described herein.

In some aspects, the polyamide segment of the polyamide hydrogel comprises or consists essentially of a polyamide. The polyamide hydrogel can be formed from the polycondensation of a polyamide prepolymer with a hydrophilic prepolymer to form a block copolyamide.

In some aspects, the polyamide segment of the polyamide hydrogel can be derived from the condensation of polyamide prepolymers, such as lactams, amino acids, and/or diamino compounds with dicarboxylic acids, or activated forms thereof. The resulting polyamide segments include amide linkages (—(CO)NH—). The term "amino acid" refers to a molecule having at least one amino group and at least one carboxyl group. Each polyamide segment of the polyamide hydrogel can be the same or different.

In some aspects, the polyamide segment is derived from the polycondensation of lactams and/or amino acids, and includes an amide segment having a structure shown in Formula 13, below, wherein $R_6$ is the segment of the block copolymer derived from the lactam or amino acid, and $R_2$ is the segment derived from a hydrophilic prepolymer:

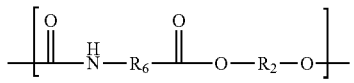

(Formula 13)

In some aspects, $R_6$ is derived from a lactam. In some cases, $R_6$ is derived from a $C_{3-20}$ lactam, or a $C_{4-15}$ lactam, or a $C_{6-12}$ lactam. For example, $R_6$ can be derived from caprolactam or laurolactam. In some cases, $R_6'$ is derived from one or more amino acids. In various cases, $R_6$ is derived from a $C_{4-25}$ amino acid, or a $C_{5-20}$ amino acid, or a $C_{8-15}$ amino acid. For example, $R_6'$ can be derived from 12-aminolauric acid or 11-aminoundecanoic acid.

In some cases, Formula 13 includes a polyamide-polyether block copolymer segment, as shown below:

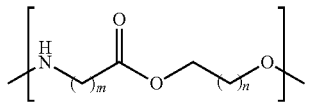

(Formula 14)

wherein m is 3-20, and n is 1-8. In some exemplary aspects, m is 4-15, or 6-12 (e.g., 6, 7, 8, 9, 10, 11, or 12), and n is 1 2, or 3. For example, m can be 11 or 12, and n can be 1 or 3.

In various aspects, the polyamide segment of the polyamide hydrogel is derived from the condensation of diamino compounds with dicarboxylic acids, or activated forms thereof, and includes an amide segment having a structure shown in Formula 15, below, wherein $R_7$ is the segment of the block copolymer derived from the diamino compound, $R_8$ is the segment derived from the dicarboxylic acid compound, and $R_2$ is the segment derived from a hydrophilic prepolymer:

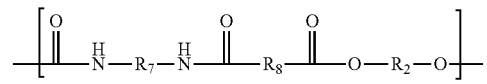

(Formula 15)

In some aspects, $R_7$ is derived from a diamino compound that includes an aliphatic group having $C_{4-15}$ carbon atoms, or $C_{5-10}$ carbon atoms, or $C_{6-9}$ carbon atoms. In some aspects, the diamino compound includes an aromatic group, such as phenyl, naphthyl, xylyl, and tolyl. Suitable diamino compounds include, but are not limited to, hexamethylene diamine (HMD), tetramethylene diamine, trimethyl hexamethylene diamine (TMD), m-xylylene diamine (MXD), and 1,5-pentamine diamine. In various aspects, $R_8$ is derived from a dicarboxylic acid or activated form thereof, includes an aliphatic group having $C_{4-15}$ carbon atoms, or $C_{5-12}$ carbon atoms, or $C_{6-10}$ carbon atoms. In some cases, the dicarboxylic acid or activated form thereof includes an aromatic group, such as phenyl, naphthyl, xylyl, and tolyl. Suitable carboxylic acids or activated forms thereof include, but are not limited to adipic acid, sebacic acid, terephthalic acid, and isophthalic acid. In some aspects, the copolymer chains are substantially free of aromatic groups.

In some aspects, each polyamide segment is independently derived from a polyamide prepolymer selected from the group consisting of 12-aminolauric acid, caprolactam, hexamethylene diamine and adipic acid.

Additionally, the polyamide hydrogels can also be chain extended with one or more polyamino, polycarboxyl (or derivatives thereof), or amino acid chain extenders, as previously described herein. In some aspects, the chain extender can include a diol, dithiol, amino alcohol, aminoalkyl mercaptan, hydroxyalkyl mercaptan, a phosphite or a bisacyllactam compound (e.g., triphenylphosphite, N,N'-terephthaloyl bis-laurolactam, and diphenyl isophthalate).

Each component $R_2$ of Formula 13 and 15 independently is polyether, polyester, polycarbonate, an aliphatic group, or an aromatic group, wherein the aliphatic group or aromatic group is substituted with one or more pendant hydrophilic groups, as previously described herein, wherein the pendant group can optionally be bonded to the aliphatic or aromatic group through a linker, as previously described herein.

In some aspects, $R_2$ is derived from a compound selected from the group consisting of polyethylene oxide (PEO), polypropylene oxide (PPO), polytetrahydrofuran (PTHF), polytetramethylene oxide (PTMO), a polyethylene oxide-functionalized aliphatic or aromatic group, a polyvinylpyrrolidone-functionalized aliphatic of aromatic group, and combinations thereof. In various cases, $R_2$ is derived from a compound selected from the group consisting of polyethylene oxide (PEO), polypropylene oxide (PPO), polytetramethylene oxide (PTMO), a polyethylene oxide-functionalized aliphatic or aromatic group, and combinations thereof. For example, $R_2$ can be derived from a compound selected from the group consisting of polyethylene oxide (PEO), polytetramethylene oxide (PTMO), and combinations thereof.

In some aspects, the polyamide hydrogel is physically crosslinked through, e.g., nonpolar or polar interactions between the polyamide groups on the polymers, and is a thermoplastic polyamide, or in particular, a hydrophilic thermoplastic polyamide. In these aspects, component $R_6$ in Formula 13 and components $R_7$ and $R_8$ in Formula 15 form the portion of the polymer often referred to as the "hard segment", and component R₂ forms the portion of the polymer often referred to as the "soft segment". Therefore, in some aspects, the hydrogel or crosslinked polymeric network can include a physically crosslinked polymeric network having one or more polymer chains with amide linkages.

In some aspects, the hydrogel or crosslinked polymeric network includes plurality of block copolymer chains, wherein at least a portion of the block copolymer chains each include a polyamide block and a hydrophilic block, (e.g., a polyether block) covalently bonded to the polyamide block to result in a thermoplastic polyamide block copolymer hydrogel (i.e., a polyamide-polyether block copolymer). In these aspects, the polyamide segments can interact with each other to form the crystalline region. Therefore, the polyamide block copolymer chains can each comprise a plurality of polyamide segments forming crystalline regions with other polyamide segments of the polyamide block copolymer chains, and a plurality of hydrophilic segments covalently bonded to the polyamide segments.

In some aspects, the polyamide is polyamide-11 or polyamide-12 and the polyether is selected from the group consisting of polyethylene oxide, polypropylene oxide, and polytetramethylene oxide. Commercially available thermoplastic polyamide hydrogels suitable for the present use include those under the tradename "PEBAX" (e.g., "PEBAX MH1657" and "PEBAX MV1074") from Arkema, Inc., Clear Lake, Tex.), and "SERENE" coating (Sumedics, Eden Prairie, Minn.).

In various aspects, the polyamide hydrogel is covalently crosslinked, as previously described herein.

In some aspects, the hydrogel comprises or consists essentially of a polyolefin hydrogel. The polyolefin hydrogel can be formed through free radical, cationic, and/or anionic polymerization by methods well known to those skilled in the art (e.g., using a peroxide initiator, heat, and/or light).

In some aspects, the hydrogel or crosslinked polymeric network can include one or more, or a plurality of, polyolefin chains. For instance, the polyolefin can include polyacrylamide, polyacrylate, polyacrylic acid and derivatives or salts thereof, polyacrylohalide, polyacrylonitrile, polyallyl alcohol, polyallyl ether, polyallyl ester, polyallyl carbonate, polyallyl carbamate, polyallyl sulfone, polyallyl sulfonic acid, polyallyl amine, polyallyl cyanide, polyvinyl ester, polyvinyl thioester, polyvinyl pyrrolidone, polyα-olefin, polystyrene, and combinations thereof. Therefore, the polyolefin can be derived from a monomer selected from the group consisting of acrylamide, acrylate, acrylic acid and derivatives or salts thereof, acrylohalide, acrylonitrile, allyl alcohol, allyl ether, allyl ester, allyl carbonate, allyl carbamate, allyl sulfone, allyl sulfonic acid, allyl amine, allyl cyanide, vinyl ester, vinyl thioester, vinyl pyrrolidone, α-olefin, styrene, and combinations thereof.

In some aspects, the polyolefin is derived from an acrylamide. Suitable acrylamides can include, but are not limited to, acrylamide, methacrylamide, ethylacrylamide, N,N-dimethylacrylamide, N-isopropylacrylamide, N-tert-butylacrylamide, N-isopropylmethacrylamide, N-phenylacrylamide, N-diphenylmethylacrylamide, N-(triphenylmethyl)methacrylamide, N-hydroxyethyl acrylamide, 3-acryloylamino-1-propanol, N-acryloylamido-ethoxyethanol, N-[tris(hydroxymethyl)methyl]acrylamide, N-(3-methoxypropyl)acrylamide, N-[3-(dimethylamino)propyl]methacrylamide, (3-acrylamidopropyl)trimethylammonium chloride, diacetone acrylamide, 2-acrylamido-2-methyl-1-propanesulfonic acid, salts of 2-acrylamido-2-methyl-1-propanesulfonic acid, 4-acryloylmorpholine, and combinations thereof. For example, the acrylamide prepolymer can be acrylamide or methacrylamide.

In some cases, the polyolefin is derived from an acrylate (e.g., acrylate and/or alkylacrylate). Suitable acrylates include, but are not limited to, methyl acrylate, ethyl acrylate, propyl acrylate, isopropyl acrylate, n-butyl acrylate, isobutyl acrylate, tert-butyl acrylate, hexyl acrylate, isooctyl acrylate, isodecyl acrylate, octadecyl acrylate, lauryl acrylate, 2-ethylhexyl acrylate, 4-tert-butylcyclohexyl acrylate, 3,5,5-trimethylhexyl acrylate, isobornyl acrylate, vinyl methacrylate, allyl methacrylate, methyl methacrylate, ethyl methacrylate, butyl methacrylate, isobutyl methacrylate, tert-butyl methacrylate, hexyl methacrylate, 2-ethylhexyl methacrylate, isodecyl methacrylate, lauryl methacrylate, stearyl methacrylate, cyclohexyl methacrylate, 3,3,5-trimethylcyclohexyl methacrylate, combinations thereof, and the like. For example, acrylate prepolymer can be methyl acrylate, ethyl methacrylate, or 2-hydroxyethyl methacrylate.

In some cases, the polyolefin is derived from an acrylic acid or a derivative or salt thereof. Suitable acrylic acids include, but are not limited to acrylic acid, sodium acrylate, methacrylic acid, sodium methacrylate, 2-ethylacrylic acid, 2-propylacrylic acid, 2-bromoacrylic acid, 2-(bromomethyl) acrylic acid, 2-(trifluoromethyl)acrylic acid, acryloyl chloride, methacryloyl chloride, and 2-ethyl acryloyl chloride.

In various aspects, the polyolefin can be derived from an allyl alcohol, allyl ether, allyl ester, allyl carbonate, allyl carbamate, allyl sulfone, allyl sulfonic acid, allyl amine, allyl cyanide, or a combination thereof. For example, the polyolefin segment can be derived from allyloxyethanol, 3-allyloxy-1,2-propanediol, allyl butyl ether, allyl benzyl ether, allyl ethyl ether, allyl phenyl ether, allyl 2,4,6-tribromophenyl ether, 2-allyloxybenzaldehyde, 2-allyloxy-2-hydroxybenzophenone, allyl acetate, allyl acetoacetate, allyl chloroacetate, allylcyanoacetate, allyl 2-bromo-2-methylpropionate, allyl butyrate, allyltrifluoroacetae, allyl methyl carbonate, tert-butyl N-allylcarbamate, allyl methyl sulfone, 3-allyloxy-2-hydroxy-1-propane sulfonic acid, 3-allyloxy-2-hydroxy-1-propanesulfonic acid sodium salt, allylamine, an allylamine salt, and allyl cyanide.

In some cases, the polyolefin can be derived from a vinyl ester, vinyl thioester, vinyl pyrrolidone (e.g., N-vinyl pyrrolidone), and combinations thereof. For example, the vinyl monomer can be vinyl chloroformate, vinyl acetate, vinyl decanoate, vinyl neodecanoate, vinyl neononanoate, vinylpivalate, vinyl propionate, vinyl stearate, vinyl valerate, vinyl trifluoroacetate, vinyl benzoate, vinyl 4-tert-butylbenzoate, vinyl cinnamate, butyl vinyl ether, tert-butyl vinyl ether, cyclohexyl vinyl ether, dodecyl vinyl ether, ethylene glycol vinyl ether, 2-ethylhexyl vinyl ether, ethyl vinyl ether, ethyl-1-propenyl ether, isobutyl vinyl ether, propyl vinyl ether, 2-chloroethyl vinyl ether, 1,4-butanediol vinyl ether, 1,4-cyclohexanedimethanol vinyl ether, di(ethylene glycol) vinyl ether, diethyl vinyl orthoformate, vinyl sulfide, vinyl halide, and vinyl chloride.

In some aspects, the polyolefin can be derived from an alpha-olefin, such as 1-octene, 1-nonene, 1-decene, 1-undecene, 1-dodecene, 1-tridecene, 1-tetradecene, 1-pentadecene, 1-hexadecene, 1-pentadecene, 1-heptadecene, and 1-octadecene.

In various cases, the polyolefin segment containing R₇ can be derived from a styrene. Suitable styrene monomers include styrene, α-bromostyrene, 2,4-diphenyl-4-methyl-1-pentene, α-methylstyrene, 4-acetoxy styrene, 4-benzhydryl styrene, 4-tert-butyl styrene, 2,4-dimethyl styrene, 2,5-dimethylstyrene, 2-methylstyrene, 3-methylstyrene, 4-methylstyrene, 2-(trifluoromethyl)styrene, 3-(trifluoromethyl)styrene, 4-(trifluoromethyl)styrene, 2,4,6-trimethyl styrene, vinylbenzyl chloride, 4-benzyloxy-3-methoxystyrene, 4-tert-butoxy styrene, 3,4-dimethoxystyrene, 4-ethoxystyrene, 4-vinylanisole, 2-bromostyrene, 3-bromostyrene, 4-bromosytrene, 4-chloro-α-methylstyrene, 2-chlorostyrene, 3-chlorostyrene, 4-chlorostyrene, 2,6-dichlorostyrene, 2,6-difluorostyrene, 2-fluorostyrene, 3-fluorostyrene, 4-fluorostyrene, 2,3,4,5,6-pentafluorostyrene, N,N-dimethylvinylbenzylamine, 2-isopropenylaniline, 4-[N-(methylaminoethyl)aminomethyl]styrene, 3-vinylaniline, 4-vinylaniline, (vinylbenzyl)trimethylammonium chloride, 4-(diphenylphosphino)styrene, 3-isopropenyl-α,α-dimethylbenzyl isocyanate, 3-nitrostyrene, 9-vinyl anthracene, 2-vinylnaphthalene, 4-vinylbenzocyclobutene, 4-vinylbiphenyl, and vinylbenzoic acid.

In some aspects, the polyolefin comprises a hydrophilic portion. The hydrophilic portion of the polyolefin hydrogel can be pendant to the polyolefin backbone, or the hydrophilic portion can function as a covalent crosslinker of the polyolefin hydrogel. In some aspects, the hydrophilic portion of the polyolefin hydrogel includes a pendant polyether, polyester, polycarbonate, hydroxyl, lactone (e.g., pyrrolidone), amino, carboxylate, sulfonate, phosphate, ammonium (e.g., tertiary and quaternary ammonium), zwitterion group (e.g., a betaine, such as poly(carboxybetaine) (pCB) and ammonium phosphonates such as phosphatidylcholine), or combinations thereof. Polyolefin hydrogels containing a pendant hydrophilic portion can be formed by copolymerizing a polyolefin monomer, as previously described, with a second polymer olefin monomer having a hydrophilic side chain, such as acrylic acid or polyvinylpyrrolidone).

In some aspects, the polyolefin hydrogel or crosslinked polymeric network includes a plurality of polyolefin chains wherein at least a portion of the polyolefin chains each comprise a first chain segment physically crosslinked to at least one other polyolefin chain of the plurality of polyolefin chains and one or more hydrophilic chain segments covalently bonded to the first chain segment.

In other aspects, the hydrophilic portion of the polyolefin hydrogel is a hydrophilic crosslinker. The crosslinker can include polyether, polyester, polycarbonate, hydroxyl, lactone (e.g., pyrrolidone), amino, carboxylate, sulfonate, phosphate, ammonium (e.g., tertiary and quaternary ammonium), a zwitterion (e.g., a betaine, such as poly(carboxybetaine) (pCB) and ammonium phosphonates such as phosphatidylcholine), and combinations thereof. The hydrophilic crosslinker can be derived from a molecule having at least two ethylenically-unsaturated groups, such as a polyethylene glycol dimethacrylate.

Suitable commercially available polyolefin films include, but are not limited to the "POLYOX" product line by Dow Chemical, Midland Mich., and styrenic block co-polymers. Examples of styrenic co-polymers include, but are not limited to TPE-s (e.g., styrene-butadiene-styrene (SBS) block copolymers, such as "SOFPRENE" and styrene-ethylene-butylene-styrene (SEBS) block copolymer, such as "LAPRENE", by SO.F.TER. GROUP, Lebanon, Tenn.); thermoplastic copolyester elastomers (e.g., thermoplastic elastomer vulconates (TPE-v or TPV)), such as "FORPRENE" by SO.F.TER. GROUP), "TERMOTON-V" by Termopol, Istanbul Turkey; and TPE block copolymers, such as "SANTOPRENE" (ExxonMobil, Irving, Tex.).

In some aspects, the polyolefin prepolymer described above is co-polymerized with a silicone prepolymer to form a silicone hydrogel. In these aspects, the silicone prepolymer, the polyolefin prepolymer, or both can function as the crosslinker.

Examples of silicone monomers include, but are not limited to, 3-methacryloxypropyl tris(trimethylsiloxy)silane (TRIS), and monomethacryloxypropyl terminated polydimethylsiloxane (mPDMS), m vinyl [3-[,3,3-trimethyl-1,1bis(trimethylsilyoxy)-disiloxanyl]propyl]carbamate, 3-methacryl oxypropyl-bis(trimethyl siloxy)methyl silane, and methacryloxypropylpentamethyl disiloxane.

As discussed above, the hydrogel-containing material can also optionally include one or more additives, such as antioxidants, colorants, stabilizers, anti-static agents, wax packages, antiblocking agents, crystal nucleating agents, melt strength enhancers, anti-stain agents, stain blockers, hydrophilicity-enhancing additives, and combinations thereof.

Examples of particularly suitable additives include hydrophilicity-enhancing additives, such as one or more superabsorbent polymers (e.g., superabsorbent polyacrylic acid or copolymers thereof). Examples of hydrophilicity-enhancing additives include those commercially available under the tradenames "CREASORB" or "CREABLOCK" by Evonik, Mobile, Ala., "HYSORB" by BASF, Wyandotte, Mich., "WASTE LOCK PAM" by $M^2$ Polymer Technologies, Inc., Dundee Township, Ill., and "AQUA KEEP" by Sumitomo Seika, New York, N.Y. The incorporation of the hydrophilicity-enhancing additive can assist the hydrogel by increasing the water uptake rate and/or capacity for the hydrogel-containing material. Examples of suitable concentrations of the hydrophilicity-enhancing additive in the hydrogel-containing material range from 0.1% to 15% by weight, from 0.5% to 10% by weight, or from 1% to 5% by weight, based on the total weight of the hydrogel-containing material.

In some aspects, the hydrogel-containing material can define an exterior or externally-facing surface of the component or article. Alternatively, a water-permeable membrane can define the exterior externally-facing surface of the component or article, and can be in direct contact with the hydrogel-containing material. For example, at least a portion of the exterior surface of the component or article can be defined by a first side of the water-permeable membrane, with the hydrogel-containing material present between the substrate and the membrane.

The level of water permeability of the water-permeable membrane is sufficient for water to rapidly partition from the exterior surface (i.e., the first side of the membrane), across the second side of the membrane, and into the hydrogel-containing material. For example, the level of water permeability of the water-permeable membrane can be sufficient for a sample of the component or article obtained in accordance with the Article Sampling Procedure to have a water uptake capacity of greater than 40% by weight at 24 hours and/or at 1 hour.

The components and articles of the present disclosure can be manufactured using a variety of different manufacturing techniques. For example, the hydrogel-containing material and the substrate can be formed using methods such as injection molding, cast molding, thermoforming, vacuum forming, extrusion, spray coating, and the like.

In one aspect, the hydrogel-containing material is joined with a substrate with the use of a co-extrusion. In this case, the hydrogel-containing material can be co-extruded with a thermoplastic material used to form a thin backing substrate, where the resulting co-extrudate can be provided in a web or sheet form. The web or sheet can then be placed in a vacuum thermoforming tool to produce the three-dimensional geometry of the external-facing side. The backing substrate provides a first function in this step by creating a structural support for the relatively thinner and weaker hydrogel-containing material.

The co-extruded web/sheet can then be placed in a mold cavity, where the hydrogel-containing material is preferably positioned away from the injection sprues. Another thermoplastic material can then be back injected into the mold to bond to the backing substrate, opposite of the hydrogel-containing material. This illustrates the second function of the backing substrate, namely to protect the hydrogel-containing material from the injection pressure. The injected thermoplastic material can be the same or different from the material used to produce the backing substrate. Preferably, they include the same or similar materials (e.g., both being thermoplastic polyurethanes).

In another aspect, the hydrogel-containing material is joined with the substrate with the use of injection molding. In this case, a substrate material is preferably injected into a mold to produce the backing substrate. The backing substrate can then be back injected with the hydrogel-containing material to produce the hydrogel-containing material bonded to the backing substrate.

In either aspect, after the web/sheet is manufactured, it can be directly or indirectly secured to the body of a component or article to provide an article of the present disclosure. In particular, hydrogel-containing material can function as an external-facing surface of the component or article.

Property Analysis and Characterization Procedure

Various properties can be determined for materials present on exterior surfaces of components and articles according to the following methodologies.

1. Sampling Procedures

As mentioned above, it has been found that when the hydrogel-containing material is secured to another substrate, the interfacial bond can restrict the extent that the hydrogel-containing material can take up water and/or swell. As such, various properties of the hydrogel-containing material can be characterized using samples prepared with the following sampling procedures:

A. Article Sampling Procedure

This procedure can be used to obtain a sample of the hydrogel-containing material from a component of an article or from the article itself. This procedure may be used to obtain a sample of the hydrogel-containing material when it is present on a component of an article (e.g., when the hydrogel-containing material is affixed to a substrate, or when the hydrogel-containing material is integrally formed in the component). A sample including the hydrogel-containing material in a non-wetted state (e.g., at 25° C. and 20% relative humidity) is cut from the component or article using a blade, or other suitable cutting instrument (e.g., saw, scissors, tin snips). Alternatively, the process may be performed by first separating the component of the article from an associated component of the article. The process is performed by separating the sample of the hydrogel-containing material from the remainder of the component or article, and removing any other materials from the sample that can uptake water and potentially skew the water uptake measurements of the sample. For example, a sample surface can be skinned, abraded, scraped, or otherwise cleaned to remove any adhesives, yarns, fibers, foams, and the like that could potentially take up water themselves. Depending on the size, composition, and complexity of a particular component or article, the entire component or article can constitute the sample. For example, components or articles having a small size, few or just a single component, or that are composed largely or entirely of the hydrogel-containing material can be used directly as the sample (e.g., a license plate, a mudflap).

The resulting sample includes the hydrogel-containing material and any substrate bonded thereto, and thus maintains the interfacial bond between the hydrogel-containing material and the associated substrate. As such, this test can simulate how the hydrogel-containing material will perform as part of a component or an article. Additionally, this sample is also useful in cases where the interfacial bond between the hydrogel-containing material and the substrate is less defined, such as where the hydrogel-containing material is highly diffused into the substrate (e.g., with a concentration gradient).

The sample is taken at a location on the component or article that provides a substantially constant thickness for the hydrogel-containing material (within +/−10% of the average thickness), and has a surface area of 4 square centimeters ($cm^2$). In cases where the hydrogel-containing material is not present on the substrate in any segment having a 4 $cm^2$ surface area and/or where the material thickness is not substantially constant for a segment having a 4 $cm^2$ surface area, sample sizes with smaller cross-sectional surface areas can be taken and the area-specific measurements adjusted accordingly.

B. Co-extruded Film Sampling Procedure

This procedure can be used to obtain a sample of hydrogel-containing material when it is co-extruded onto a backing substrate. The backing substrate is produced from a second material that is compatible with the hydrogel-containing material.

It has been found that samples taken from co-extrusions are suitable substitutes to samples taken from components or articles. Additionally, this sample is also useful in cases where the interfacial bond between the hydrogel-containing material and the backing substrate is less defined, such as where the hydrogel-containing material is highly diffused into the material of the backing substrate (e.g., with a concentration gradient).

In this case, the hydrogel-containing material is co-extruded with the backing substrate as a web or sheet having a substantially constant film thickness for the hydrogel-containing material (within +/−10% of the average thickness), and cooled to solidify the resulting web or sheet. A sample of the hydrogel-containing material secured to the backing substrate is then cut from the resulting web or sheet, with a sample size surface area of 4 $cm^2$, such that the hydrogel-containing material of the resulting sample remains secured to the backing substrate.

C. Neat Film Sampling Procedure

This procedure can be used to obtain a sample of the hydrogel-containing material as a film when the hydrogel-containing material is isolated in a neat form (i.e., without any bonded substrate). In this case, the hydrogel-containing material is extruded as a web or sheet having a substantially constant thickness for the hydrogel-containing material (within +/−10% of the average thickness), and cooled to solidify the resulting web or sheet. A sample of the hydrogel-containing material having a surface area of 4 $cm^2$ is then cut from the resulting web or sheet.

Alternatively, if a source of the hydrogel-containing material is not available in a neat form, the hydrogel-containing material can be cut from a substrate of a component or an article, or from a backing substrate of a co-extruded sheet or web, thereby isolating the hydrogel-containing material. In either case, a sample of the hydrogel-containing material having a surface area of 4 cm² is then cut from the resulting isolated hydrogel-containing material.

D. Neat Material Sampling Procedure

This procedure can be used to obtain a sample of a hydrogel-containing material used to form the hydrogel-containing material as a film. In this case, the hydrogel-containing material is provided in media form, such as flakes, granules, powders, pellets, and the like. If a source of the hydrogel-containing material is not available in a neat form, the material can be cut, scraped, or ground from a substrate, a component, or an article, or from a backing substrate of a co-extruded sheet or web, thereby isolating the hydrogel-containing material.

2. Water Uptake Capacity Test

This test measures the water uptake capacity of the hydrogel-containing material after a given soaking duration for a sample (e.g., taken with the above-discussed Article Sampling Procedure, Co-extruded Film Sampling Procedure, or the Neat Film Sampling Procedure). The sample is initially dried at 60° C. until there is no weight change for consecutive measurement intervals of at least 30 minutes apart (e.g., a 24-hour drying period at 60° C. is typically a suitable duration). The total weight of the dried sample ($Wt_{,sample,dry}$) is then measured in grams. The dried sample is then allowed to cool down to 25° C., and is fully immersed in a deionized water bath maintained at 25° C. After a given soaking duration, the sample is removed from the deionized water bath, blotted with a cloth to remove surface water, and the total weight of the soaked sample ($Wt_{,sample,wet}$) is measured in grams.

Any suitable soaking duration can be used, where a 24-hour soaking duration is believed to simulate saturation conditions for the material of the present disclosure. Accordingly, as used herein, the expression "having a water uptake capacity at 5 minutes of . . . " refers to a soaking duration of 5 minutes, having a water uptake capacity at 1 hour of . . . " refers to a soaking duration of 1 hour, the expression "having a water uptake capacity at 24 hours of . . . " refers to a soaking duration of 24 hours, and the like.

As can be appreciated, the total weight of a sample taken pursuant to the Article Sampling Procedure or the Co-extruded Film Sampling Procedure includes the weight of the hydrogel-containing material as dried or soaked ($Wt_{,film,dry}$ or $Wt_{,film,wet}$) and the weight of the backing substrate ($Wt_{,substrate}$). In order to determine a change in weight of the hydrogel-containing material due to water uptake, the weight of the substrate ($Wt_{,substrate}$) needs to be subtracted from the sample measurements.

The weight of the substrate ($Wt_{,substrate}$) is calculated using the sample surface area (e.g., 4 cm²), an average measured thickness of the substrate in the sample, and the average density of the substrate material. Alternatively, if the density of the material for the substrate is not known or obtainable, the weight of the substrate ($Wt_{,substrate}$) is determined by taking a second sample using the same sampling procedure as used for the primary sample, and having the same dimensions (surface area and film/substrate thicknesses) as the primary sample. The hydrogel-containing material of the second sample is then cut apart from the substrate of the second sample to provide an isolated substrate. The isolated substrate is then dried at 60° C. for 24 hours, which can be performed at the same time as the primary sample drying. The weight of the isolated substrate ($Wt_{,substrate}$) is then measured in grams.

The resulting substrate weight ($Wt_{,substrate}$) is then subtracted from the weights of the dried and soaked primary sample ($Wt_{,sample,dry}$ and $Wt_{,sample,wet}$) to provide the weights of the hydrogel-containing material as dried and soaked ($Wt_{,film,dry}$ and $Wt_{,film,wet}$), as depicted below by Equations 1 and 2:

$$Wt_{,film,dry} = Wt_{,sample,dry} - Wt_{,substrate} \quad \text{(Equation 1)}$$

$$Wt_{,film,wet} = Wt_{,sample,wet} - Wt_{,substrate} \quad \text{(Equation 2)}$$

For hydrogel-containing material samples taken pursuant to the Neat Film Sampling Procedure, the substrate weight ($Wt_{,substrate}$) is zero. As such, Equation 1 collapses to $Wt_{,film,dry} = Wt_{,sample,dry}$, and Equation 2 collapses to $Wt_{,film,wet} = Wt_{,sample,wet}$.

The weight of the dried hydrogel-containing material ($Wt_{,film,dry}$) is then subtracted from the weight of the soaked hydrogel-containing material ($Wt_{,film,wet}$) to provide the weight of water that was taken up by the hydrogel-containing material, which is then divided by the weight of the dried hydrogel-containing material ($Wt_{,film,dry}$) to provide the water uptake capacity for the given soaking duration as a percentage, as depicted below by Equation 3:

$$\text{Water Uptake Capacity} = \frac{Wt_{,film,wet} - Wt_{,film,dry}}{Wt_{,film,dry}} (100\%) \quad \text{(Equation 3)}$$

For example, a water uptake capacity of 50% at 1 hour means that the soaked hydrogel-containing material weighed 1.5 times more than its dry-state weight after soaking for 1 hour, where there is a 1:2 weight ratio of water to hydrogel-containing material. Similarly, a water uptake capacity of 500% at 24 hours means that the soaked hydrogel-containing material weighed 5 times more than its dry-state weight after soaking for 24 hours, where there is a 4:1 weight ratio of water to hydrogel-containing material.

3. Water Uptake Rate Test

This test measures the water uptake rate of the hydrogel-containing material by modeling weight gain as a function of soaking time for a sample with a one-dimensional diffusion model. The sample can be taken with any of the above-discussed Article Sampling Procedure, Co-extruded Film Sampling Procedure, or the Neat Film Sampling Procedure. The sample is initially dried at 60° C. until there is no weight change for consecutive measurement intervals of at least 30 minutes apart (a 24-hour drying period at 60° C. is typically a suitable duration). The total weight of the dried sample ($Wt_{,sample,dry}$) is then measured in grams. Additionally, the average thickness of the hydrogel-containing material for the dried sample is measured for use in calculating the water uptake rate, as explained below.

The dried sample is then allowed to cooled down to 25° C., and is fully immersed in a deionized water bath maintained at 25° C. Between soaking durations of 1, 2, 4, 9, 16, and 25 minutes, the sample is removed from the deionized water bath, blotted with a cloth to remove surface water, and the total weight of the soaked sample ($Wt_{,sample,wet,t}$) is measured, where "t" refers to the particular soaking-duration data point (e.g., 1, 2, 4, 9, 16, or 25 minutes).

The exposed surface area of the soaked sample ($A_t$) is also measured with calipers for determining the specific weight gain, as explained below. The exposed surface area refers to the surface area that comes into contact with the deionized water when fully immersed in the bath. For samples obtained using the Article Sampling Procedure and the Co-extruded Film Sampling Procedure, the samples only have one major surface exposed. However, for samples obtained using the Neat Film Sampling Procedure, both major surfaces are exposed. For convenience, the surface areas of the peripheral edges of the sample are ignored due to their relatively small dimensions.

The measured sample is fully immersed back in the deionized water bath between measurements. The 1, 2, 4, 9, 16, and 25 minute durations refer to cumulative soaking durations while the sample is fully immersed in the deionized water bath (i.e., after the first minute of soaking and first measurement, the sample is returned to the bath for one more minute of soaking before measuring at the 2-minute mark).

As discussed above in the Water Uptake Capacity Test, the total weight of a sample taken pursuant to the Article Sampling Procedure or the Co-extruded Film Sampling Procedure includes the weight of the hydrogel-containing material as dried or soaked ($Wt_{,film,dry}$ or $Wt_{,film,wet,t}$) and the weight of the backing substrate ($Wt_{,substrate}$). In order to determine a weight change of the hydrogel-containing material due to water uptake, the weight of the substrate ($Wt_{,substrate}$) needs to be subtracted from the sample weight measurements. This can be accomplished using the same steps discussed above in the Water Uptake Capacity Test to provide the resulting hydrogel-containing material weights $Wt_{,film,dry}$ and $Wt_{,film,wet,t}$ for each soaking-duration measurement.

The specific weight gain ($Ws_{,film,t}$) from water uptake for each soaked sample is then calculated as the difference between the weight of the soaked sample ($Wt_{,film,wet,t}$) and the weight of the initial dried sample ($Wt_{,film,dry}$), where the resulting difference is then divided by the exposed surface area of the soaked sample ($A_t$), as depicted below by Equation 4:

$$Ws_{,film,t} = \frac{Wt_{,film,wet,t} - Wt_{,film,dry}}{A_t} \quad \text{(Equation 4)}$$

where t refers to the particular soaking-duration data point (e.g., 1, 2, 4, 9, 16, or 25 minutes), as mentioned above.

The water uptake rate for the hydrogel-containing material is then determined as the slope of the specific weight gains ($Ws_{,film,t}$) versus the square root of time (in minutes), as determined by a least squares linear regression of the data points. For the hydrogel-containing material of the present disclosure, the plot of the specific weight gains ($Ws_{,film,t}$) versus the square root of time (in minutes) provides an initial slope that is substantially linear (to provide the water uptake rate by the linear regression analysis). However, after a period of time depending on the thickness of the hydrogel-containing material, the specific weight gains will slow down, indicating a reduction in the water uptake rate, until the saturated state is reached. This is believed to be due to the water being sufficiently diffused throughout the hydrogel-containing material as the water uptake approaches saturation, and will vary depending on thickness.

As such, for the hydrogel-containing material having an average dried thickness (as measured above) less than 0.3 millimeters, only the specific weight gain data points at 1, 2, 4, and 9 minutes are used in the linear regression analysis. In these cases, the data points at 16 and 25 minutes can begin to significantly diverge from the linear slope due to the water uptake approaching saturation, and are omitted from the linear regression analysis. In comparison, for the hydrogel-containing material having an average dried thickness (as measured above) of 0.3 millimeters or more, the specific weight gain data points at 1, 2, 4, 9, 16, and 25 minutes are used in the linear regression analysis. The resulting slope defining the water uptake rate for the sampled hydrogel-containing material has units of weight/(surface area-square root of time), such as grams/(meter$^2$-minutes$^{1/2}$).

Furthermore, some film or substrate surfaces can create surface phenomenon that quickly attract and retain water molecules (e.g., via surface hydrogen bonding or capillary action) without actually drawing the water molecules into the film or substrate. Thus, samples of these films or substrates can show rapid specific weight gains for the 1-minute sample, and possibly for the 2-minute sample. After that, however, further weight gain is negligible. As such, the linear regression analysis is only applied if the specific weight gain data points at 1, 2, and 4 minutes continue to show an increase in water uptake. If not, the water uptake rate under this test methodology is considered to be about zero grams/(meter$^2$-minutes$^{1/2}$).

4. Swelling Capacity Test

This test measures the swelling capacity of the hydrogel-containing material in terms of increases in thickness and volume after a given soaking duration for a sample (e.g., taken with the above-discussed Article Sampling Procedure, Co-extruded Film Sampling Procedure, or the Neat Film Sampling Procedure). The sample is initially dried at 60° C. until there is no weight change for consecutive measurement intervals of at least 30 minutes apart (a 24-hour drying period is typically a suitable duration). The dimensions of the dried sample are then measured (e.g., thickness, length, and width for a rectangular sample; thickness and diameter for a circular sample, etc . . . ). The dried sample is then fully immersed in a deionized water bath maintained at 25° C. After a given soaking duration, the sample is removed from the deionized water bath, blotted with a cloth to remove surface water, and the same dimensions for the soaked sample are re-measured.

Any suitable soaking duration can be used. Accordingly, as used herein, the expressions "having a swelling thickness (or volume) increase at 5 minutes of . . . " refers to a soaking duration of 5 minutes, having a swelling thickness (or volume) increase at 1 hour of . . . " refers to a test duration of 1 hour, the expression "having a swelling thickness (or volume) increase at 24 hours of . . . " refers to a test duration of 24 hours, and the like.

The swelling of the hydrogel-containing material is determined by (i) an increase in the thickness between the dried and soaked hydrogel-containing material, by (ii) an increase in the volume between the dried and soaked hydrogel-containing material, or (iii) both. The increase in thickness between the dried and soaked hydrogel-containing material is calculated by subtracting the measured thickness of the initial dried hydrogel-containing material from the measured thickness of the soaked hydrogel-containing material. Similarly, the increase in volume between the dried and soaked hydrogel-containing material is calculated by subtracting the measured volume of the initial dried hydrogel-containing material from the measured volume of the soaked hydrogel-containing material. The increases in the thickness and volume can also be represented as percentage increases relative to the dry thickness or volume, respectively.

5. Contact Angle Test

This test measures the contact angle of the hydrogel-containing material surface based on a static sessile drop contact angle measurement for a sample (e.g., taken with the above-discussed Article Sampling Procedure, Co-extruded Film Sampling Procedure, or the Neat Film Sampling Procedure). The contact angle refers to the angle at which a liquid interface meets a solid surface, and is an indicator of how hydrophilic the surface is.

For a dry test (i.e., to determine a dry-state contact angle), the sample is initially equilibrated at 25° C. and 20% humidity for 24 hours. For a wet test (i.e., to determine a wet-state contact angle), the sample is fully immersed in a deionized water bath maintained at 25° C. for 24 hours. After that, the sample is removed from the bath and blotted with a cloth to remove surface water, and clipped to a glass slide if needed to prevent curling.

The dry or wet sample is then placed on a moveable stage of a contact angle goniometer commercially available under the tradename "RAME-HART F290" from Rame-Hart Instrument Co., Succasunna, N.J. A 10-microliter droplet of deionized water is then placed on the sample using a syringe and automated pump. An image is then immediately taken of the droplet (before hydrogel-containing material can take up the droplet), and the contact angle of both edges of the water droplet are measured from the image. The decrease in contact angle between the dried and wet samples is calculated by subtracting the measured contact angle of the wet hydrogel-containing material from the measured contact angle of the dry hydrogel-containing material.

6. Coefficient of Friction Test

This test measures the coefficient of friction of the hydrogel-containing material surface for a sample (e.g., taken with the above-discussed Article Sampling Procedure, Co-extruded Film Sampling Procedure, or the Neat Film Sampling Procedure). For a dry test (i.e., to determine a dry-state coefficient of friction), the sample is initially equilibrated at 25° C. and 20% humidity for 24 hours. For a wet test (i.e., to determine a wet-state coefficient of friction), the sample is fully immersed in a deionized water bath maintained at 25° C. for 24 hours. After that, the sample is removed from the bath and blotted with a cloth to remove surface water.

The measurement is performed with an aluminum sled mounted on an aluminum test track, which is used to perform a sliding friction test for test sample on an aluminum surface of the test track. The test track measures 127 millimeters wide by 610 millimeters long. The aluminum sled measures 76.2 millimeters×76.2 millimeters, with a 9.5 millimeter radius cut into the leading edge. The contact area of the aluminum sled with the track is 76.2 millimeters×66.6 millimeters, or 5,100 square millimeters).

The dry or wet sample is attached to the bottom of the sled using a room temperature-curing two-part epoxy adhesive commercially available under the tradename "LOCTITE 608" from Henkel, Düsseldorf, Germany. The adhesive is used to maintain the planarity of the wet sample, which can curl when saturated. A polystyrene foam having a thickness of about 25.4 millimeters is attached to the top surface of the sled (opposite of the test sample) for structural support.

The sliding friction test is conducted using a screw-driven load frame. A tow cable is attached to the sled with a mount supported in the polystyrene foam structural support, and is wrapped around a pulley to drag the sled across the aluminum test track. The sliding or frictional force is measured using a load transducer with a capacity of 2,000 Newtons. The normal force is controlled by placing weights on top of the aluminum sled, supported by the polystyrene foam structural support, for a total sled weight of 20.9 kilograms (205 Newtons). The crosshead of the test frame is increased at a rate of 5 millimeters/second, and the total test displacement is 250 millimeters. The coefficient of friction is calculated based on the steady-state force parallel to the direction of movement required to pull the sled at constant velocity. The coefficient of friction itself is found by dividing the steady-state pull force by the applied normal force. Any transient value relating static coefficient of friction at the start of the test is ignored.

7. Storage Modulus Test

This test measures the resistance of the hydrogel-containing material to being deformed (ratio of stress to strain) when a vibratory or oscillating force is applied to it, and is a good indicator of film compliance in the dry and wet states. For this test, a sample is provided in neat form using the Neat Film Sampling Procedure, which is modified such that the surface area of the test sample is rectangular with dimensions of 5.35 millimeters wide and 10 millimeters long. The thickness can range from 0.1 millimeters to 2 millimeters, and the specific range is not particularly limited as the end modulus result is normalized according to thickness.

The storage modulus (E') with units of megaPascals (MPa) of the sample is determined by dynamic mechanical analysis (DMA) using a DMA analyzer commercially available under the tradename "Q800 DMA ANALYZER" from TA Instruments, New Castle, Del., which is equipped with a relative humidity accessory to maintain the sample at constant temperature and relative humidity during the analysis.

Initially, the thickness of the test sample is measured using calipers (for use in the modulus calculations). The test sample is then clamped into the DMA analyzer, which is operated at the following stress/strain conditions during the analysis: isothermal temperature of 25° C., frequency of 1 Hertz, strain amplitude of 10 micrometers, preload of 1 Newton, and force track of 125%. The DMA analysis is performed at a constant 25° C. temperature according to the following time/relative humidity (RH) profile: (i) 0% RH for 300 minutes (representing the dry state for storage modulus determination), (ii) 50% RH for 600 minutes, (iii) 90% RH for 600 minutes (representing the wet state for storage modulus determination), and (iv) 0% RH for 600 minutes.

The E' value (in MPa) is determined from the DMA curve according to standard DMA techniques at the end of each time segment with a constant RH value. Namely, the E' value at 0% RH (i.e., the dry-state storage modulus) is the value at the end of step (i), the E' value at 50% RH is the value at the end of step (ii), and the E' value at 90% RH (i.e., the wet-state storage modulus) is the value at the end of step (iii) in the specified time/relative humidity profile.

The hydrogel-containing material can be characterized by its dry-state storage modulus, its wet-state storage modulus, or the reduction in storage modulus between the dry-state and wet-state, where wet-state storage modulus is less than the dry-state storage modulus. This reduction in storage modulus can be listed as a difference between the dry-state storage modulus and the wet-state storage modulus, or as a percentage change relative to the dry-state storage modulus.

8. Glass Transition Temperature Test

This test measures the glass transition temperature ($T_g$) of the hydrogel-containing material for a sample, where the hydrogel-containing material is provided in neat form, such as with the Neat Film Sampling Procedure or the Neat Material Sampling Procedure, with a 10-milligram sample weight. The sample is measured in both a dry state and a wet state (i.e., after exposure to a humid environment as described herein).

The glass transition temperature is determined with DMA using a DMA analyzer commercially available under the tradename "Q2000 DMA ANALYZER" from TA Instruments, New Castle, Del., which is equipped with aluminum hermetic pans with pinhole lids, and the sample chamber is purged with 50 milliliters/minute of nitrogen gas during analysis. Samples in the dry state are prepared by holding at 0% RH until constant weight (less than 0.01% weight change over 120 minute period). Samples in the wet state are prepared by conditioning at a constant 25° C. according to the following time/relative humidity (RH) profile: (i) 250 minutes at 0% RH, (ii) 250 minutes at 50% RH, and (iii) 1,440 minutes at 90% RH. Step (iii) of the conditioning program can be terminated early if sample weight is measured during conditioning and is measured to be substantially constant within 0.05% during an interval of 100 minutes.

After the sample is prepared in either the dry or wet state, it is analyzed by DSC to provide a heat flow versus temperature curve. The DSC analysis is performed with the following time/temperature profile: (i) equilibrate at −90° C. for 2 minutes, (ii) ramp at +10° C./minute to 250° C., (iii) ramp at −50° C./minute to −90° C., and (iv) ramp at +10° C./minute to 250° C. The glass transition temperature value (in Celsius) is determined from the DSC curve according to standard DSC techniques.

9. Impact Energy Test

This test measures the ability of a hydrogel-containing material sample to shed soil under particular test conditions, where the sample is prepared using the Co-extruded Film Sampling Procedure or the Neat Film Sampling Procedure (to obtain a suitable sample surface area). Initially, the sample is fully immersed in a water bath maintained at 25° C. for 24 hours), and then removed from the bath and blotted with a cloth to remove surface water.

The saturated test sample is then adhered to an aluminum block having a 25.4-millimeter thickness and a 76.2 millimeters×76.2 millimeters surface area, using a room temperature-curing two-part epoxy adhesive commercially available under the tradename "LOCTITE 608" from Henkel, Düsseldorf, Germany. The adhesive is used to maintain the planarity of the soaked sample, which can curl when saturated.

To expose the sample to soil, a bed of soil of about 75 millimeters in height is placed on top of a flat plastic plate. The soil is commercially available under the tradename "TIMBERLINE TOP SOIL", model 50051562, from Timberline (subsidiary of Old Castle, Inc., Atlanta, Ga.) and was sifted with a square mesh with a pore dimension of 1.5 millimeter on each side. The sample is then compressed into the soil under body weight. The weight is removed from the sample, and the sample is then twisted by 90 degrees in the plane of the plate and then lifted vertically. If no soil clogs the sample, no further testing is conducted.

However, if soil does clog the sample, the soil is knocked loose by dropping a 25.4-millimeter diameter steel ball weighing 67 grams onto the top side of the aluminum block (opposite of the test sample and clogged soil). The initial drop height is 152 millimeters (6 inches) above the aluminum block. If the soil does not come loose, the ball drop height is increased by an additional 152 millimeters (6 inches) and dropped again. This procedure of increasing the ball drop height by 152 millimeter (6 inch) increments is repeated until the soil on the bottom of the aluminum block (i.e., on the sample) is knocked loose.

This test is run 10 times per test sample. For each run, the ball drop height can be converted into unclogging impact energy by multiplying the ball drop height by the ball mass (67 grams) and the acceleration of gravity (9.8 meters/second). The unclogging impact energy in Joules equals the ball drop height in inches multiplied by 0.0167. The procedure is performed on both the aluminum block with the hydrogel-containing material sample and a control aluminum block without the hydrogel-containing material, and the relative ball drop height, and therefore relative impact energy, is determined as the ball drop height for the aluminum block with the hydrogel-containing material sample divided by the control aluminum block without the hydrogel-containing material. A result of zero for the relative ball drop height (or relative impact energy) indicates that no soil clogged to the aluminum block initially when the sample was compressed into the test soil (i.e., in which case the ball drop and control portions of the test are omitted).

10. Soil Shedding Test

This test measures the mud shedding ability of a component or an article, and does not require any sampling procedure. Initially, the component or article is fully immersed in a water bath maintained at 25° C. for 20 minutes), and then removed from the bath and blotted with a cloth to remove surface water, and its initial weight is measured.

The soaked component/article is then placed on a support and positioned as the article is positioned during normal use. The component or article is then exposed to test soil in a manner which approximates the manner in which the component or article is exposed to mud or dirt during normal use. For example, if the component or article is a mudflap for a vehicle, the mudflap is positioned vertically, at an angle approximating the angle it is attached in a wheel well of a vehicle during normal use. Soil is then sprayed at the mudflap. The amount and velocity of the soil are selected to approximate the conditions which the component or article would be exposed to during normal use. The test soil is commercially available under the tradename "TIMBERLINE TOP SOIL", model 50051562, from Timberline (subsidiary of Old Castle, Inc., Atlanta, Ga.), and the moisture content is adjusted so that the shear strength value is between 3 and 4 kilograms/cm$^2$ on a shear vane tester available from Test Mark Industries (East Palestine, Ohio.

After the test is complete, the component/article is carefully removed from the support and its post-test weight is measured. The difference between the post-test weight and the initial weight of the component or article, due to soil accumulation, is then determined.

Although the present disclosure has been described with reference to particular examples, workers skilled in the art will recognize that changes may be made in form and detail without departing from the spirit and scope of the disclosure.

Clauses

1. An article of manufacture comprising: a first external surface; and a material defining at least a portion of the first external surface, the material compositionally comprising a polymeric hydrogel, and having a water uptake capacity at 24 hours greater than 40% by weight, as characterized by the Water Uptake Capacity Test with the Article Sampling Procedure.

2. The article of clause 1, wherein at least a portion of the first external surface collects soil or is exposed to soil during use of the article.

3. The article of clause 1 or 2, wherein the material has a water uptake rate of at least 20 g/(m$^2$×min$^{0.5}$), as characterized by the Water Uptake Rate Test with the Article Sampling Procedure.

4. The article of any one of the preceding clauses, wherein the material has a swell thickness increase at 1 hour of greater than 120%, as characterized by the Swell Capacity Test with the Article Sampling Procedure.

5. The article of any one of the preceding clauses, wherein the material has a wet-state glass transition temperature and a dry-state glass transition temperature, each as characterized by the Glass Transition Temperature Test with the Neat Material Sampling Procedure, and wherein the wet-state glass transition temperature is at least 6° C. less than the dry-state glass transition temperature.

6. The article of any one of the preceding clauses, wherein the material has a wet-state storage modulus and a dry-state storage modulus, each as characterized by the Storage Modulus Test with the Neat Material Sampling Procedure, and wherein the wet-state storage modulus is at least 25 MPa lower than the dry-state storage modulus of the material.

7. The article of any one of the preceding clauses, wherein the first external surface has a wet-state contact angle less than 80° as characterized by the Contact Angle Test with the Article Sampling Procedure.

8. The article of any one of the preceding clauses, wherein the material defining at least a portion of the first external surface of the article has a dry-state thickness ranging from 0.1 millimeters to 5 millimeters, and wherein the polymeric hydrogel of the material compositionally comprises a cross-linked polymeric network that has a plurality of copolymer chains, the plurality of copolymer chains comprising one or more hard segments physically crosslinked to other hard segments of the copolymer chains; and one or more hydrophilic soft segments covalently bonded to the hard segments, wherein the one or more hydrophilic soft segments are present in the copolymer chains at a ratio ranging from 20:1 to 110:1 by weight relative to the one or more hard segments.

9. The article of any one of the preceding clauses, wherein the polymeric hydrogel of the material compositionally comprises semi-crystalline regions and amorphous regions, and wherein the amorphous regions are covalently bonded to the semi-crystalline regions with carbamate linkages, and are present in the polymeric hydrogel at a ratio of at least 20:1 by weight relative to the semi-crystalline regions.

10. The article of any one of the preceding clauses, wherein the polymeric hydrogel comprises a physically crosslinked polymer network having one or more polyurethane chains.

11. The article of any one of the preceding clauses, wherein the material is present on the first external surface of the article in the form of a film.

12. The article of any one of the preceding clauses, wherein the first external surface comprises one or more of a polymeric material, a composite material, a natural leather material, natural stone, a metallic material, a ceramic material, a porcelain material, or a glass material, or combinations thereof.

13. The article of any one of the preceding clauses, further comprising a substrate body, wherein the material is secured to the substrate body.

14. The article of clause 13, further comprising a tie layer, wherein the material is secured to and covers at least a portion of the tie layer, the tie layer being disposed between the substrate body and the material.

15. The article of any one of the preceding clauses, wherein the article is a plumbing article or a component of a plumbing article, a component of a vehicle, a transportation container or a component of a transportation container, a refuse container or a component of a refuse container, an article of construction equipment or a component of an article of construction equipment, an article of play equipment or a component of an article of play equipment, an article of landscaping equipment or a component of an article of landscaping equipment, or an article of furniture or a component of an article of furniture.

16. The article of any one of the preceding clauses, wherein the article is a first component of a second article of manufacture.

17. An article of manufacture comprising the first component of clause 16 and a second component secured to at least a portion of the first component to form the second article such that the first external surface of the first component is externally facing on the second article.

18. The article of clause 17, wherein the first component of the second article prevents or reduces soil accumulation on the first component such that the second article retains at least 15% less soil by weight as compared to a third article of manufacture which is identical to the second article except that the third article of manufacture is free of the material.

19. The article of clause 17 or 18, wherein the material reduces a force of adhesion of accumulated soil on the first component such that at least 10% less force is required to dislodge the accumulated soil from the first component of the second article as compared to a third article of manufacture which is identical to the second article except that the third article of manufacture is free of the material.

20. The article of any one of clauses 17-19, wherein the article is selected from a mud flap, a windshield wiper, a license plate, a rim of a wheel, a tire sidewall, a hubcap, a bumper, a side-view mirror, a piece of luggage, a cooler, a bag, a stroller, a mail delivery cart, a cone, a pylon, a sign, outdoor tape, a barricade, toys, outdoor play equipment, and a toilet.

21. A method of manufacturing the article of clause 17, wherein the method comprises receiving the first component, receiving the second component, and securing the at least a portion of the first component to the second component to form the second article such that the first external surface of the first component is externally facing on the second article.

22. A method of deflecting soil from the article of any one of clauses 1-20 comprising: wetting the material defining at least a portion of the first external surface; and exposing the material defining at least a portion of the first external surface to soil.

23. The method of clause 22, wherein the wetting and exposing are conducted simultaneously.

24. The method of clause 22 or 23, wherein wetting the material comprises contacting the material with an aqueous liquid.

25. Use of a material compositionally comprising a polymeric hydrogel, the material having a water uptake capacity at 24 hours greater than 40% by weight, as characterized by the Water Uptake Capacity Test with the Article Sampling Procedure, to deflect soil from a first external surface of an article, by providing the material on at least a portion of the first external surface of the article, wetting the material, and exposing the material to soil.

What is claimed is:

1. An article of manufacture comprising:
a first external surface, wherein the first external surface comprises a natural leather material; and
a material defining at least a portion of the first external surface, the material compositionally comprising a polymeric hydrogel, and having a water uptake capacity at 24 hours greater than 40% by weight, as characterized by the Water Uptake Capacity Test with the Article Sampling Procedure.

2. The article of claim 1, wherein at least a portion of the first external surface collects soil or is exposed to soil during use of the article.

3. The article of claim 1, wherein the material has a water uptake rate of at least 20 g/(m$^2$×min$^{0.5}$), as characterized by the Water Uptake Rate Test with the Article Sampling Procedure.

4. The article of claim 1, wherein the material has a swell thickness increase at 1 hour of greater than 120%, as characterized by the Swell Capacity Test with the Article Sampling Procedure.

5. The article of claim 1, wherein the material has a wet-state glass transition temperature and a dry-state glass transition temperature, each as characterized by the Glass Transition Temperature Test with the Neat Material Sampling Procedure, and wherein the wet-state glass transition temperature is at least 6° C. less than the dry-state glass transition temperature.

6. The article of claim 1, wherein the material has a wet-state storage modulus and a dry-state storage modulus, each as characterized by the Storage Modulus Test with the Neat Material Sampling Procedure, and wherein the wet-state storage modulus is at least 25 MPa lower than the dry-state storage modulus of the material.

7. The article of claim 1, wherein the first external surface has a wet-state contact angle less than 80° as characterized by the Contact Angle Test with the Article Sampling Procedure.

8. The article of claim 1, wherein the polymeric hydrogel comprises a physically crosslinked polymer network having one or more polyurethane chains.

9. The article of claim 1, wherein the material is present on the first external surface of the article in the form of a film.

10. The article of claim 1, further comprising a substrate body, wherein the material is secured to the substrate body.

11. The article of claim 10, further comprising a tie layer, wherein the material is secured to and covers at least a portion of the tie layer, the tie layer being disposed between the substrate body and the material.

12. The article of claim 1, wherein a component of a vehicle, a transportation container or a component of a transportation container, a refuse container or a component of a refuse container, an article of construction equipment or a component of an article of construction equipment, an article of play equipment or a component of an article of play equipment, an article of landscaping equipment or a component of an article of landscaping equipment, or an article of furniture or a component of an article of furniture.

13. The article of claim 1, wherein the article is selected from a mud flap, a bumper, a piece of luggage, a cooler, a bag, a stroller, a mail delivery cart, a sign, outdoor tape, a barricade, toys, and outdoor play equipment.

14. The article of claim 1, wherein the material defining at least a portion of the first external surface of the article has a dry-state thickness ranging from 0.1 millimeters to 5 millimeters, and wherein the polymeric hydrogel of the material compositionally comprises a crosslinked polymeric network that has a plurality of polymer chains, the plurality of polymer chains comprising one or more hard segments physically crosslinked to other hard segments of the polymer chains; and one or more hydrophilic soft segments covalently bonded to the hard segments, wherein the one or more hydrophilic soft segments are present in the polymer chains at a ratio ranging from 20:1 to 110:1 by weight relative to the one or more hard segments.

15. An article of manufacture comprising:
a first external surface; and
a material defining at least a portion of the first external surface, the material compositionally comprising a polymeric hydrogel, and having a water uptake capacity at 24 hours greater than 40% by weight, as characterized by the Water Uptake Capacity Test with the Article Sampling Procedure, wherein the material defining at least a portion of the first external surface of the article has a dry-state thickness ranging from 0.1 millimeters to 5 millimeters, and wherein the polymeric hydrogel of the material compositionally comprises a crosslinked polymeric network that has a plurality of polymer chains, the plurality of polymer chains comprising one or more hard segments physically crosslinked to other hard segments of the polymer chains; and one or more hydrophilic soft segments covalently bonded to the hard segments, wherein the one or more hydrophilic soft segments are present in the polymer chains at a ratio ranging from 20:1 to 110:1 by weight relative to the one or more hard segments,
wherein the article is selected from a mud flap, a windshield wiper, a license plate, a rim of a wheel, a tire sidewall, a hubcap, a bumper, a side-view mirror, a piece of luggage, a cooler, a bag, a stroller, a mail delivery cart, a cone, a pylon, a sign, a barricade, and a toilet.

16. The article of claim 15, wherein at least a portion of the first external surface collects soil or is exposed to soil during use of the article.

17. The article of claim 15, wherein the material has a water uptake rate of at least 20 g/(m$^2$×min$^{0.5}$), as characterized by the Water Uptake Rate Test with the Article Sampling Procedure.

18. The article of claim 15, wherein the material has a swell thickness increase at 1 hour of greater than 120%, as characterized by the Swell Capacity Test with the Article Sampling Procedure.

19. The article of claim 15, wherein the material has a wet-state glass transition temperature and a dry-state glass transition temperature, each as characterized by the Glass Transition Temperature Test with the Neat Material Sampling Procedure, and wherein the wet-state glass transition temperature is at least 6° C. less than the dry-state glass transition temperature.

20. The article of claim 15, wherein the material has a wet-state storage modulus and a dry-state storage modulus, each as characterized by the Storage Modulus Test with the Neat Material Sampling Procedure, and wherein the wet-state storage modulus is at least 25 MPa lower than the dry-state storage modulus of the material.

21. The article of claim 15, wherein the first external surface has a wet-state contact angle less than 80° as characterized by the Contact Angle Test with the Article Sampling Procedure.

22. The article of claim 15, wherein the material is present on the first external surface of the article in the form of a film.

23. The article of claim 15, wherein the first external surface comprises one or more of a polymeric material, a composite material, a natural leather material, natural stone, a metallic material, a ceramic material, a porcelain material, or a glass material, or combinations thereof.

24. The article of claim 15, further comprising a substrate body, wherein the material is secured to the substrate body.

25. The article of claim 24, further comprising a tie layer, wherein the material is secured to and covers at least a portion of the tie layer, the tie layer being disposed between the substrate body and the material.

26. The article of claim 15, wherein the article is a mud flap.

27. The article of claim 15, wherein the article is a windshield wiper.

28. The article of claim 15, wherein the article is a cone.

29. The article of claim 15, wherein the article is a pylon.

30. The article of claim 15, wherein the article is a toilet.

31. An article of manufacture comprising:
a first external surface; and
a material defining at least a portion of the first external surface, the material compositionally comprising a polymeric hydrogel, and having a water uptake capacity at 24 hours greater than 40% by weight, as characterized by the Water Uptake Capacity Test with the Article Sampling Procedure,
wherein the article is selected from a mud flap, a windshield wiper, a license plate, a rim of a wheel, a tire sidewall, a hubcap, a bumper, a side-view mirror, a piece of luggage, a cooler, a bag, a stroller, a mail delivery cart, a cone, a pylon, a sign, a barricade, and a toilet,
wherein the polymeric hydrogel of the material compositionally comprises semi-crystalline regions and amorphous regions, and wherein the amorphous regions are covalently bonded to the semi-crystalline regions with carbamate linkages, and are present in the polymeric hydrogel at a ratio of at least 20:1 by weight relative to the semi-crystalline regions.

32. An article of manufacture comprising:
a first external surface; and
a material defining at least a portion of the first external surface, the material compositionally comprising a polymeric hydrogel, and having a water uptake capacity at 24 hours greater than 40% by weight, as characterized by the Water Uptake Capacity Test with the Article Sampling Procedure,
wherein the article is selected from a mud flap, a windshield wiper, a license plate, a rim of a wheel, a tire sidewall, a hubcap, a bumper, a side-view mirror, a piece of luggage, a cooler, a bag, a stroller, a mail delivery cart, a cone, a pylon, a sign, a barricade, and a toilet,
wherein the polymeric hydrogel comprises a physically crosslinked polymer network having one or more polyurethane chains.

33. The article of claim 32, wherein the polymeric hydrogel of the material compositionally comprises semi-crystalline regions and amorphous regions, and wherein the amorphous regions are covalently bonded to the semi-crystalline regions with carbamate linkages, and are present in the polymeric hydrogel at a ratio of at least 20:1 by weight relative to the semi-crystalline regions.

34. The article of claim 32, wherein the polymeric hydrogel comprises a physically crosslinked polymer network having one or more polyurethane chains.

* * * * *

UNITED STATES PATENT AND TRADEMARK OFFICE
CERTIFICATE OF CORRECTION

PATENT NO. : 10,675,609 B2
APPLICATION NO. : 15/441720
DATED : June 9, 2020
INVENTOR(S) : Hossein A. Baghdadi et al.

It is certified that error appears in the above-identified patent and that said Letters Patent is hereby corrected as shown below:

In the Claims

Claim 1, Column 48, Line 64, "Article Sampling Procedure." should read --Article Sampling Procedure, wherein the polymeric hydrogel of the material compositionally comprises semi-crystalline regions and amorphous regions, and wherein the amorphous regions are covalently bonded to the semi-crystalline regions with carbamate linkages, and are present in the polymeric hydrogel at a ratio of at least 20:1 by weight relative to the semi-crystalline regions.--

Signed and Sealed this
Twenty-sixth Day of April, 2022

Katherine Kelly Vidal
*Director of the United States Patent and Trademark Office*